(12) United States Patent
Gordon et al.

(10) Patent No.: US 10,979,147 B2
(45) Date of Patent: Apr. 13, 2021

(54) RYDBERG ATOM MIXER AND DETERMINING PHASE OF MODULATED CARRIER RADIATION

(71) Applicant: Government of the United States of America, as represented by the Secretary of Commerce, Gaithersburg, MD (US)

(72) Inventors: Joshua Ari Gordon, Lafayette, CO (US); Christopher Lee Holloway, Boulder, CO (US); Matthew Thomas Simons, Lafayette, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/816,047

(22) Filed: Mar. 11, 2020

(65) Prior Publication Data
US 2020/0295838 A1    Sep. 17, 2020

Related U.S. Application Data

(60) Provisional application No. 62/833,234, filed on Apr. 12, 2019, provisional application No. 62/816,741, filed on Mar. 11, 2019.

(51) Int. Cl.
*H04B 10/548* (2013.01)
*H04B 10/50* (2013.01)

(52) U.S. Cl.
CPC ......... *H04B 10/548* (2013.01); *H04B 10/503* (2013.01)

(58) Field of Classification Search
None
See application file for complete search history.

(56) References Cited

U.S. PATENT DOCUMENTS

10,509,065 B1 * 12/2019 Shaffer ................ G01R 29/10
2016/0363617 A1 * 12/2016 Anderson .......... G01R 29/0885
(Continued)

OTHER PUBLICATIONS

Song et al., "Field Distortion and Optimization of a Vapor Cell in Rydberg Atom-Based Radio-Frequency Electric Field Measurement", Sep. 22, 2018, MDPI, Sensors 2018, 18, 3205; doi:10.3390/s18103205, pp. 1-14 (Year: 2018).*

(Continued)

*Primary Examiner* — David W Lambert
(74) *Attorney, Agent, or Firm* — Office of Chief Counsel for National Institute of Standards and Technology

(57) ABSTRACT

A Rydberg atom mixer determines a phase of modulated carrier radiation and includes: a reference radiofrequency source for reference radiofrequency radiation; a modulated carrier source for modulated carrier radiation; a vapor cell to contain gas atoms and that receives reference radiofrequency radiation and modulated carrier radiation, such that the gas atoms produce modulated light modulated; and a transmission detector that receives the modulated light from the vapor cell and produces a transmission signal from the transmission detector for determination of a phase of the modulated carrier radiation, wherein the Rydberg atom mixer mixes the reference radiofrequency radiation and the modulated carrier radiation by the gas atoms in a Rydberg electronic state to produce the intermediate frequency IF that corresponds directly to the phase of the modulated carrier radiation.

16 Claims, 31 Drawing Sheets

(56) References Cited

U.S. PATENT DOCUMENTS

2018/0373118 A1* 12/2018 Kiffner .................. G02F 1/3536
2019/0187198 A1* 6/2019 Anderson .......... G01R 29/0878

OTHER PUBLICATIONS

Kumar et al., "Atom-Based Sensing of Weak Radio Frequency Electric Fields Using Homodyne Readout", Feb. 20, 2017, Scientific Reports | 7:42981 | DOI: 10.1038/srep42981, pp. 1-10 (Year: 2017).*

Song et al., "Quantum-based Amplitude Modulation Radio Receiver Using Rydberg Atoms", 2018, IEEE, 6 pages (Year: 2018).*

Kumar et al., "Rydberg-atom based radio-frequency electrometry using frequency modulation spectroscopy in room temperature vapor cells", Apr. 17, 2017, Optics Express, vol. 25, No. 8, pp. 8625-8637 (Year: 2017).*

Kumar et al., "Dispersive radio frequency electrometry using Rydberg atoms in a prism-shaped atomic vapor cell", Mar. 21, 2016, Journal of Physics B: Atomic, Molecular and Optical Physics, pp. 1-17 (Year: 2016).*

Holloway, C.L., et al., Broadband Rydberg Atom-Based electric-Field Probe for SI-Traceable, Self-Calibrated Measurements, IEEE Transactions on Antennas and Propagation, 2014, p. 6169-6182, vol. 62 No. 12.

Tanasittikosol, M., et al., "Microwave dressing of Rydberg dark states", Journal of Physics B: Atomic, Molecular and Optical Physics, 2011, p. 184020, vol. 44.

Sedlacek, J.A., et al., "Microwave electrometry with Rydberg atoms in a vapour cell using bright atomic resonances", Nature Physics, 2012, p. 819-824, vol. 8.

Gordon, J.A., et al., "Millimeter wave detection via Autler-Townes splitting in rubidium Rydberg atoms", Applied Physics Letters, 2014, p. 024104, vol. 105.

Holloway, C.L., et al., "Atom-Based RF Electric Field Metrology: From Self-Calibrated Measurements to Subwavelength and Near-Field Imaging", IEEE Transactions on Electromagnetic Compatibility, 2017, p. 717-728, vol. 59 No. 2.

Fan, H., et al. "Atom based RF electric field sensing", Journal of Physics B: Atomic, Molecular, and Optical Physics, 2015, p. 202001, vol. 48.

Sedlacek, J.A., et al., "Atom-Based Vector Microwave Electrometry Using Rubidium Rydberg Atoms in a Vapor Cell", Physical Review Letters, 2013, p. 063001, vol. 111.

Mohapatra, A.K., et al., "Coherent Optical Detection of Highly Excited Rydberg States Using Electromagnetically Induced Transparency", Physical Review Letters, 2007, p. 113003, vol. 98.

Simons, M.T., et al., "Using frequency detuning to improve the sensitivity of electric field measurements via electromagnetically induced transparency and Autler-Townes splitting in Rydberg atoms", Applied Physics Letters, 2016, p. 174101, vol. 108.

Meyer, D.H., et al., "Digital communication with Rydberg atoms and amplitude-modulated microwave fields", Applied Physics Letters, 2018, p. 211108, vol. 112.

Cox, K.C., et al., "Quantum-Limited Atomic Receiver in the Electrically Small Regime", Physical Review Letters, 2018, p. 110502, vol. 121.

Song., Z., et al., "The credibility of Rydberg atom based digital communication over a continuously tunable radiofrequency carrier", 2018, arXiv:1808.10839v2 [physics.atom-ph] Sep. 3, 2018.

Anderson, D.A., et al., "An atomic receiver for AM and FM radio communication", 2018, arXiv:1808.08589v1 [physics.atom-ph] Aug. 26, 2018.

"10 Breakthrough Technologies 2018" MIT Technology Review, accessed Mar. 5, 2020, URL: https://www.technologyreview.com/lists/technologies/2018/.

Holloway, C.L., et al., "A Multiple-Band Rydberg-Atom Based Receiver/Antenna: AM/FM Stereo Reception", 2019, arXiv:1903.00786v1 [physics.atom-ph] Mar. 2, 2019.

Holloway, C.L., et al.,"Electric field metrology for SI traceability: Systematic measurement uncertainties in electromagnetically induced transparency in atomic vapor", Journal of Applied Physics, 2017, p. 233105, vol. 121.

Li, Y. et al., "Transient properties of an electromagnetically induced transparency in three-level atoms", Optics Letters, 1995, p. 1489-1491, vol. 20 No. 13.

Balanis, C.A., "Wave Propagation and Polarization", Advanced Engineering Electromagnetics, 1989, p. 129-179.

Anderson, D.A., et al., "High-resolution near-field imaging and far-field antenna measurements with atomic sensors", Proc. of the 2018 International Symposium on Electromagnetic Compatibility, 2018, p. 391-393.

Anderson, D.A., et al., "Optical Measurements of Strong Microwave Fields with Rydberg Atoms in a Vapor Cell", Physical Review Applied, 2016, p. 034003, vol. 5.

Anderson, D.A., et al., "Two-photon microwave transitions and strong-field effects in a room-temperature Rydberg-atom gas", Physical Review A, 2014, p. 043419, vol. 90.

Fan, H., et al.,"Effect of Vapor-Cell Geometry on Rydberg-Atom-Based Measurements of Radio-Frequency Electric Fields", Physical Review Applied, 2015, p. 044015, vol. 4.

Gordon, J.A., et al., "Quantum-Based SI Traceable Electric-Field Probe", 2010 IEEE International Symposium on Electromagnetic Compatibility, 2010, p. 321-324.

Holloway, C.L., et al., "Detecting and Receiving Phase-Modulated Signals With a Rydberg Atom-Based Receiver", IEEE Antennas and Wireless Propagation Letters, 2019, p. 1853-1857, vol. 18 No. 9.

Simons, M.T., et al., "Embedding a Rydberg Atom-Based Sensor Into an Antenna for Phase and Amplitude Detection of Radio-Frequency Fields and Modulated Signals", IEEE Access, 2019, p. 164975-164985, vol. 7.

Holloway, C.L., et al., "A quantum-based power standard: Using Rydberg atoms for a SI-traceable radio-frequency power measurement technique in rectangular waveguides", Applied Physics Letters, 2018, p. 094101, vol. 113.

Holloway, C.L., et al., "A "real-time" guitar recording using Rydberg atoms and electromagnetically induced transparency: Quantum physics meets music", AIP Advances, 2019, p. 065110, vol. 9.

Simons, M.T., et al., "Electromagnetically Induced Transparency (EIT) and Autler-Townes (AT) splitting in the presence of band-limited white Gaussian noise", Journal of Applied Physics, 2018, p. 203105, vol. 123.

Simons, M.T., et al., "A Rydberg atom-based mixer: Measuring the phase of a radio frequency wave", Applied Physics Letters, 2019, p. 114101, vol. 114.

Simons, M.T., et al., "Simultaneous use of Cs and Rb Rydberg atoms for dipole moment assessment and RF electric field measurements via electromagnetically induced transparency", Journal of Applied Physics, 2016, p. 123103, vol. 120.

Holloway, C.L., et al., "Sub-wavelength imaging and field mapping via electromagnetically induced transparency and Autler-Townes splitting in Rydberg atoms", Applied Physics Letters, 2014, p. 244102, vol. 104.

Simons, M.T., et al., "Atom-based RF electric field metrology above 100 GHz", Proc. of SPIE, 2016, p. 97471F, vol. 9747.

Gordon, J.A., et al., "Weak electric-field detection with sub-1 Hz resolution at radio frequencies using a Rydberg atom-based mixer", AIP Advances, 2019, p. 045030, vol. 9.

Holloway, C.L., et al., "Atom-Based RF Electric Field Measurements: An Initial Investigation of the Measurement Uncertainties", 2015 IEEE International Symposium on Electromagnetic Compatibility (EMC), 2015, p. 467-472.

Simons, M.T., et al., "Fiber-coupled vapor cell for a portable Rydberg atom-based radio frequency electric field sensor", Applied Optics, 2018, p. 6456-6460, vol. 57, No. 22.

* cited by examiner

Sphere　　　　Cylinder　　　　Rectangle　　　　Pyramidal (a) EVM = 2.4 % rms (b) EVM = 3.0 % rms (c) EVM = 2.6 % rms (d) EVM = 2.0 % rms (e) EVM = 2.2 % rms (A)

(B)

US 10,979,147 B2

RYDBERG ATOM MIXER AND DETERMINING PHASE OF MODULATED CARRIER RADIATION

CROSS REFERENCE TO RELATED APPLICATIONS

The application claims priority to U.S. Provisional Patent Application Ser. No. 62/833,234 filed Apr. 12, 2019, and U.S. Provisional Patent Application Ser. No. 62/816,741 filed Mar. 11, 2019, the disclosures of each of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 99; voice (301)-975-2573; email tpo@nist.gov; reference NIST Docket Number 19-025US1.

BRIEF DESCRIPTION

Disclosed is a Rydberg atom mixer for determining a phase of modulated carrier radiation comprising: a reference radiofrequency source that provides reference radiofrequency radiation; a modulated carrier source that provides modulated carrier radiation; a vapor cell comprising a vapor cell wall and vapor space physically bounded by the vapor cell wall to contain gas atoms in the optical overlap volume, such that the vapor cell; receives gas atoms in the vapor space; receives the reference radiofrequency radiation; receives the modulated carrier radiation, such that the gas atoms are subjected to the reference radiofrequency radiation and the modulated carrier radiation; and produces modulated light modulated at an intermediate frequency IF by the gas atoms in response to subjecting the gas atoms to the reference radiofrequency radiation and the modulated carrier radiation; and a transmission detector that receives the modulated light from the vapor cell and produces a transmission signal from the transmission detector for determination of a phase of the modulated carrier radiation, wherein the Rydberg atom mixer mixes the reference radiofrequency radiation and the modulated carrier radiation by the gas atoms in a Rydberg electronic state to produce the intermediate frequency IF that corresponds directly to the phase of the modulated carrier radiation.

Disclosed is a process for determining a phase of modulated carrier radiation with a Rydberg atom mixer, the process comprising: disposing gas atoms in the vapor space; receiving, by the vapor cell, the reference radiofrequency radiation; receiving, by the vapor cell, the modulated carrier radiation; subjecting the gas atoms to the reference radiofrequency radiation and the modulated carrier radiation; mixing the reference radiofrequency radiation and the modulated carrier radiation by the gas atoms in the Rydberg electronic state to produce the intermediate frequency IF; producing modulated light modulated at the intermediate frequency IF by the gas atoms in response to being subjected to the to the reference radiofrequency radiation and the modulated carrier radiation; receiving, by the transmission detector, the modulated light from the vapor cell; producing, by the transmission detector, the transmission signal; and determining the phase of the modulated carrier radiation from the transmission signal.

BRIEF DESCRIPTION OF THE DRAWINGS

The following description cannot be considered limiting in any way. With reference to the accompanying drawings, like elements are numbered alike.

FIG. 14 shows EIT signal measured with the embedded sensor. Shown here is the case with no RF, the case when only the LO SG is on, and the case when only the SIG VSG is on.

DETAILED DESCRIPTION

Figure 1:
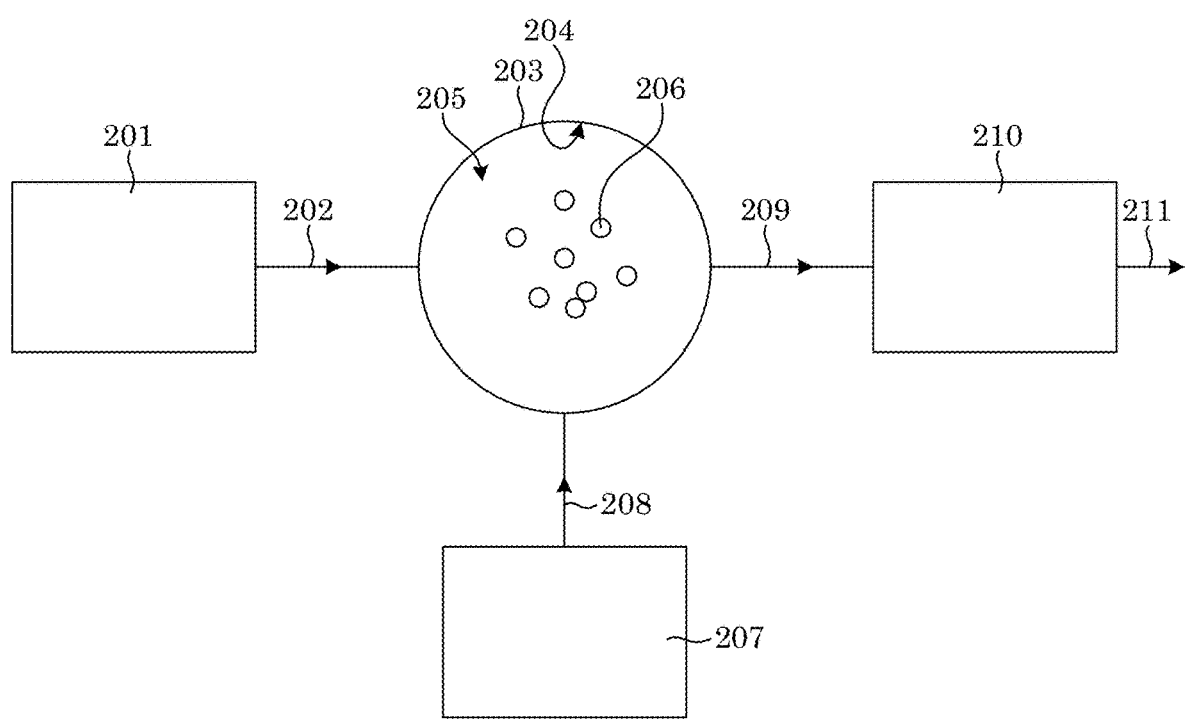
FIG. 1 shows a Rydberg atom mixer.

A detailed description of one or more embodiments is presented herein by way of exemplification and not limitation.

It has been discovered Rydberg atoms provide absolute measurement of magnitude of a radio frequency (RF) field using electromagnetically-induced transparency (EIT) and for measurement of a phase of an RF field. Measuring the phase of an RF field can be involved in communications, QPSK/QAM, antenna metrology, radar, and other technological applications. A Rydberg atom mixer coherently mixes and demodulates RF fields via Rydberg atoms as a mixer. Here, a local oscillator (LO) and an RF signal coherently create an intermediate signal (IF) by electromagnetically induced transparency and Autler-Townes splitting. Phase of the intermediate frequency corresponds directly to the phase of the RF field. The Rydberg atom mixer coherently measures RF field phase with Rydberg atoms and leverages a sensitivity of Rydberg atoms to RF fields beyond detection by Autler-Townes splitting in EIT alone.

The Rydberg atom mixer is a radio frequency mixer that involves Rydberg atoms that can be made by optically pumping gas atoms such as alkali atoms, e.g., cesium or rubidium. It is contemplated that mixing can occur between two different RF signals that can include a local oscillator and an RF signal (SIG) that have two different amplitudes, phases, and frequencies to make a third signal at an intermediate frequency (IF). The Rydberg atom mixer herein overcomes technical limitation of conventional articles that use electronics and circuitry to demodulate a LO and a SIG get an IF signal. The Rydberg atom mixer mixes RF signals by Rydberg atoms that coherently mix and demodulate LO and RF SIG to make an IF output signal for coherent measurement of RF field phase with the Rydberg atoms. Advantageously, the Rydberg atom mixer provides RF mixing using atoms and laser excitation and is fundamentally SI traceable with operating bandwidth greater than 1 THz.

Rydberg atom mixer 200 determining a phase of modulated carrier radiation 208. In an embodiment, with reference to FIG. 1, FIG. 2, FIG. 3, FIG. 4, and FIG. 5, Rydberg atom mixer 200 includes reference radiofrequency source 201 that provides reference radiofrequency radiation 202; modulated carrier source 207 that provides modulated carrier radiation 208; vapor cell 203 including vapor cell wall 204 and vapor space 205 physically bounded by vapor cell wall 204 to contain gas atoms 206 in optical overlap volume 216. Vapor cell 203 receives gas atoms 206 in vapor space 205; receives reference radiofrequency radiation 202; receives modulated carrier radiation 208, such that gas atoms 206 are subjected to reference radiofrequency radiation 202 and modulated carrier radiation 208; and produces modulated light 209 modulated at intermediate frequency IF by gas atoms 206 in response to subjecting gas atoms 206 to reference radiofrequency radiation 202 and the modulated carrier radiation 208. Rydberg atom mixer 200 also includes transmission detector 210 that receives modulated light 209 from vapor cell 203 and produces transmission signal 211 from transmission detector 210 for determination of a phase of modulated carrier radiation 208. Rydberg atom mixer 200 mixes reference radiofrequency radiation 202 and modulated carrier radiation 208 by gas atoms 206 in Rydberg electronic state 233 to produce intermediate frequency IF that corresponds directly to the phase of modulated carrier radiation 208.

In an embodiment, with reference to FIG. 2, FIG. 3, FIG. 4, and FIG. 5, Rydberg atom mixer 200 further includes: probe laser 212 that produces probe light 213 that includes a probe frequency that is resonant with probe electronic transition 229 of gas atoms 206; and coupling laser 214 that produces coupling light 215 that includes coupling frequency that is resonant with Rydberg electronic transition 232 of gas atoms 206. Vapor cell 203 further receives probe light 213 from probe laser 212, coupling light 215 from coupling laser 214, modulated carrier radiation 208, and reference radiofrequency radiation 202; and subjects gas atoms 206 to probe light 213, and gas atoms 206 undergo probe electronic transition 229 from first electronic state 230 to intermediate excited electronic state 231 in response to receiving probe light 213; subjects gas atoms 206 in intermediate excited electronic state 231 to coupling light 215, and gas atoms 206 in intermediate excited electronic state 231 undergo Rydberg electronic transition 232 from intermediate excited electronic state 231 to Rydberg electronic state 233 in response to receiving coupling light 215; and subjects gas atoms 206 in Rydberg electronic state 233 to modulated carrier radiation 208 and reference radiofrequency radiation 202, and gas atoms 206 in Rydberg electronic state 233 undergo a radiofrequency Rydberg transition 234 from Rydberg electronic state 233 to final Rydberg electronic state 235 in response to receiving modulated carrier radiation 208 and reference radiofrequency radiation 202. Rydberg atom mixer 200 can include modulation analyzer 224 in communication with transmission detector 210 and that receives transmission signal 211 from transmission detector 210 and determines probe modulation 227 of probe light 213 from transmission signal 211 that is due to mixing reference radiofrequency radiation 202 and modulated carrier radiation 208 by gas atoms 206 in Rydberg electronic state 233, such that the phase of modulated carrier radiation 208 is determined from probe modulation 227. In some embodiments, Rydberg atom mixer 200 includes signal analyzer 225 in communication with transmission detector 210 and that receives transmission signal 211 from transmission detector 210 and determines in-phase quadrature map 226 from transmission signal 211.

Figure 2:
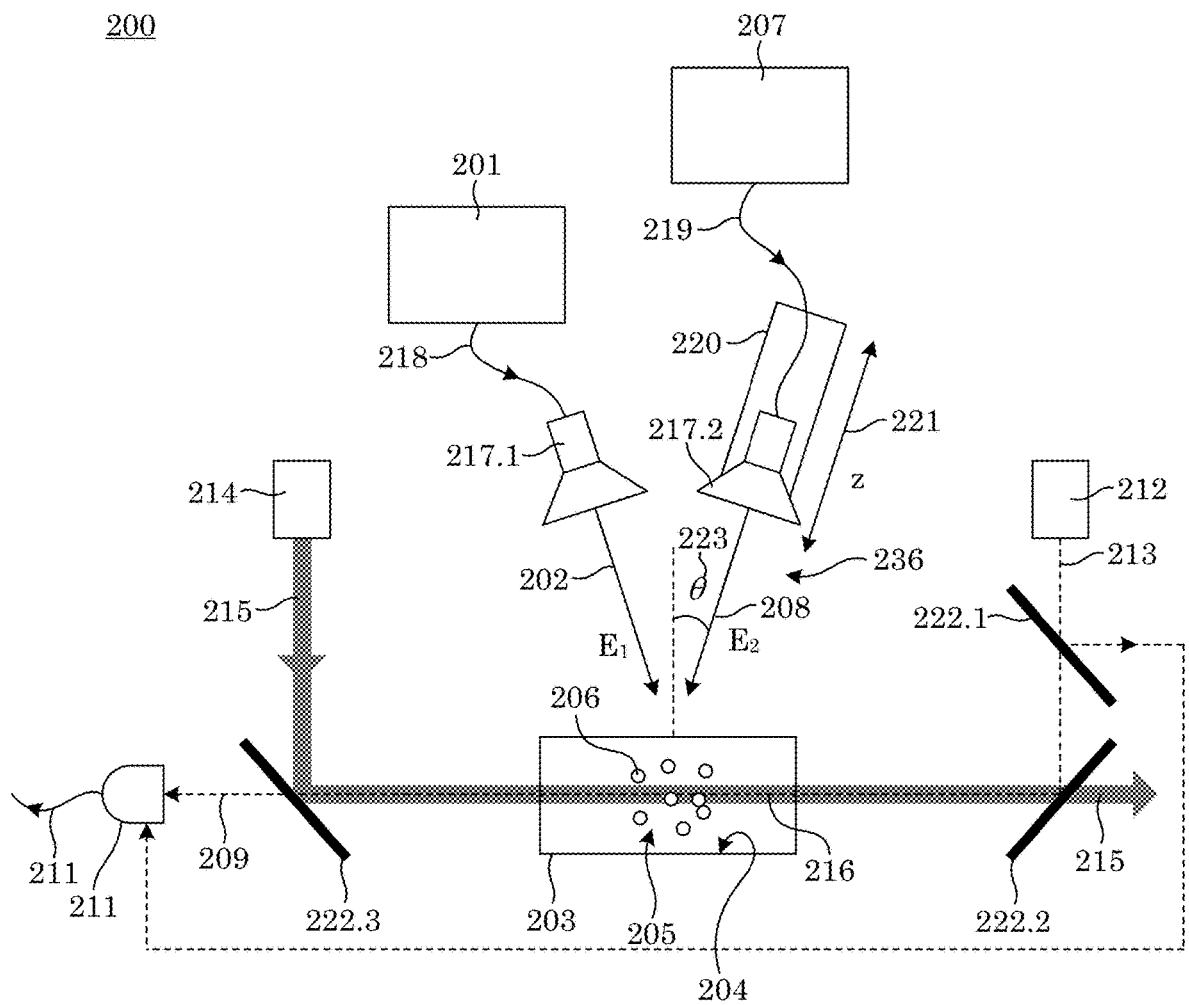
FIG. 2 shows a Rydberg atom mixer.

In an embodiment, with reference to FIG. 2, Rydberg atom mixer 200 includes first antenna 217.1 in communication with reference radiofrequency source 201 and that receives reference radiofrequency signal 218 from reference radiofrequency source 201 and produces reference radiofrequency radiation 202 from reference radiofrequency signal 218; second antenna 217.2 in communication with modulated carrier source 207 and that receives modulated carrier signal 219 from modulated carrier source 207 and produces modulated carrier radiation 208 from modulated carrier signal 219. Here, gas atoms 206 receive reference radiofrequency radiation 202 from first antenna 217.1 and modulated carrier radiation 208 from second antenna 217.2. Position manipulation stage 220 on which second antenna 217.2 is disposed moves second antenna 217.2 along movement direction 221 relative to vapor cell 203 to change a pathlength between second antenna 217.2 and vapor cell 203 through which modulated carrier radiation 208 propagates.

Figure 3:
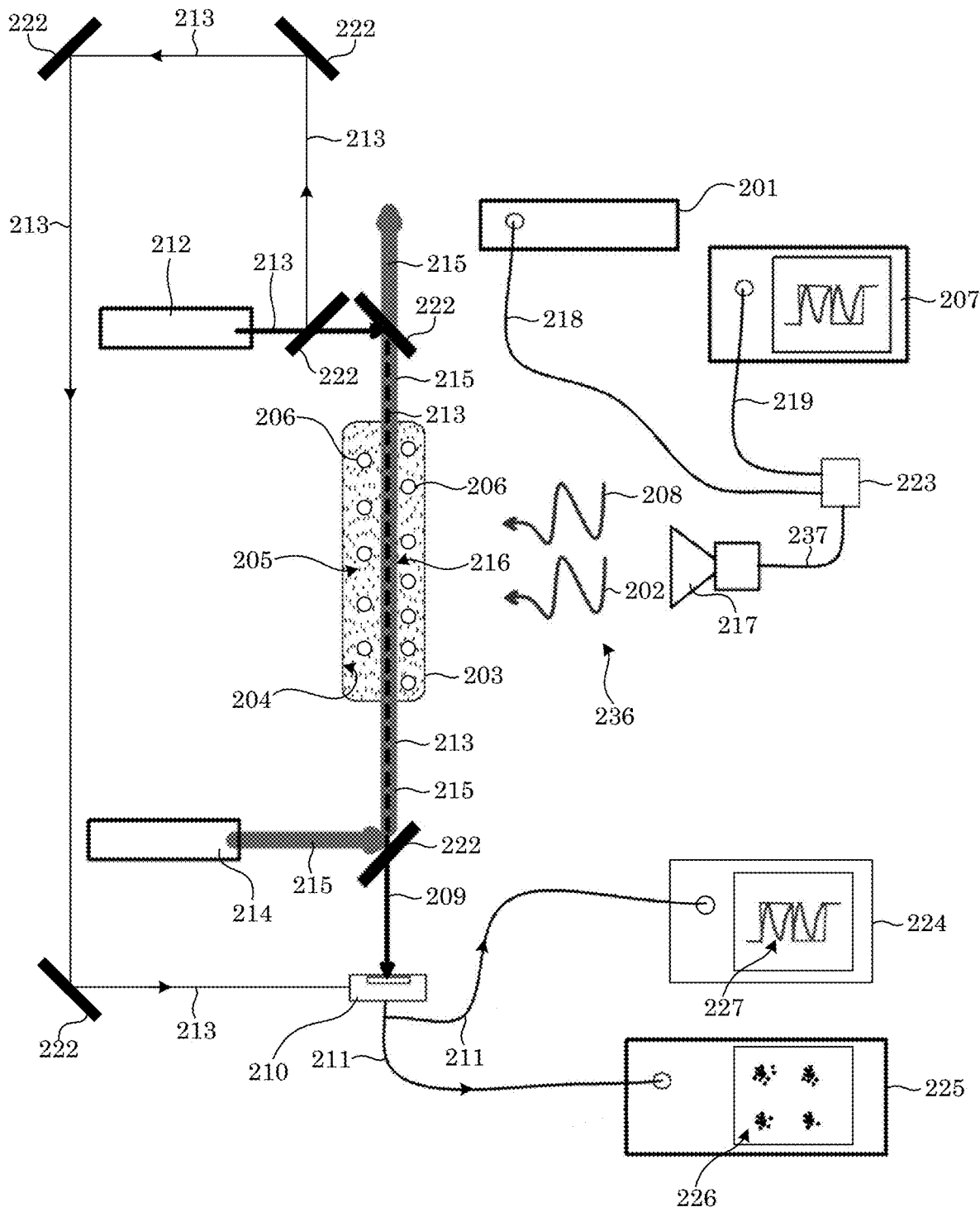
FIG. 3 shows a Rydberg atom mixer.

In an embodiment, with reference to FIG. 3, Rydberg atom mixer 200 includes power combiner 223 in communication with reference radiofrequency source 201 and modulated carrier source 207. Power combiner 223 receives reference radiofrequency signal 218 from reference radiofrequency source 201; receives modulated carrier signal 219 from modulated carrier source 207; and produces combined radiofrequency signal 237 from reference radiofrequency signal 218 and modulated carrier signal 219. Antenna 217 in communication with power combiner 223 receives combined radiofrequency signal 237 from power combiner 223; and produces radiofrequency radiation 236 that includes reference radiofrequency radiation 202 and modulated carrier radiation 208 from combined radiofrequency signal 237. Gas atoms 206 receive radiofrequency radiation 236 from antenna 217.

Figure 4:
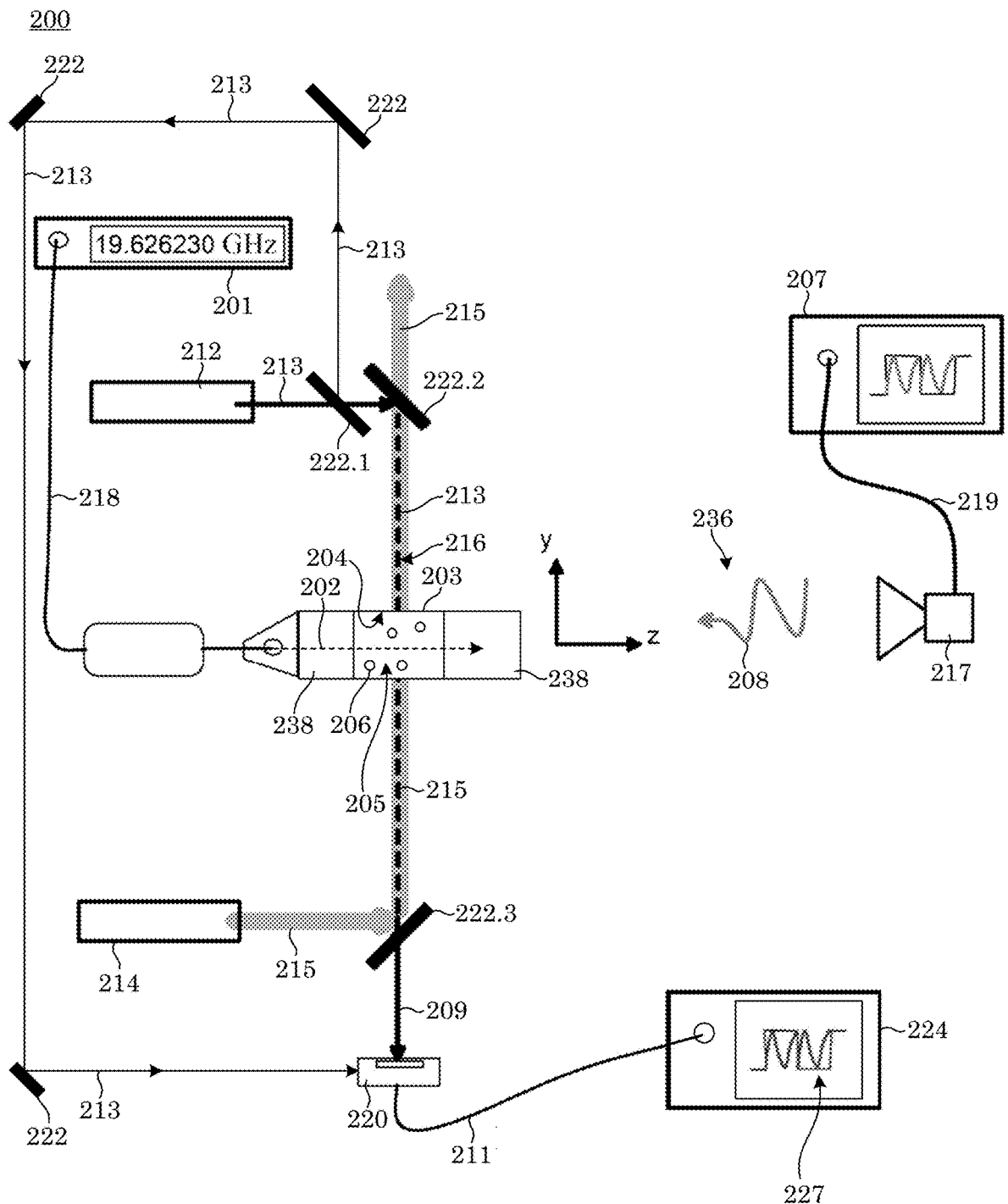
FIG. 4 shows a Rydberg atom mixer.

In an embodiment, with reference to FIG. 4, Rydberg atom mixer 200 includes antenna 217 in communication with modulated carrier source 207 that receives modulated carrier signal 219 from modulated carrier source 207 and produces modulated carrier radiation 208 from modulated carrier signal 219; and parallel-plate waveguide antenna 238 in which vapor cell 203 is disposed. Parallel-plate waveguide antenna 238 is in communication with reference radiofrequency source 201; receives reference radiofrequency signal 218 from reference radiofrequency source 201; produces reference radiofrequency radiation 202 from reference radiofrequency signal 218; and communicates reference radiofrequency radiation 202 to vapor cell 203, wherein gas atoms 206 receive modulated carrier source 207 from antenna 217 and reference radiofrequency radiation 202 from parallel-plate waveguide antenna 238.

Reference radiofrequency source 201 provides reference radiofrequency signal 218 to interact with gas atoms 206. Reference radiofrequency source 201 can include an electromagnetic source close in frequency to source 207 to apply a reference signal to the atoms and can be applied remotely as shown in FIG. 2 and FIG. 3) or locally as shown in FIG. 4 to the atoms for the purpose of generating a beat note at the atoms. Exemplary reference radiofrequency sources 201 include a signal generator or ambient sources. Moreover, the frequency of source 201 is close in frequency of source 207. In an embodiment, reference radiofrequency source 201 includes a device that generates electromagnetic energy at a frequency close to that of source 207. Reference radiofrequency signal, 218 can include a continuous wave signal, amplitude or frequency or polarization modulated signal, any type of continuous wave, any type of modulated signal, or any type of arbitrary waveform. Reference radiofrequency radiation 202 can include the electromagnetic wave for which the phase is being detected and measured and can include a continuous wave signal, amplitude or frequency or polarization modulated signal. Exemplary reference radiofrequency radiation 202 can include any type of electromagnetic wave. Moreover, this includes any type of continuous wave close to the frequency of source 207 and 208 and amplitude or frequency or polarization modulated signal. The frequency of 202 is closed to the frequency of 207 and 208. In an embodiment, reference radiofrequency radiation 202 includes a continuous wave single frequency and single polarization wave.

Modulated carrier source 207 provides modulated carrier signal 219 to interact with gas atoms 206. Modulated carrier source 207 can include any type of continuous wave, any type of modulated signal, or any type of arbitrary waveform or continuous wave signal, amplitude or frequency or polarization modulated signal. Exemplary modulated carrier sources 207 includes a source of weak continues waves, modulated signals, arbitrary waveforms. In an embodiment, modulated carrier source 207 includes a signal generator capable of generating quadrature phase shift key (QPSK) modulated signals or single frequency continuous wave signal. Modulated carrier signal, 219 can include a continuous wave signal, amplitude or frequency or polarization modulated signal, any type of continuous wave, any type of modulated signal, or any type of arbitrary waveform. Modulated carrier radiation 208 can include weak and strong continues waves, modulated signals, and arbitrary waveforms. Exemplary reference radiofrequency radiation 202 includes weak and strong continuous waves, modulated signals, and arbitrary waveforms. In an embodiment, modulated carrier radiation 208 includes phase and or amplitude modulated electromagnetic fields with carrier frequencies ranging from 1 GHz to 1 THz.

Reference radiofrequency signal 218 and modulated carrier signal 219 independently can be communicated along various transmission lines. Such transmission lines independently can include coaxial cables, waveguiding structures, radio-frequency-to-optical fiber optic links. Exemplary transmission lines include WR28 microwave wave guides, microwave coaxial cables. In an embodiment, transmission lines include a coaxial cable capable with appropriate connectors at each end that can be connected to a signal generator on one end and antenna on the other.

Antenna 217 receives reference radiofrequency signal 218 or modulated carrier signal 219 and produces reference radiofrequency radiation 202, modulated carrier radiation 208, or radiofrequency radiation 236 therefrom. Antenna 217 can include any type of antenna or radiating element that allows for the electromagnetic wave to be applied to the atoms in 203. Exemplary antennae 217 include a standard gain horn antenna. In an embodiment, antenna 217 includes a coaxial cable connector or waveguide connector such that a transmission line can be connected to it. It is contemplated that antenna 217 can be disposed on position manipulation stage 220 for movement of antenna 217 along movement direction 221. Position manipulation stage 220 can include any device that allow for moving and determining the accurate position of 217.2 either through manual means or by a motor or actuator. Exemplary position manipulation stages 220 include piezo actuated linear stages, worm screw driven stages.

Probe laser 212 produces probe light 213 that interacts with gas atoms 206. Probe laser 212 can include any type of laser that can be tuned to a precise wavelength Exemplary probe lasers 212 include laser tuned to the atomic transitions of an atomic species. In an embodiment, probe laser 212 includes is a frequency stabilized, and frequency tunable laser with controllable power output. Probe light 213 can include an 850 nano-meters or 780 nano-meters wavelength. Exemplary probe light 213 include a frequency stabilized, and frequency tunable laser with controllable power output. Moreover, probe laser 212 and probe light 213 can be any laser and light source that allows for probing the atomic species used.

Coupling laser 214 produces coupling light 215 that interacts with gas atoms 206. Coupling laser 214 can include any type of laser that can be tuned to a precise wavelength. Exemplary coupling lasers 214 include a laser tuned to the atomic transitions of an atomic species. Coupling light 215 can include a 480 nano-meter or 511 nano-meter. Exemplary coupling lights 215 include a frequency stabilized, and frequency tunable laser with controllable power output. Moreover, the probe laser and the coupling laser can be any laser and light source that allows for coupling various states of the atomic species used. In an embodiment, coupling light 215 includes lasers operating at 509 nm or 480 nm.

Probe light 213 and coupling light 215 optically overlap in optical overlap volume 216 through gas atoms 206 in vapor cell 203. It is contemplated that optical overlap volume 216 contains atoms of a selected atomic species. A volume of optical overlap volume 216 can be from controlling the beam widths of light sources 213 and 215.

Probe light 213, coupling light 215, reference radiofrequency radiation 202, and modulated carrier radiation 208 can interact with gas atoms 206 to produce modulated light 209. Modulated light 209 can include amplitude modulation. Exemplary modulated light 209 is caused by the beating of 202 and 223. Moreover, modulated light 209 contained the phase difference between 202 and 223. By measuring the phase different is 202 and 223, the phase of 223 can be determined. This allows the detecting and measuring the phase of a continues wave, the detection of a modulated signal, and the detection of weak signals.

Rydberg atom mixer 200 can include various optical, mechanical, and electrical components to interact with certain electric, optical, mechanical, and similar elements. Mirror 222 receives light (e.g., probe light 213, coupling light 215, modulated light 209) and reflects or partially transmits such light. Mirror 222.3 reflects 215 but transmits 213. Mirror 222.2 reflects 213 and can include a dichroic filter, a combination of high-pass and low-pass optical filters, and or polarization optical elements such as beam splitters and wave plates to separate 215 and 213. Power combiner 223 receives signals (e.g., reference radiofrequency signal 218 and modulated carrier signal 219) and provides combined radiofrequency signal 237 therefrom. Power combiner 223 can be any RF power combiner that combines 218 and 219 with minimal loss, can include free-space, directional coupler waveguide, radio-frequency cavity, multi-mode interference device, or mode coupler. Exemplary power combiners 210 include free-space, or a mode coupler. In an embodiment, power combiner 223 includes free space where signals radiating from antennas 217.1 and 217.2 overlap.

Figure 6:
FIG. 6 shows a plurality of shapes of a vapor cell.
Figure 6:
Figure 6:
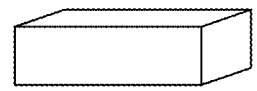
Figure 6:
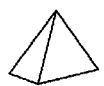

Vapor cell 203 receives radiation, optical and otherwise, and contains gas atoms 206. Vapor cell 203 can include a device to contain the atomic species of choice. Exemplary vapor cells 203 include a container the has a minimal effect on reference radiofrequency radiation 202 and modulated carrier radiation 208 (or modulated light 209 and position manipulation stage 220. A shape of vapor cell 203, including a shape of vapor cell wall 204 that bounds vapor space 205 and contacts gas atoms 206 can be arbitrary and can be, e.g., a parellelpiped, cuboid, spherical, spheroidal (oblate or prolate), prismatic (e.g., pyramidal), and the like. Exemplary shapes of vapor cell 203 are shown in FIG. 6.

In an embodiment, coupling laser 214 can be have similar operational characteristics as a probe laser.

Gas atoms 206 receive reference radiofrequency radiation 202, modulated carrier radiation 208, coupling light 215, and probe light 213 to undergo various electronic transitions. Gas atoms 206 include electronic energy levels shown in FIG. 5 that are electromagnetically accessed by reference radiofrequency radiation 202, modulated carrier radiation 208, coupling light 215, and probe light 213. Gas atoms 206 can include rubidium, cesium, or other atomic species. Exemplary gas atoms 206 include atomic species that are in gaseous state at room temperature for example isotopes of rubidium-87 and or rubidium-85 and or cesium-133. Moreover, energy (light or thermal energy) can be applied to ensure the atomic species are in gaseous state.

Gas atoms 206 convert modulated carrier radiation 208 to modulated light 209 that is communicated from gas atoms 206 to transmission detector 210 (or transmission signal 211). Transmission detector 210 can include device to receive and detect modulated light 209. Exemplary transmission detectors 210 include a photodetector with enough bandwidth to detect the any modulation on modulated light 209. Moreover, transmission detector 210 can include a photodiode device with variable gain to amplify modulated light 209. In an embodiment, transmission detector 210 includes a single photodiode or array of photodetectors. Transmission signal 211 is produced by transmission detector 210 from modulated light 209. Transmission signal 211 can include device to receive and detect modulated light 209. Exemplary transmission signals 211 include a photodetector with enough bandwidth to detect the modulation on 208. Moreover, 211 can include a device with variable gain to amplify 209.

Rydberg atom mixer 200 can be made in various ways. In an embodiment, a process for making Rydberg atom mixer 200 includes connecting reference radiofrequency source 201 and antenna 217; connecting modulated carrier source 207 and antenna 217; disposing antenna 217 in communication with gas atoms 206; disposing gas atoms 206 in vapor cell 203; disposing probe laser 212 in communication with vapor cell 203; disposing coupling laser 214 in communication with vapor cell 203; disposing transmission detector 210 in communication with vapor cell 203; disposing transmission detector 210 in communication with modulation analyzer 224; and disposing transmission detector 210 in communication with signal analyzer 225.

The process for making Rydberg atom mixer 200 also includes the detection of weak field strengths and for discriminating two different signals to below sub-Hz resolution.

Rydberg atom mixer 200 has numerous advantageous and unexpected benefits and uses. In an embodiment, a process for determining a phase of modulated carrier radiation 208 with Rydberg atom mixer 200 includes: disposing gas atoms 206 in vapor space 205; receiving, by vapor cell 203, reference radiofrequency radiation 202; receiving, by vapor cell 203, modulated carrier radiation 208; subjecting gas atoms 206 to reference radiofrequency radiation 202 and modulated carrier radiation 208; mixing reference radiofrequency radiation 202 and modulated carrier radiation 208 by gas atoms 206 in Rydberg electronic state 233 to produce intermediate frequency IF; producing modulated light 209 modulated at intermediate frequency IF by gas atoms 206 in response to being subjected to to reference radiofrequency radiation 202 and modulated carrier radiation 208; receiving, by transmission detector 210, modulated light 209 from vapor cell 203; producing, by transmission detector 210, transmission signal 211; and determining phase of modulated carrier radiation 208 from transmission signal 211.

According to an embodiment, the process for determining phase of modulated carrier radiation 208 also includes producing probe light 213 that comprises probe frequency that is resonant with probe electronic transition 229 of gas atoms 206; producing coupling light 215 that comprises coupling frequency that is resonant with Rydberg electronic transition 232 of gas atoms 206; receiving, by gas atoms 206, probe light 213, coupling light 215, modulated carrier radiation 208, and reference radiofrequency radiation 202; subjecting gas atoms 206 to probe light 213; undergoing, by gas atoms 206, probe electronic transition 229 from first electronic state 230 to an intermediate excited electronic state 231 in response to receiving probe light 213; subjecting gas atoms 206 in intermediate excited electronic state 231 to coupling light 215; undergoing, by gas atoms 206 in intermediate excited electronic state 231, Rydberg electronic transition 232 from intermediate excited electronic state 231 to Rydberg electronic state 233 in response to receiving coupling light 215; subjecting gas atoms 206 in Rydberg electronic state 233 to modulated carrier radiation 208 and reference radiofrequency radiation 202; and undergoing, by gas atoms 206 in Rydberg electronic state 233, radiofrequency Rydberg transition 234 from Rydberg electronic state 233 to final Rydberg electronic state 235 in response to receiving modulated carrier radiation 208 and reference radiofrequency radiation 202.

In an embodiment, the process for determining phase of modulated carrier radiation 208 also includes receiving, by modulation analyzer 224, transmission signal 211 from transmission detector 210; determining probe modulation 227 of probe light 213 from transmission signal 211, probe modulation 227 being due to mixing reference radiofrequency radiation 202 and modulated carrier radiation 208 by gas atoms 206 in Rydberg electronic state 233; and determining phase of modulated carrier radiation 208 from probe modulation 227.

In an embodiment, the process for determining phase of modulated carrier radiation 208 also includes receiving, by signal analyzer 225, transmission signal 211 from transmission detector 210; and determining an in-phase quadrature map 226 from transmission signal 211.

In an embodiment, the process for determining phase of modulated carrier radiation 208 also includes receiving, by first antenna 217.1, reference radiofrequency signal 218 from reference radiofrequency source 201; producing reference radiofrequency radiation 202 from reference radiofrequency signal 218; receiving, by second antenna 217.2, modulated carrier signal 219 from modulated carrier source 207; producing modulated carrier radiation 208 from modulated carrier signal 219; and receiving, by gas atoms 206, reference radiofrequency radiation 202 from first antenna 217.1 and modulated carrier radiation 208 from second antenna 217.2.

In an embodiment, the process for determining phase of modulated carrier radiation 208 also includes moving second antenna 217.2 along movement direction 221 relative to vapor cell 203; and changing pathlength between second antenna 217.2 and vapor cell 203 through which modulated carrier radiation 208 propagates.

In an embodiment, the process for determining phase of modulated carrier radiation 208 also includes receiving, by power combiner 223, reference radiofrequency signal 218 from reference radiofrequency source 201 and modulated carrier signal 219 from modulated carrier source 207; producing combined radiofrequency signal 237 from reference radiofrequency signal 218 and modulated carrier signal 219; receiving, by an antenna 217, combined radiofrequency signal 237 from power combiner 223; producing, by antenna 217, radiofrequency radiation 236 that comprises reference radiofrequency radiation 202 and modulated carrier radiation 208 from combined radiofrequency signal 237; and receiving, by gas atoms 206, radiofrequency radiation 236 from antenna 217.

In an embodiment, the process for determining phase of modulated carrier radiation 208 also includes receiving, by an antenna 217, modulated carrier signal 219 from modulated carrier source 207; producing modulated carrier radiation 208 from modulated carrier signal 219; receiving, by parallel-plate waveguide antenna 238 in which vapor cell 203 is disposed, reference radiofrequency signal 218 from reference radiofrequency source 201; producing reference radiofrequency radiation 202 from reference radiofrequency signal 218; communicating reference radiofrequency radiation 202 from parallel-plate waveguide antenna 238 to vapor cell 203; and receiving, by gas atoms 206, modulated carrier source 207 from antenna 217 and reference radiofrequency radiation 202 from parallel-plate waveguide antenna 238.

In the process for determining phase of modulated carrier radiation 208, disposing gas atoms 206 in vapor space 205 occurs by propagating through walls of vapor cell 203 by way of the walls of 203 being transparent to the radiation. In the process for determining phase of modulated carrier radiation 208, mixing reference radiofrequency radiation 202 and modulated carrier radiation 208 by gas atoms 206 in Rydberg electronic state 233 to produce intermediate frequency IF occurs by the differing atomic response to the individual frequencies of the carrier and reference and beat frequency produced by the superposition these signals which occurs in combiner 223.

The articles and processes herein are illustrated further by the following Examples, which are non-limiting.

EXAMPLES

Example 1. Detecting and Receiving Phase-Modulated Signals with a Rydberg Atom-Based Receiver Rydberg atom-based receivers detect and receive communication signal. Rydberg atoms are atoms with one or more electrons excited to a very high principal quantum number n. These Rydberg atoms have large dipole moments (scale as $n^2$), which make them very useful for electric (E) field sensors. Electromagnetically induced transparency (EIT) is used in this approach for E-field sensing, performed when an RF field is either on-resonance of a Rydberg transition [using Autler-Townes (AT) splitting] or off-resonance (using ac Stark shifts). This Rydberg atom-based sensor can act as a compact quantum-based receiver/antenna for communication applications to detect and receive modulated signals.

Quantum-based E-field sensor technology for communications and phase-modulation reception is described with a Rydberg atom-based mixer shown in FIG. 3 to detect a phase-modulated RF carrier and, in turn, detect and receive BPSK, QPSK, and QAM signals. Because one can measure the phase of the CW field does not mean one can detect and receive data for a phase-modulated communication signal. However, the Rydberg atom-based technique herein along with the atom-based mixer can detect and receive data from different phase-modulation schemes that are used in communication systems.

A modulation scheme for digital communications is phase-shift keying (PSK) using both BPSK and QPSK. In these modulation schemes, data are transmitted by changing (or modulating) the phase of the CW carrier. BPSK uses two different phase states to transmit data, in which the carrier frequency phase is changed between 0° and 180°. Each phase state represents one transmitted symbol, and each symbol is mapped into bits "1" or "0." QPSK is a type of PSK, where each transmitted symbol (or phase state) is mapped into two bits. This is done by choosing one of four possible phases applied to a CW carrier [e.g., 45° (binary state "00"), 135° (binary state "01"), −45° (binary state "10"), and −135° (binary state "11"). Using both the phase and the amplitude, this idea is extended to QAM, where 16QAM corresponds to 16 phase and amplitude states; each phase state is a transmitted symbol (each symbol corresponds to 4 bits, "0000," "1000," "1100," etc.). Continuing this, ($2^n$)QAM corresponds to $2^n$ phase and amplitude states; each phase state is a transmitted symbol (each symbol corresponds to n bits). Thus, to receive BPSK, QPSK, and QAM signals, one needs to measure and detect the phase and amplitude of the CW carrier. The Rydberg atom-based mixer measures the phase and amplitude of a carrier and receives BPSK, QPSK, 16QAM, 32QAM, and 64QAM modulated signals.

The atom-based mixer includes a reference RF field (labeled "LO" in FIG. 3) on-resonance with the Rydberg atom transition acts as a local oscillator (LO). The "LO" field causes the EIT/AT effect in the Rydberg atoms, which is used to down convert a second copolarized RF field. This second field is detuned from the "LO" field and is the digital modulated carrier (labeled "SIG" in FIG. 3). The frequency difference between the LO and the SIG is an intermediate frequency (IF), and the IF is detected by optically probing the Rydberg atoms (see FIG. 3). The phase of the IF signal corresponds directly to the relative phase between the "LO" and "SIG" signals. In effect, the atom-based mixer does all the down conversion of the "SIG" and the "LO," and a direct read-out of the phase of SIG is obtained by the probe laser propagating through the atomic vapor. By measuring the relative phase shift of the IF signal (via a photodetector), we determine the phase states of BPSK, QPSK, and QAM signals.

The EIT/AT technique involves monitoring the transmission of a "probe" laser through the vapor cell. A second laser ("coupling" laser) establishes a coherence in the atomic states and enhances the probe transmission through the atoms. An applied RF field (the LO field in our case) alters the susceptibility of the atomic vapor, which results in a change in the probe laser transmission. Presence of both LO and SIG fields creates a beat note, and the beat note results in AM of the probe transmission, where the amplitude of the probe transmission varies as $\cos(2\pi f_{IF} t + \Delta\varphi)$ (where $f_{IF}$ is the frequency of the IF field and $\Delta\varphi$ is the phase difference between the LO and SIG fields). This AM of the probe laser transmission can be detected with a photodetector and used to determine the phase of the SIG signal. For a pure AM or FM carrier, the Rydberg atoms automatically demodulate the carrier, and output of the photodetector gives a direct read-out of the baseband signal (the information being transmitted). For a phase-modulated carrier, the Rydberg atoms automatically down convert the carrier to the IF, which contains the phase states of the different phase-modulation schemes.

A diagram of the experimental setup is shown in FIG. 3. To generate EIT, we use cesium ($^{133}$Cs) atoms. The probe laser is tuned to the D2 transition for $^{133}$Cs ($6S_{1/2}$-$6P_{3/2}$ or wavelength of λp=850.53 nm) focused to a full-width at half-maximum (FWHM) of 425 µm, with a power of 41.2 µW. To produce an EIT signal, we couple to the $^{133}$Cs $6P_{3/2}$-$34D_{5/2}$ states by applying a counterpropagating coupling laser at λc=511.1480 nm with a power of 48.7 mW, focused to an FWHM of 620 µm. We use a signal generator (SG) to apply an LO field at 19.626 GHz to couple states $34D_{5/2}$ and $35P_{3/2}$. While we use 19.626 GHz in these experiments, this approach can work at carriers from 100 MHz to 1 THz (because of the broadband nature of the EIT/AT approach). To generate the modulated SIG field, we use a vector signal generator (VSG). The VSG applies a given digital modulation scheme AM and/or phase to a CW carrier. We set the frequency of the CW SIG field to 19.626 GHz+$f_{IF}$ (where the $f_{IF}$ is changed during these experiments). The outputs from the SG and the VSG were connected to a standard gain horn antenna via a power combiner. The output of the photodetector was connected to the input of a vector signal analyzer (VSA). The Rydberg atoms automatically down convert the modulated carrier to the IF (the amplitude of the probe laser transmission), and the signal analyzer can detect the phase change of the IF signal and, hence, detect the phase state of the signal. In effect, the VSA detects the phase state of a down converted signal and, hence, recovers the phase state of the modulated carrier. The output of the photodetector was also sent to an oscilloscope.

Figure 7:
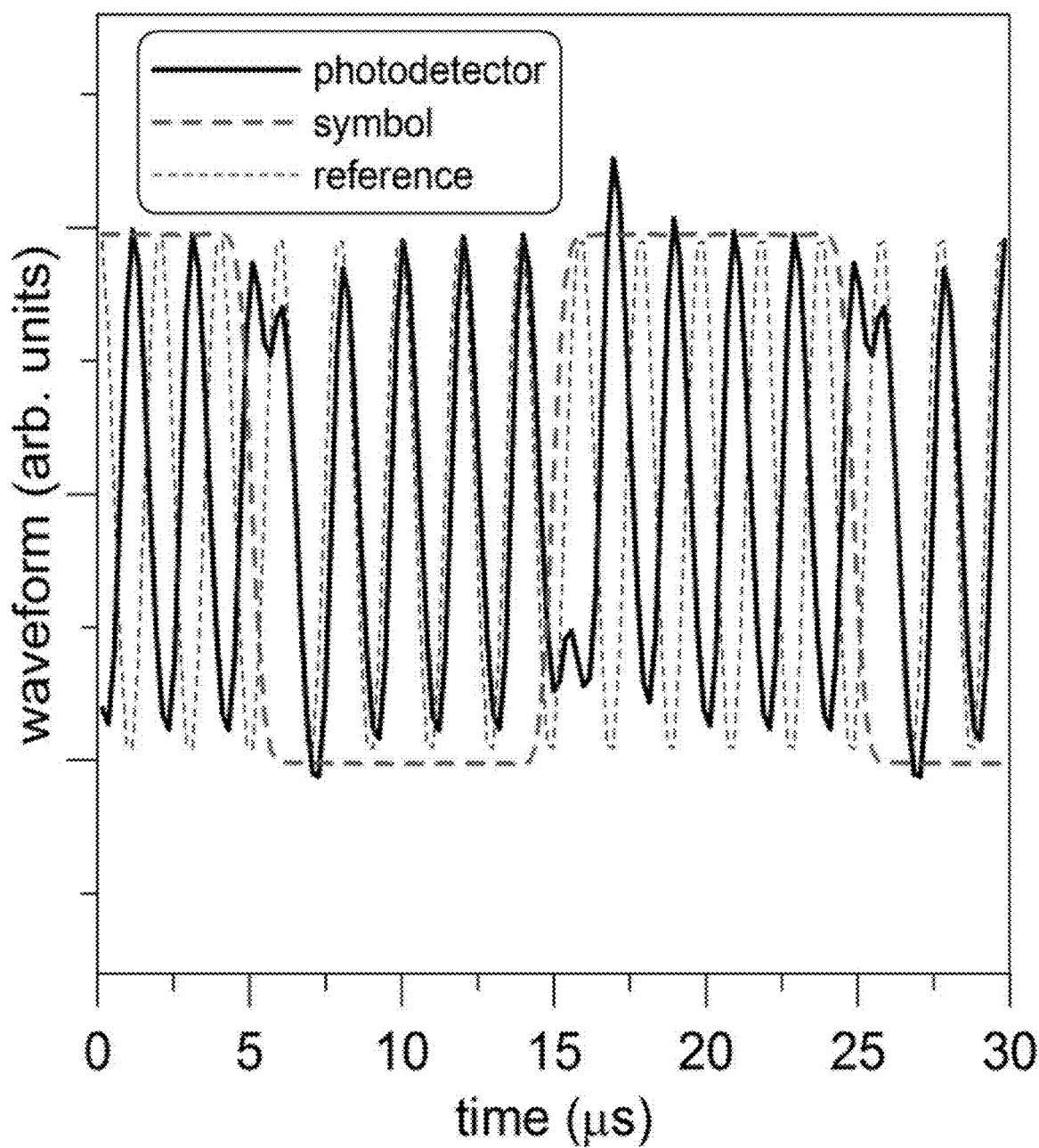
FIG. 7 shows a signal detected on a photodetector as measured on an oscilloscope for BPSK modulation for fIF=500 kHz and symbol rate of 100 kSym/s with a symbol period of 10 Ms.

FIG. 7 shows the signal detected on the photodetector (measured on the oscilloscope) for a BPSK modulation for $f_{IF}$=500 kHz and symbol period of 1 µs (i.e., a symbol rate of 1 kSym/s or 1 kb/s). Also, in the figure, there is a reference signal. Comparing the reference signal with the photodetector signal shows the phase shift in the signal when the symbol state changes (represented by the square wave in the figure). Furthermore, comparing the phase of the beat-note (or photodetector) signal to the reference signal in each symbol frame gives the phase of the CW carrier in that symbol, i.e., the phase state of the CW in the particular symbol.

Figure 8:
FIG. 8 shows measured IQ diagrams: (a) BPSK, (b) QPSK, (c) 16QAM, (d) 32QAM, and (e) 64QAM, wherein the EVM for each case is indicted as well, and a bandwidth of both the photodetector and the VSA is 10 MHz.
Figure 8:
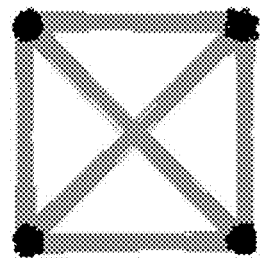
Figure 8:
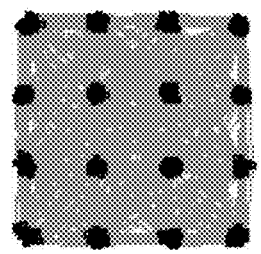
Figure 8:
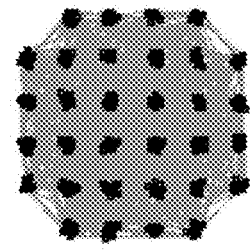
Figure 8:
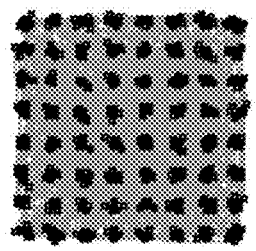

In communications, an IQ constellation diagram (IQ stands for in-phase and quadrature components of the modulated signal; also called a polar or vector diagram) is typically used to represent the phase state of a symbol (i.e., in our case the phase and amplitude of the IF signal). Furthermore, a metric to assess how well a digital signal (a bit stream) is detected is the error vector magnitude (EVM). EVM is an error vector of the measured (received) phase/amplitude state compared to the ideal state and is basically an assessment of the received modulation quality. The VSA can generate the IQ diagram for the detected signal and calculate the EVM of the received bit stream. The IQ diagram for receiving 2047 symbols is shown in FIG. 8. FIG. 8 shows received IQ diagrams for the Rydberg atom receiver for five different modulation schemes (BPSK, QPSK, 16QAM, 32QAM, and 64QAM), each with an IF=1 MHz and the symbol rate of 100 kSym/s. The grouping of the data is that various quadrants correspond to the reception of the possible phase/amplitude states for the different modulation schemes.

Figure 5:
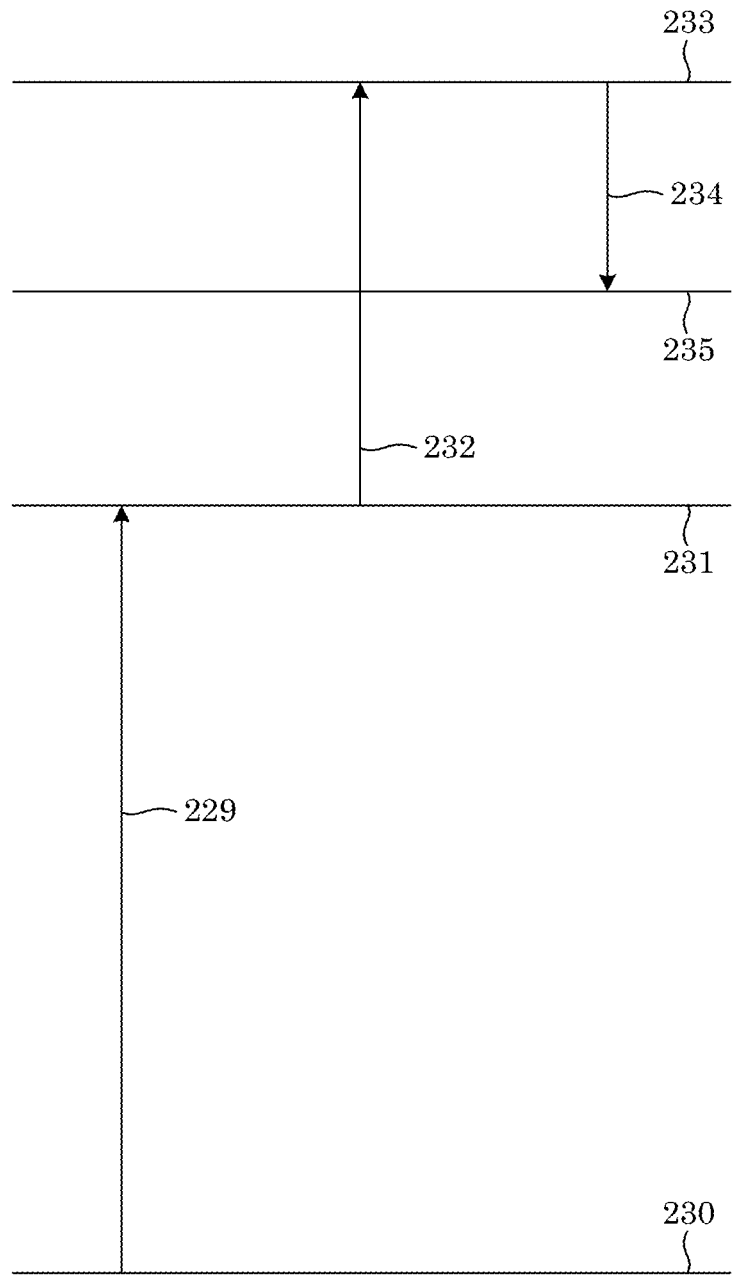
FIG. 5 shows Rydberg transitions.
Figure 9:
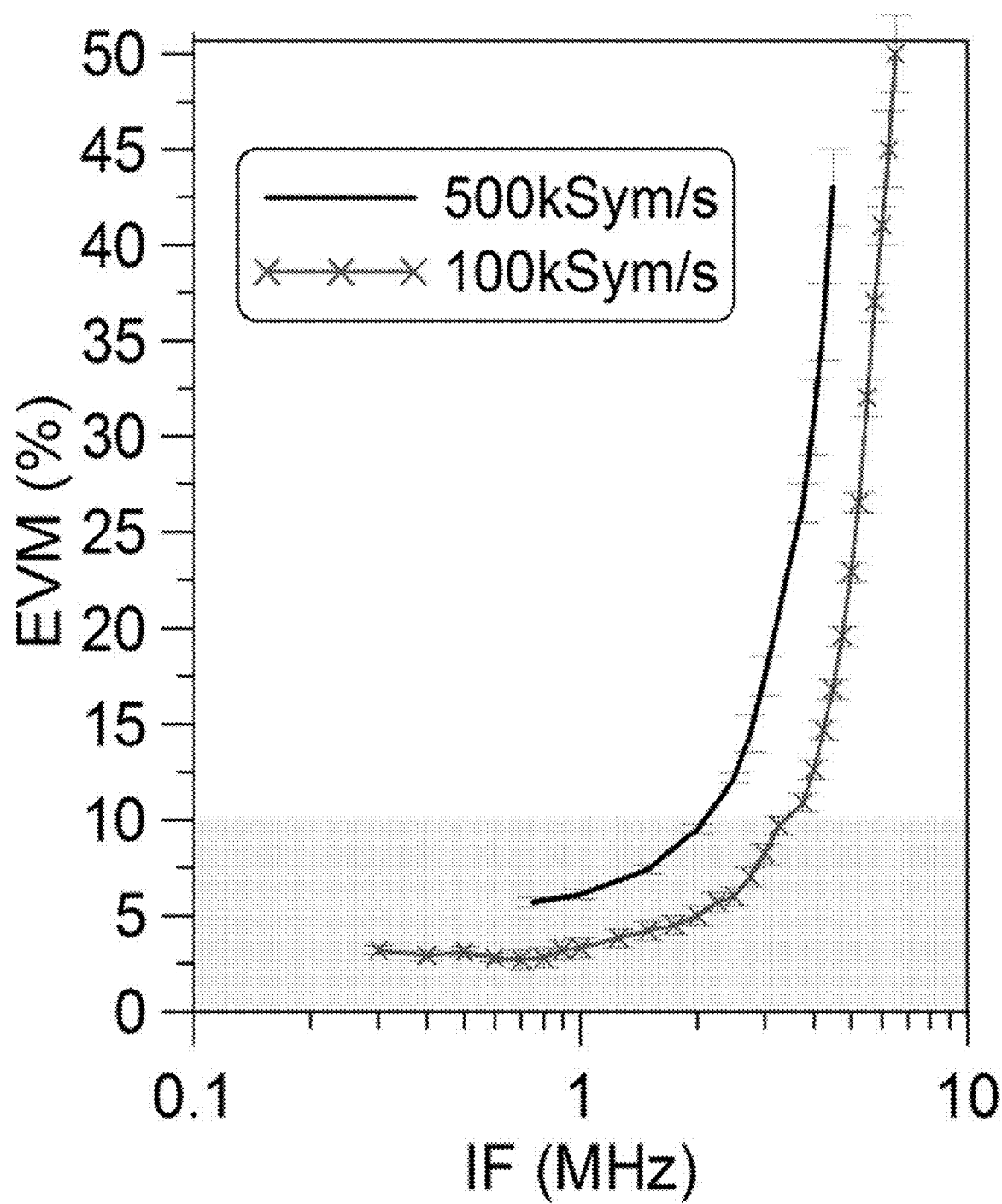
FIG. 9 shows measured EVM for BPSK for different IF. The error bars represent the variability in the measured EVM. The bandwidth of both the photodetector and the VSA is 10 MHz.

We first looked at the bandwidth of the Rydberg atom-based receiver. This bandwidth limit is due to the time required to populate the atoms to a Rydberg state. A numerical time-domain calculation of the master equation for the density matrix components shows that the population of the Rydberg state reaches steady state around 1 μs, but has significant population by 0.1-0.3 μs, which implies that the atoms can respond on the order of 3-10 MHz. As we will see, while the Rydberg state may not be fully populated in 0.3 μs (3 MHz), the atom-based mixer can detect and receive digital signals for data rate above 5 MHz (but the EVM starts to become large). For this atom-based mixer approach, varying the IF value gives an indication of the maximum data rate for digital signals that can be detected. In effect, the atoms respond to the IF signal; as a result, the higher the IF, the faster the atoms have to respond. FIG. 9 shows the EVM as a function of IF for a BPSK signal for two different symbols rates. We see that at around 1 MHz, the EVM starts to increase, and at around 2-3 MHz, the EVM increases above 10%, but data are still received for IF>3 MHz. Next, we set IF to 1 and 2 MHz, then varied the symbol rate. FIG. 5 shows the EVM as a function of symbol rate for BPSK. Here, we see that the EVM is below 5% for symbol rates below 400 kSym/s for both IF values. The EVM approaches 10% for symbol rate around 700 kSym/s in both cases. The EVM continues to increase with increasing symbol rate. We should point out that, as one might expect, once the period of the IF becomes smaller than the symbol period, it becomes difficult to detect the different phases of the carrier (i.e., when the IF wavelength is larger than the symbol length). While the high symbol rates are approaching the bandwidth of the Rydberg atoms, the atom-based mixer still detects and receives BPSK signals with the caveat that the EVM does increase with high symbol rate.

Figure 10:
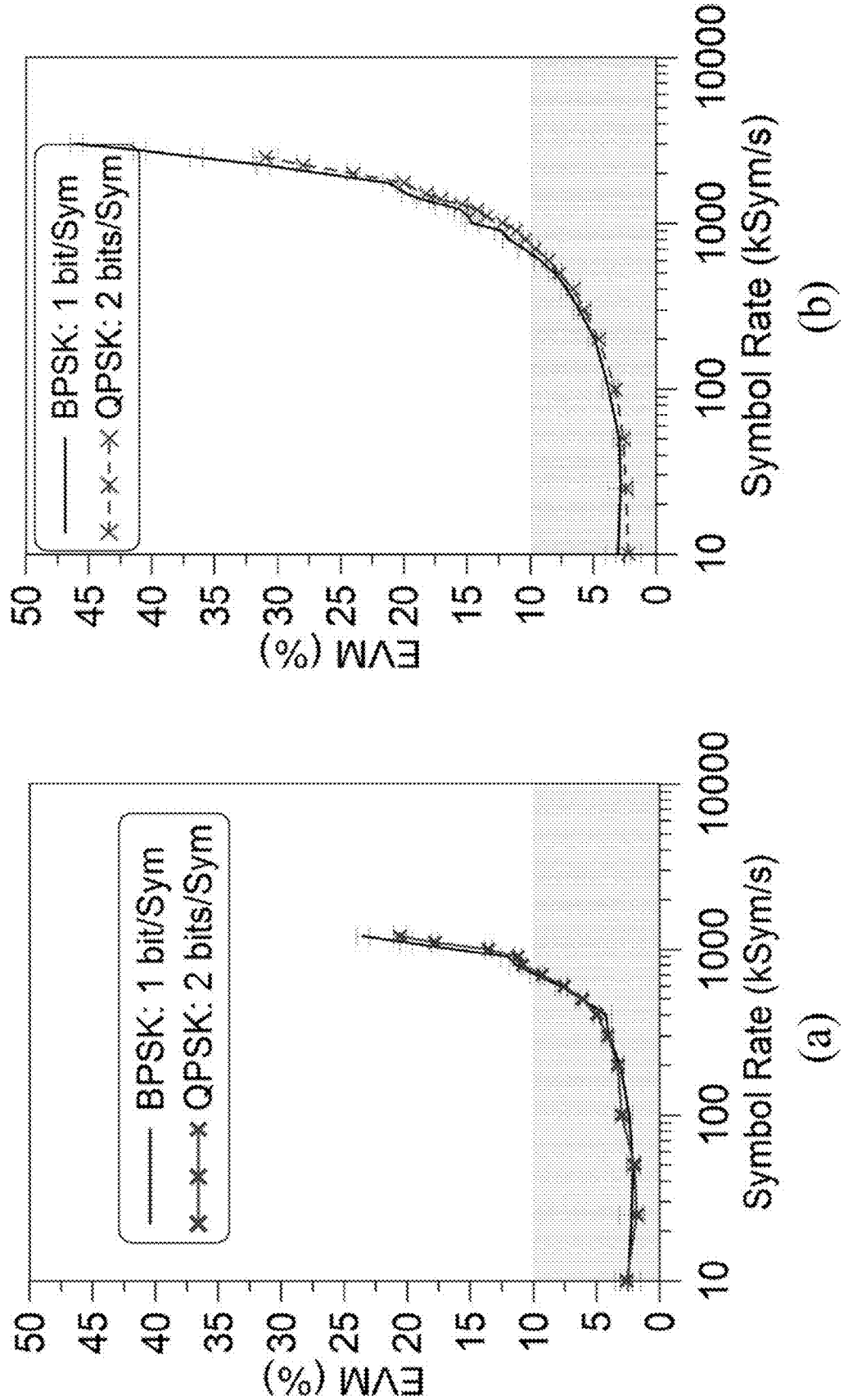
FIG. 10 shows measured EVM for BPSK and QPSK. (a) IF=1 MHz and (b) IF=2 MHz. The bandwidth of both the photodetector and the VSA is 10 MHz.

Next, we transmitted a QPSK signal (an example of an IQ diagram is shown in FIG. 8). The EVM for QPSK versus symbol rate is shown in FIG. 10. We see that the QPSK follows the BPSK results. However, keep in mind that the QPSK transmits 2 bits/symbol, while BPSK transmits only 1 bit/symbol. Here, again, once the period of the IF becomes smaller than the symbol rate, it becomes difficult to detect the phase states of the carrier.

Figure 11:
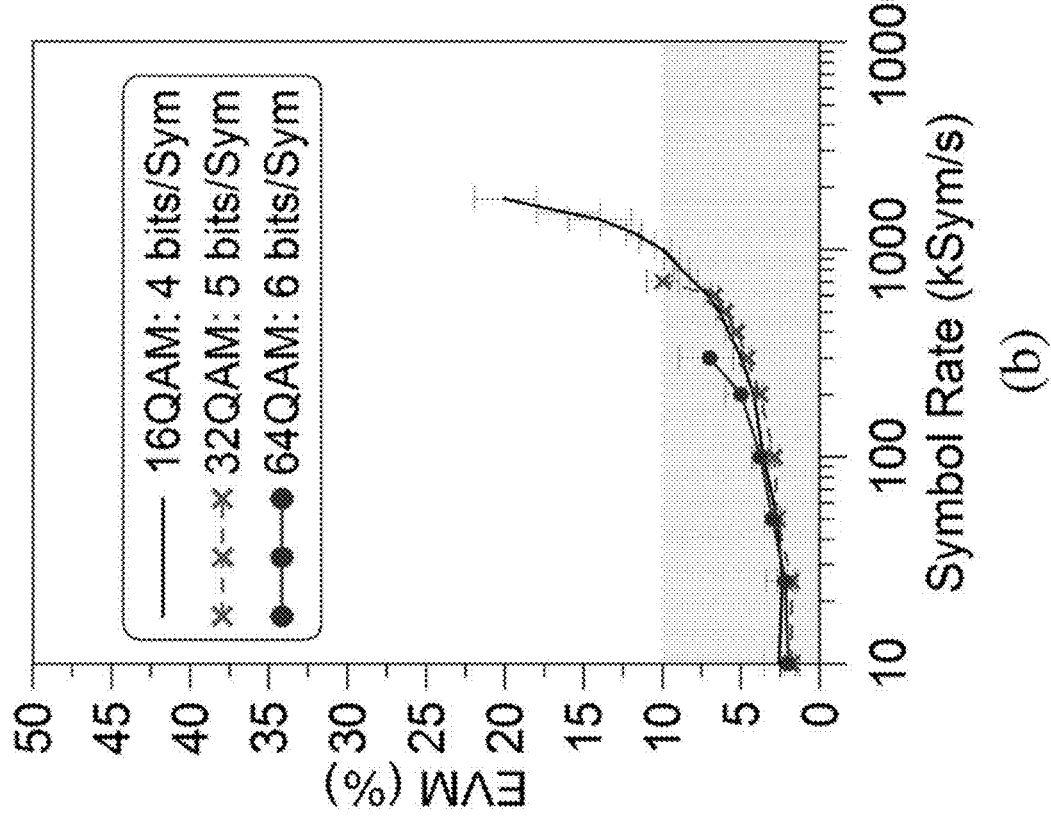
FIG. 11 shows measured EVM for 16QAM, 32QAM, and 64QAM. (a) IF=1 MHz and (b) IF=2 MHz. The bandwidth of both the photodetector and the VSA is 10 MHz.
Figure 11:
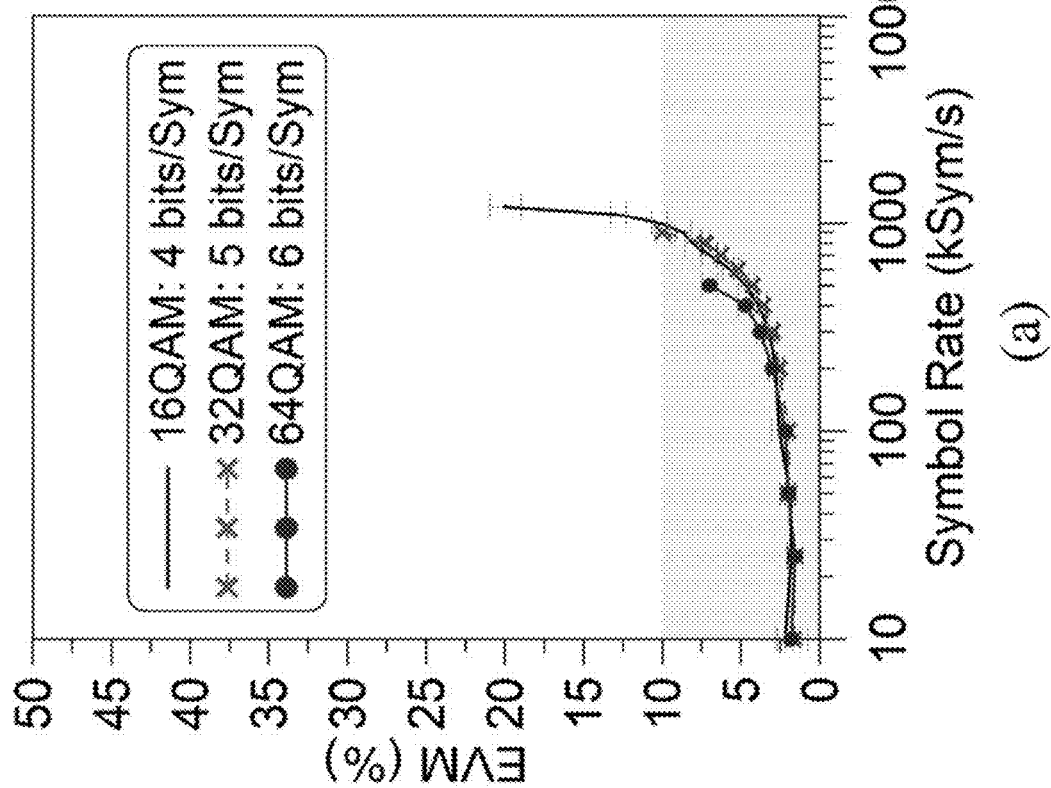

Finally, we transmitted 16QAM, 32QAM, and 64QAM signals (IQ diagrams are shown in FIG. 8). These 16QAM, 32QAM, and 64QAM are actually transmitting 4 bits/symbol, 5 bits/symbol, and 6 bits/symbol, respectively. The EVMs for 16QAM, 32QAM, and 64QAM are shown in FIG. 11. From the IQ diagrams, we see that the phase states for the various QAM schemes become more crowded as the number of bits per symbol increases (i.e., going from 16QAM to 32QAM). As such, a small error in the phase states will affect 64QAM more than 16QAM. This is indicated in the EVM data shown in FIG. 11. The point where 32QAM cannot be received (the right side of the EVM curve where the data stop) occurs at a smaller symbol rate than the point where 16QAM cannot be received, and 64QAM falls off even faster.

While BPSK and QPSK are pure phase-modulation schemes, QAM involves modulation of both the phase and the amplitude. The detected amplitudes from the atom-based mixer drops with higher IF values, and it becomes hard to distinguish changes in the amplitude (required for the QAM scheme), wherein QAM scheme degrades before BPSK and QPSK schemes.

The Rydberg atom-based mixer detects and receives phase and amplitude digital modulation schemes (BPSK, QPSK, 16QAM, 32QAM, and 64QAM). The atom-based mixer detects and receives digital signals as the transmitted symbol rate approaches the bandwidth of the Rydberg atom response, which is around 1-10 MHz (and is likely the limit of the IF that can be used for the Rydberg atom-based mixer). The EVM does increase with symbol rate, though data can be received even for high EVM through the use of error correction techniques. While the advantages of a Rydberg atom-based digital receiver have not been fully explored, the atom-based mixer potentially has many benefits over conventional technologies in detecting and receiving modulated signals that include: no need for traditional demodulation/down conversion electronics because the atoms automatically perform the demodulation for AM and FM signals and automatically down convert the phase-modulated signals to an IF; micrometer-sized antennas and receivers over a frequency range of 100 MHz to 1 THz; no Chu limit requirements as is the case for standard antennas; direct real-time read-out; multiband (or multichannel) operation in one compact vapor cell; electromagnetic interference-free receiving; ultrahigh sensitivity reception from 100 MHz to 1 THz; and the like.

Example 2. Embedding a Rydberg Atom-Based Sensor into an Antenna for Phase and Amplitude Detection of Radio-Frequency Fields and Modulated Signals Rydberg atoms have one or more electrons excited to a very high principal quantum number n, which have many useful properties that scale with n. For example, their large dipole moments (scale as n2) make the atoms sensitive to electric (E) fields, which make them useful for E-field sensors. The re-definition of the International System of Units (SI) that occurred in November of 2018 made it possible to make direct SI-traceable measurements for E-fields using Rydberg atoms. The basic idea uses a technique known as electromagnetically induced transparency (EIT) and Autler-Townes (AT) splitting to detect a radio-frequency (RF) E-field, where the E-field is shown to be directly proportional to Planck's constant, which is exactly defined in the re-definition of the SI.

We demonstrate that by placing an atomic vapor cell inside a parallel-plate waveguide (PPWG) antenna, it serves as a receiver for detecting the phase and amplitude of RF E-field and phase-modulated signals. This embedded atomic-vapor cell allows for the full characterization of an RF field and a modulated signal in one compact sensor, i.e., the integrated sensor can measure amplitude, phase, and polarization.

FIG. 1 shows the Rydberg atom-based mixer that detects amplitude and phase of weak E-fields with subHz frequency resolution. A probe laser is passed through a vapor cell. A second coupling laser establishes coherence between the atomic states, enhancing the probe transmission. This process is called EIT. This transmission is further altered in the presence of an applied RF field. In the Rydberg-atom mixer scheme, two RF fields are involved, a reference field (labeled as "LO") and the field or signal of interest (labeled as "SIG"). The reference RF field at frequency fLO, on-resonance with a Rydberg atomic transition, acts as a local oscillator (LO). Then, the presence of a signal field (SIG) at frequency fSIG creates a beat note in the probe laser transmission, whose amplitude varies as $$T \propto \cos(2\pi f_{IF} t + \Delta\phi), \quad (1)$$

where $\Delta\phi$ is the phase difference between the LO and SIG fields and fIF is the frequency of the beat note, given by $$f_{IF} = f_{SIG} \pm f_{LO} \quad (2)$$

The read-out of the phase of the SIG is performed by monitoring the transmission of a probe laser through the vapor cell. This beat note formed from the LO and SIG fields results in amplitude modulation (AM) of the probe transmission. This AM of the probe laser transmission can be detected with a photodetector and used to determine the phase of the SIG. For a phase modulated carrier, the Rydberg atoms automatically down-convert the carrier to the IF, which contains the phase of the SIG. In effect, the atoms are acting as a down-conversion mixer. The Rydberg atom-based mixer can also be used to detect weak fields with sub-Hz frequency resolution.

While the configuration in FIG. 3 is for the case where both the LO and SIG are applied via the same horn, the LO and SIG can also be applied with two different horns. The problem with both these configurations is that they require the LO to be transmitted alongside the SIG. There are several situations where this is not possible, that is, one may not always be able to have an LO at the same location as the source of the SIG. An example would be trying to receive a transmitted signal (SIG) from a remote location. However, by embedding the vapor cell into a receive antenna (e.g., a PPWG antenna), the receiving antenna can apply the LO while capturing the SIG from a remote location. The embedded sensor allows one to easily vary the LO in order to maximize the beat note signal strength and hence maximize the ability to measure phase and amplitude of the SIG. In this paper, we demonstrate such an embedded atomic sensor and show various results to illustrate its capabilities.

This Rydberg atom based approach provides a quantum direct SI-traceable measurement of an RF E-field and results in a calibrated, absolute measurement of the E-field strength. The Rydberg-atom approach has other applications, including use as a sensor for relative field strength measurements or as a receiver. In these types of applications, absolute measurements of a field are not required. The embedded sensor discussed herein can be used in nonabsolute measurements. The presence of the metal PPWG structure perturbs the field being measured, which diminishes the applicability for absolute E-field strength measurements. The PPWG enhances the ability for the embedded sensor to be used as a receiver and/or as a device for phase-sensitive detection.

Embedding a vapor cell into a passive metallic structure can aid in field enhancement and polarization selectivity. Embedding a vapor cell into a metallic structure allows for a convenient method to apply an LO for phase detection and other applications.

Figure 12:
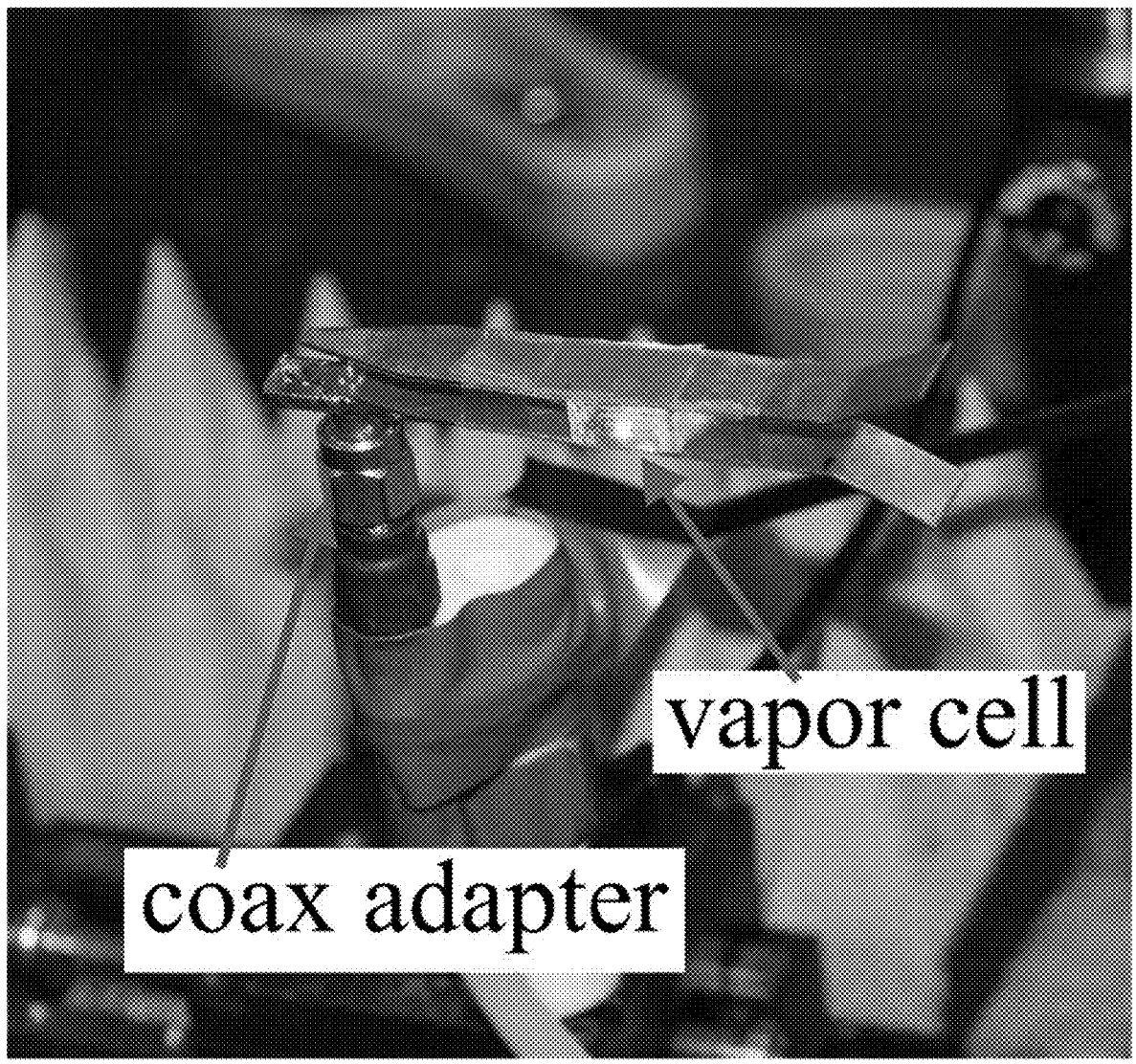
FIG. 12 shows a sensor head; a vapor cell embedded into a PPWG antenna and a coupling laser propagating through the vapor cell. The LO is supplied by the coaxial input, and the SIG is coupled through the flared end.

FIG. 12 shows a photo of the embedded atom-based sensor. It consists of a 4 mm by 8 mm by 10 mm rectangular vapor cell filled with cesium (133Cs) atoms. The vapor cell is embedded into a PPWG antenna. The PPWG antenna has a length of 50 mm, a plate separation of 4 mm, and width of 8 mm. The antenna is flared (flare length of 10 mm and flare angle of 30°) at one end for impedance matching. The other end of the antenna is connected to a coaxial adapter. A continuous wave (CW) field is injected into the antenna via the coaxial adapter, which serves as the LO for the sensor head. The flared end of the antenna is pointed toward the incoming signal to be detected.

The vapor cell is held in place with transparent tape. One can also use epoxy for a more rugged design.

Presence of the dielectric walls of the vapor cell causes internal resonance (or standing waves) of the RF field inside the vapor cell. These standing waves can affect the ability to perform calibrated, absolute measurements of the E-filed strength. However, if the position of the lasers in the vapor cell is fixed, the standing waves will not affect the ability to perform relative field strength measurements or the ability to detect the phase of the field.

The Rydberg atom-based sensor simultaneously measures amplitude and phase, along with polarization selectivity. The atomic-vapor cell could also be embedded in various other types of antenna and waveguiding structures for a wide array of applications ranging from polarization selectivity to weak field detection.

Figure 13:
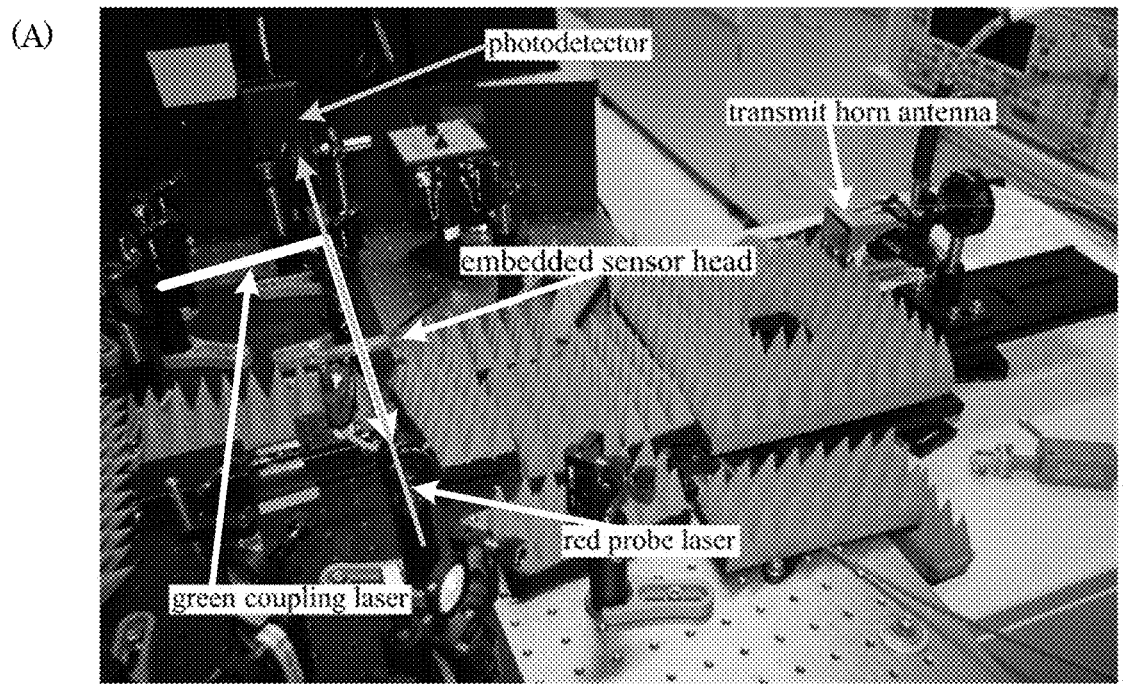
FIG. 13 shows an experimental setup in panels (a) and (b)
Figure 13:
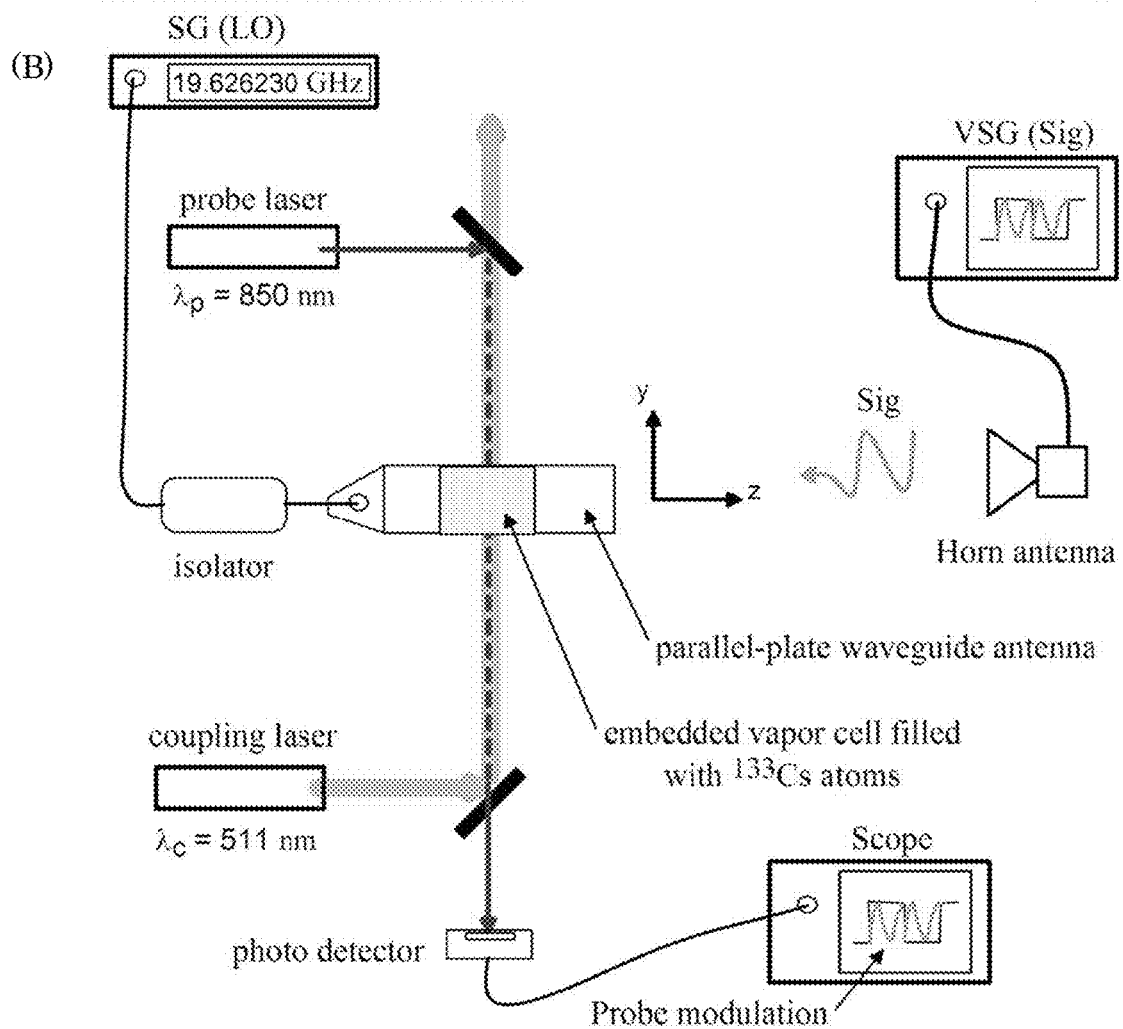

FIG. 13 shows setup for the Rydberg atom mixer that included an 850 nm probe laser, a 511 nm coupling laser, a photo detector, oscilloscope, transmitting horn antenna, and the embedded sensor head (the PPWG antenna with the embedded vapor cell filled with $^{133}$Cs atoms). The horn antenna transmitted a signal to be detected by the embedded sensor. A signal generator (SG) is used to apply the LO) into the PPWG antenna. To generate the SIG field we use a vector signal generator (VSG) connected to the horn antenna. The VSG can supply a CW carrier or various types of digital modulation schemes (amplitude-modulation (AM) and/or phase modulation of a CW carrier). The frequency of the CW SIG field is given in (2), where fLO and fIF are changed during these experiments. An RF isolator is placed between the embedded sensor head and the SG in order to isolate and protect the SG from any energy received from the SIG source.

The probe laser is locked to the D2 transition (or wavelength of λp=852.347 nm[33]) for $^{133}$Cs (corresponding to atomic states $6S_{1/2}$-$6P_{3/2}$) and focused to a full-width at half maximum (FWHM) of 425 μm, with different powers level as selected. To produce an EIT signal, we couple to the $_{133}$Cs $6P_{3/2}$-$34D_{5/2}$ states by applying a counter-propagating coupling laser at λc=511.148 nm (focused to a FWHM of 620 μm). The LO field (around 19.629 GHz) couples the Rydberg states $34D_{5/2}$ and $35P_{3/2}$. The output of the photodetector is connected to an oscilloscope. The beat note is displayed on the oscilloscope and the phase change of the SIG can be determined by the phase change of the beat note.

While we use a frequency around 19.629 GHz in these experiments, carrier frequencies can include from 500 MHz to 1 THz because of the broadband nature of the EIT/AT approach. Accordingly, PPWG is modified for a frequency greater than 37.5 GHz. The PPWG structure provides a transverse electromagnetic (TEM)mode that propagates in the structure for both the LO and SIG frequencies. The PPWG supports a fundamental TEM mode from DC to a frequency that corresponds to a wavelength of 2 h (where h is the separation between the two plates). The PPWG shown in FIG. 12 supports a TEM mode up to a frequency of 37.5 GHz.

For the Rydberg atom-based mixer to accurately measure the phase of the SIG, the phase of both the LO and SIG must be stable with respect to one another over the time-period of the measurement. We use two different methods of stabilization depending on the type of measurement being performed. In the first method, we use a RF mixer to synchronize the LO and SIG when detecting the beat note. The oscilloscope is triggered by mixing the LO and SIG using an RF mixer. This will remove any common phase difference between LO and SIG. This first method is suitable when performing measurements in a laboratory where both the SG and VSG can be co-located and connected. The second method uses two rubidium (Rb) clocks to independently synchronize the LO and SIG, which is suitable when the LO and SIG are not co-located. These two Rb clocks supply a reference signal to both the SG and VSG separately. We use both these methods in the results that follow.

The Rydberg atom mixer includes measuring, (1) the amplitude of E-fields, (2) the phase of a variable phase shifter, (3) the propagation constant of a plane wave in free space, (4) the phase states of phase modulated carriers typically used in communication systems, and (5) the polarization sensitivity of the embedded sensor.

Figure 14:
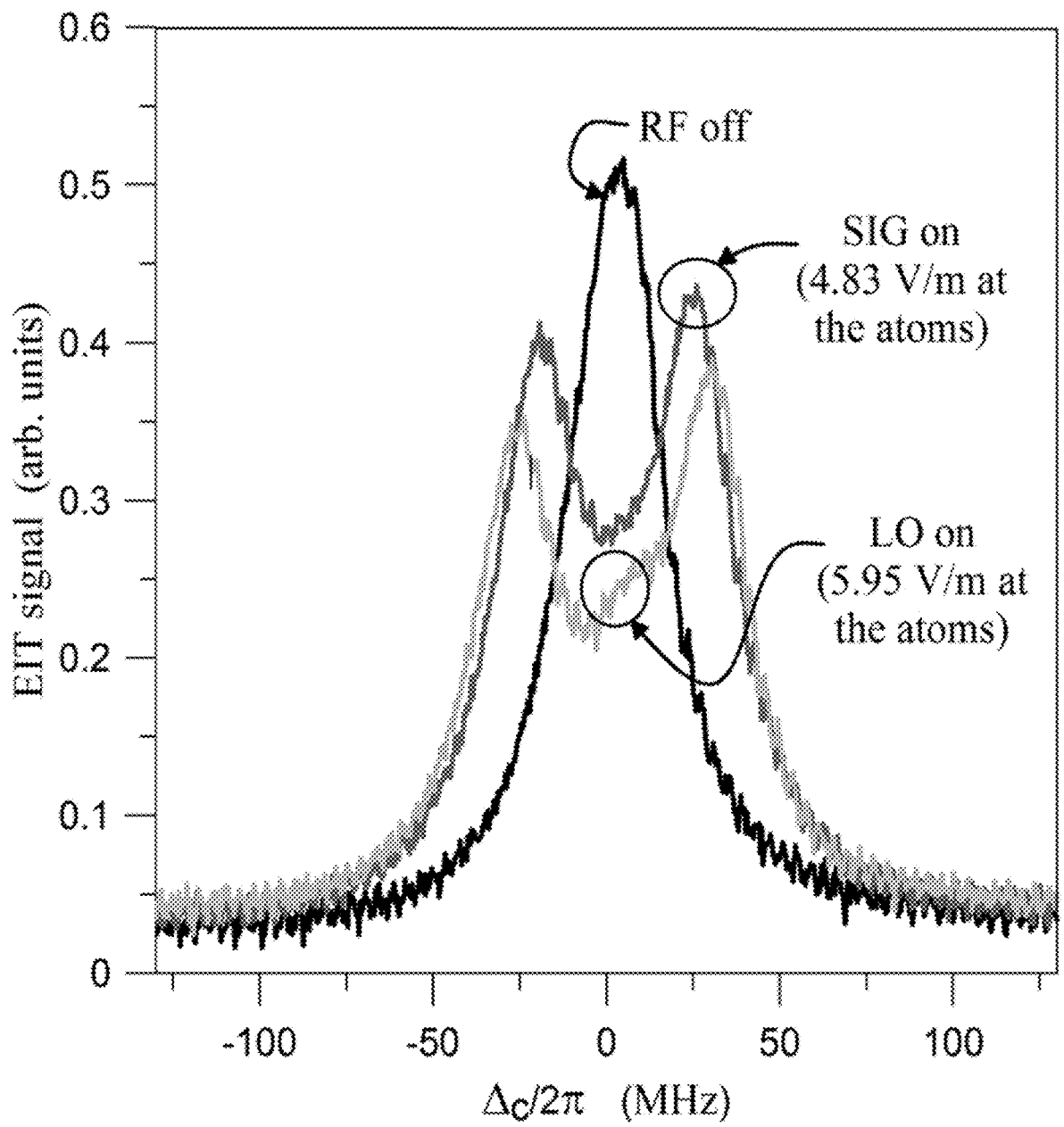

For operation of the embedded sensor, atoms inside the vapor cell respond to E-fields generated by both the LO and the SIG. The E-field strength inside the vapor cell for these two excitations is measured by the EIT/AT approach. FIG. 14 shows the probe transmission through the vapor cell (embedded inside the PPWG antenna as shown in FIG. 12) when a coupling laser is counter-propagating through the vapor cell. To obtain this result, the probe laser power into the vapor cell is 480 µW, and the coupling laser power is 52 mW. The coupling laser frequency was scanned around the $^{133}$Cs 6P$_{3/2}$-34D$_{5/2}$ transition, resulting in an EIT peak (labelled 'RF off' in FIG. 14).

Applying an RF field caused the EIT signal to split, where the splitting is proportional to the magnitude of the applied RF E-field strength. By measuring the splitting ($\Delta f_m$), the magnitude of the applied E-field can be determined by $$|E| = 2\pi \frac{\hbar}{\wp} \Delta f_m, \quad (3)$$

where h is Planck's constant, and $\wp$ is the atomic dipole moment of the RF transition. We apply an RF field at 19.629230 GHz to couple states 34D$_{5/2}$ and 35P$_{3/2}$. A typical AT splitting signal obtained by driving the embedded sensor with the LO is shown in FIG. 14 (labelled 'LO on'). This corresponds to an RF power of −19.7 dBm (measured at the coaxial adapter at the input of the PPWG antenna). An AT splitting signal is also obtained by applying a $f_{SIG}$=19.629000 GHz field using a horn antenna placed 348 mm away from the PPWG antenna (labelled 'SIG on' in FIG. 14). This corresponds to a SIGRF power of −6.1 dBm (measured at the input to the horn antenna). These results illustrate that the embedded sensor can effectively capture RF E-fields from external sources.

Also shown in FIG. 14 is the calculated E-field strength from (3), which requires a calculated value of $\wp$. Calculating p involves a numerical solution to the Schrödinger equation for the atomic wavefunctions, and then a numerical evaluation of the radial overlap integrals involving the wavefunctions for a set of atomic states. For a given atomic state, these numerical calculations require one to use the quantum defects (along with the Rydberg formula) for the $^{133}$Cs. For this measurement, the dipole moment for the resonant RF transition is calculated to be $\wp$=723.4 ea0 (which includes a radial part of 1476.6 ea0 and an angular part of 0.48989, which correspond to co-linear polarized optical and RF fields, where e is the elementary charge and a$_0$ is the Bohr radius:a$_0$=0.529177×10$^{-10}$ m).

Figure 15:
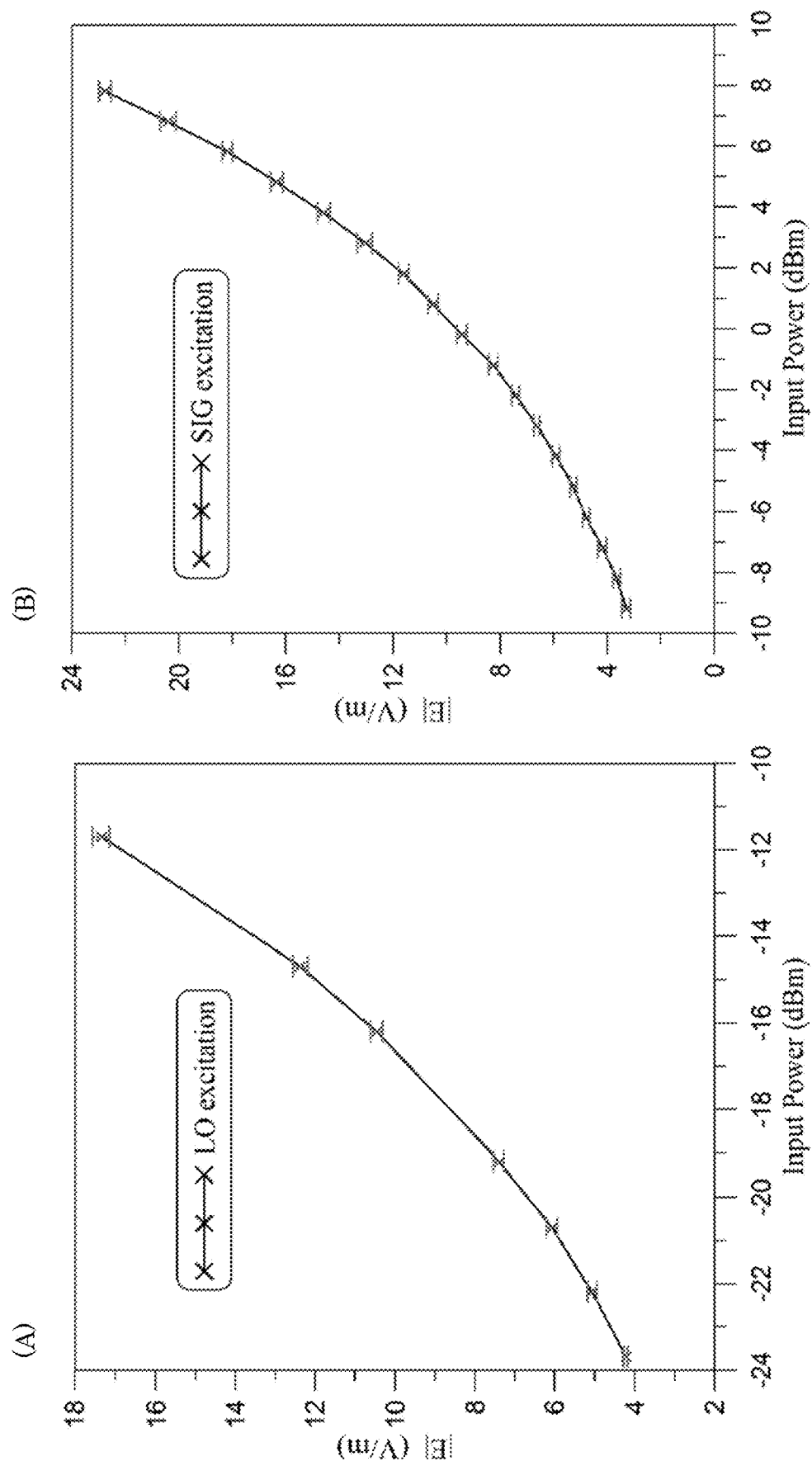
FIG. 15 shows measured E-field with the embedded sensor as a function of input power. The power level corresponds to input power to the parallel-plate antenna (for the LO case) or the input power to the horn antenna (for SIG case): (a) LO and (b) SIG. The error bars represent the standard deviation of ten measurements.

FIG. 14 shows the measured E-field for different input power levels for the two different source excitations (for both the LO and from the SIG generated from the horn antenna). The results in this figure are obtained by measuring $\Delta f_m$ and using (3). The power levels on the x-axis of the plot correspond to the input power to the parallel-plate antenna (for the LO case) or the input power to the horn antenna (for SIG case). The results in FIG. 14 and FIG. 15 illustrate that the embedded sensor can effectively respond to E-fields generated by either the LO or the SIG. The errors and uncertainties of these types of measurements are related to the EIT/AT detection scheme.

As stated above, RF standing waves do exist inside the vapor cell. Here the measurements represent the field strength at the atoms, including the effect of the vapor cell walls and standing waves. Since during the experiments, the laser positions are fixed at a location inside the vapor cell, these standing wave effects will not affect the phase and relative amplitude measurements presented here.

Figure 16:
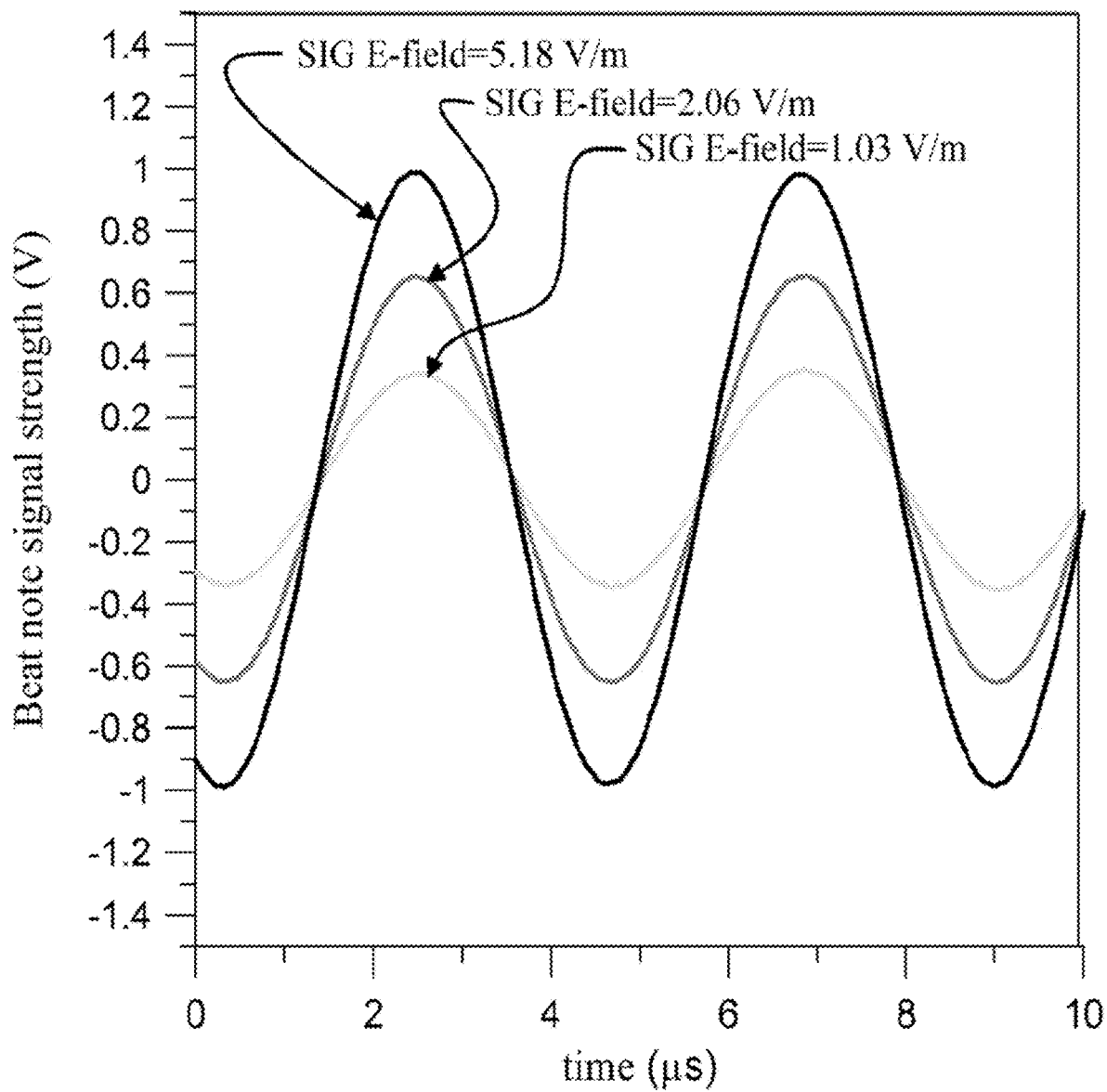
FIG. 16 shows a beat note signal measured on an oscilloscope. These data are for an LO field of 6.14 V/m and three different SIG field levels, with frequencies fLOb=19.629230 GHz and fSIG=19.629000 GHz (for an fIF=230 kHz). Each curve corresponds to 5 averages.

The amplitude of the beat note is a function of the LO and SIG E-field strength. FIG. 16 shows the beat note signal for the embedded sensor measurement from the photodetector for $f_{LO}$=19.629230 GHz and $f_{SIG}$=19.629000 GHz (or $f_{IF}$=230 kHz). This data is for a given LO strength and different SIG strengths. The measured data clearly show the 230 kHz cosine behavior of the beat note signal as a function of time. We use the relative amplitude of the beat note to investigate the polarization sensitivity of the embedded sensor.

Figure 17:
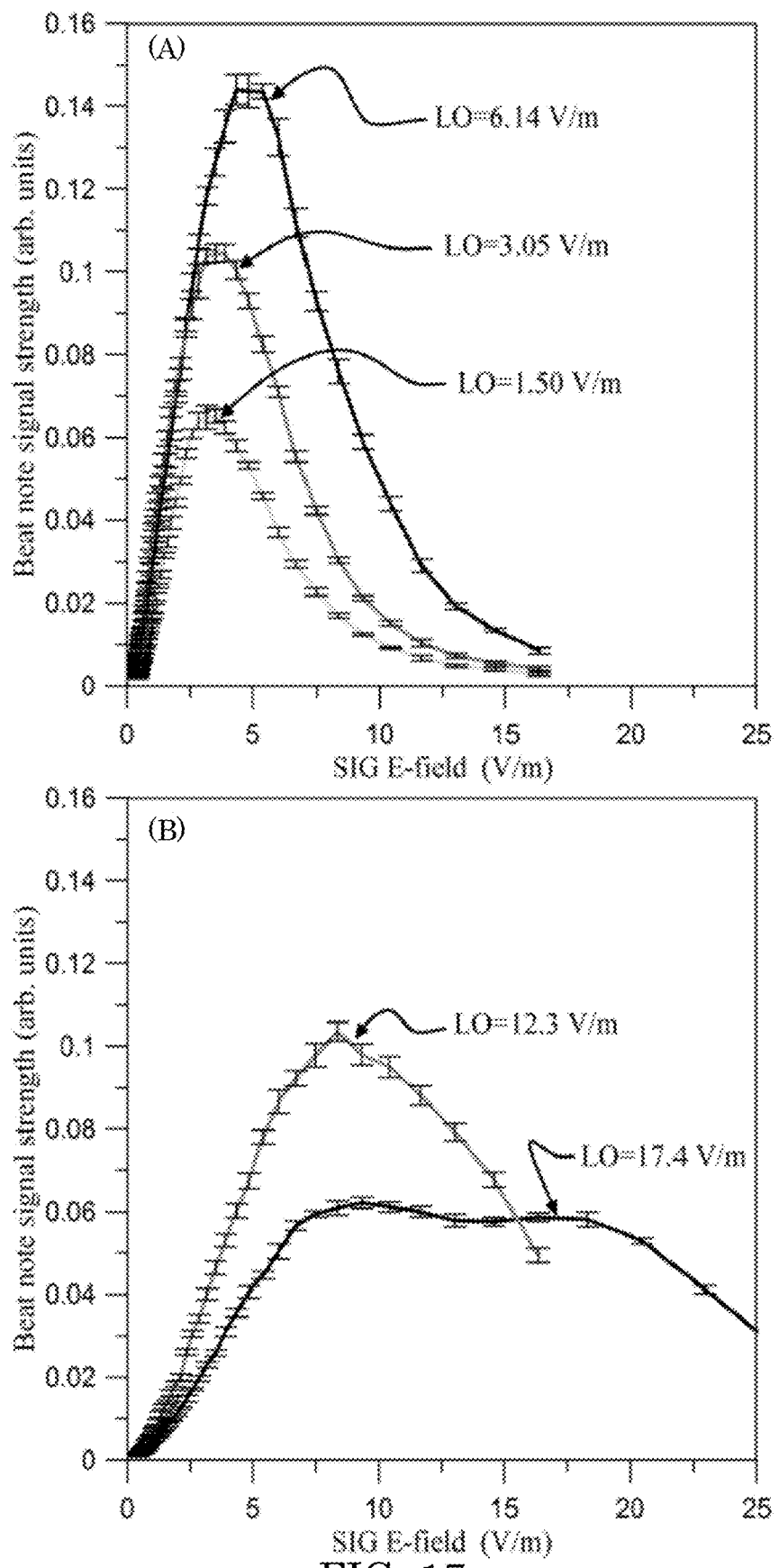
FIG. 17 shows an amplitude of the beat-note signal as a function of field strength for both the LO and SIG signal. These data are for fLO=19.629230 GHz and fSIG=19.629000 GHz (or fIF=230 ktHz): (a) no AT splitting on the EIT signal and (b) AT splitting on the EIT signal. The error bars represent the standard deviation of five measurements.

The beat note amplitude is a non-linear function of the E-field for both the LO and SIG, where the E-field strength seen by the atoms is given by $$|E_{atoms}|=\sqrt{E_{LO}^2+E_{SIG}^2+2E_{LO}E_{SIG}\cos(2\pi f_{IF}t+\Delta\phi)} \quad (4)$$

where E$_{LO}$ and E$_{SIG}$ are the E-field strengths of the LO and SIG, respectively. FIG. 17 shows a family of curves for the beat note amplitude obtained for the embedded sensor. Here we use an RF mixer for LO and SIG synchronization.

There is a minimum RF field level that is required before the splitting shown in FIG. 14 occurs. When an RF-field strength is increased from zero, the amplitude of the EIT signal decreases and its line width broadens before the EIT signal splits into two peaks. FIG. 17a corresponds to the situation where the E-field strength for the LO is weak enough such that splitting does not occur. From this figure, we see the beat note strength has a maximum for a given ratio of LO and SIG field strengths. When the strength of the LO and SIG are such that AT splitting occurs, the probe laser must be frequency tuned to be on-resonance with a split AT peak. As the LO or SIG field strength increases further, the probe laser frequency must be further tuned to maintain resonance with an AT peak for maximum beat note signal strength. The results of the beat note under this situation is shown in FIG. 17(*b*). In FIG. 17(*a*) the lasers are locked to the maximum of the EIT peak, while in FIG. 17(*b*) the field strengths are such that the EIT signal splits, and the probe laser frequency was tuned to one of the AT peaks. The error bars on FIG. 17 represent the standard deviation from five sets of experiments, indicating good repeatability of the measurement. The errors and uncertainties associated with these measurements are mainly due to laser power and laser frequency stability.

For a given LO field strength, there is an optimal SIG field strength to obtain the largest beat note amplitude. This is especially true when operating in the non-A-splitting situation (i.e., $\Delta_c$=0). When operating in the AT-splitting situation, one can track an AT peak using the probe laser frequency to find the maximum beat note amplitude. When the AT peaks split such that there is no overlap between the AT peaks at zero coupling laser detuning (the center of FIG. 14), the maximum beat note is found when the probe laser is tuned to the side of the AT peak, rather than the top of the peak. Note in FIG. 17(*b*) that the 'LO=17.4V/m' trace has two maxima one for the probe laser frequency on one side of the AT peak, and a second for when the SIG field strength further splits the AT peaks such that the probe laser frequency is on the other side of the AT peak. There is a slight dip in beat note signal strength when the probe laser frequency sits on the top of the AT peak.

One advantage of having the vapor cell embedded inside the PPWG antenna (as opposed to having the LO and SIG transmitted from the same location) is that it allows one to easily change the LO field at the atoms by varying the input power to the PPWG antenna. That is, the embedded sensor head allows one to easily vary the LO E-field to find the optimal value for the LO/SIG ratio in order to maximize the beat note signal strength.

The atom-based embedded sensor measure phase of an RF field by using the sensor to measure the phase shift introduced by a variable phase shifter. For this set of data, we use the configuration shown in FIG. 13 with the exception that a variable phase shifter was placed between the VSG and the horn antenna. This allows us to vary the phase of the SIG that is feeding the horn antenna. For various settings on the variable phase shifter, the phase shift (relative to the RF mixer-synchronized signal) was measured with the embedded sensor. For each setting, the variable phase shifter was removed from the experimental set up and connected to a vector network analyzer (VNA) such that the phase shift introduced by the variable phase shifter can be measured independently.

Figure 18:
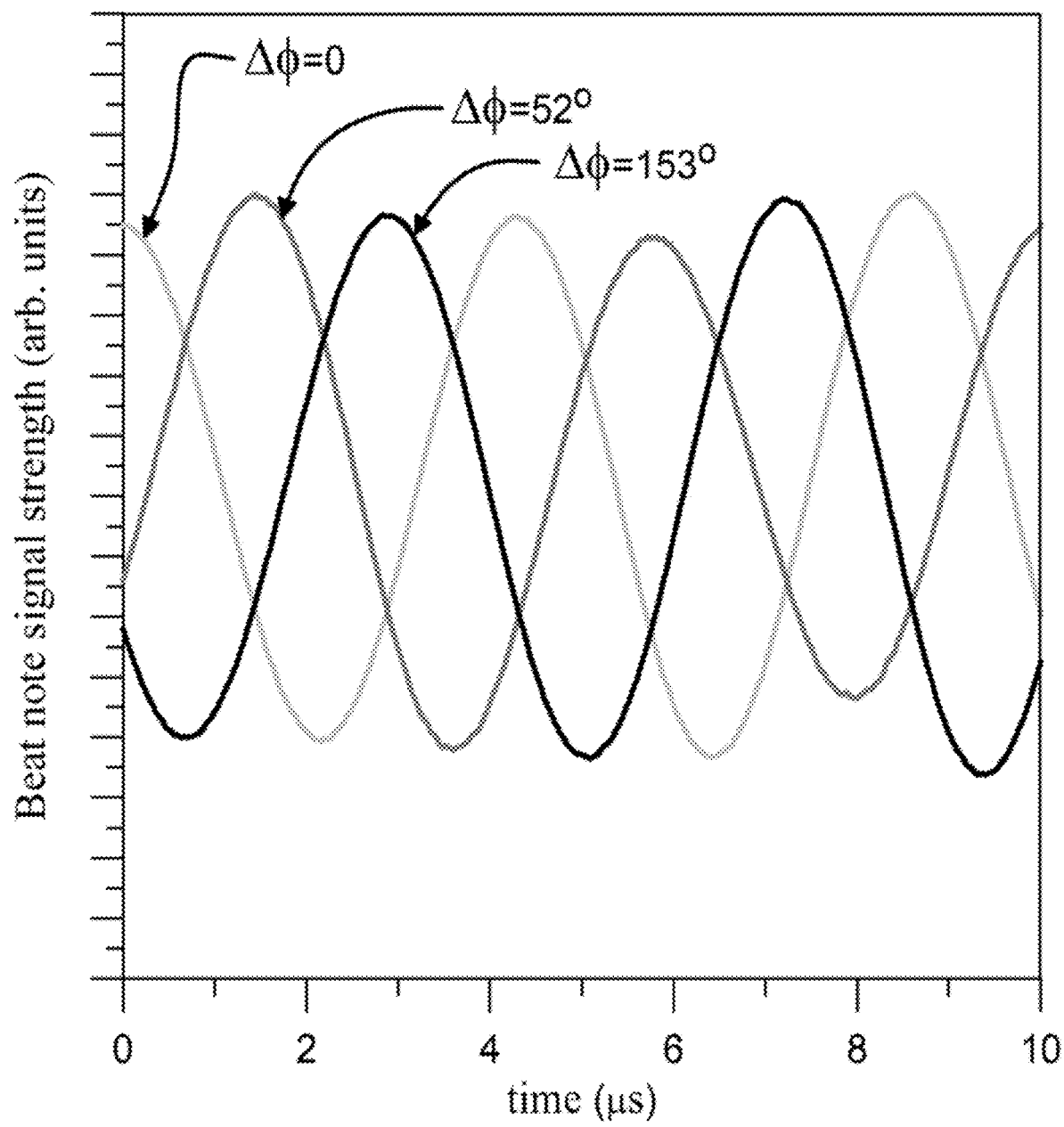
FIG. 18 shows a measured beat note on the oscilloscope for different phase shifts of the SIG field, for fLO=19.629230 GHz and fSIG=19.629000 GHz (fIF=230 kHz). Each curve corresponds to 5 averages.
Figure 19:
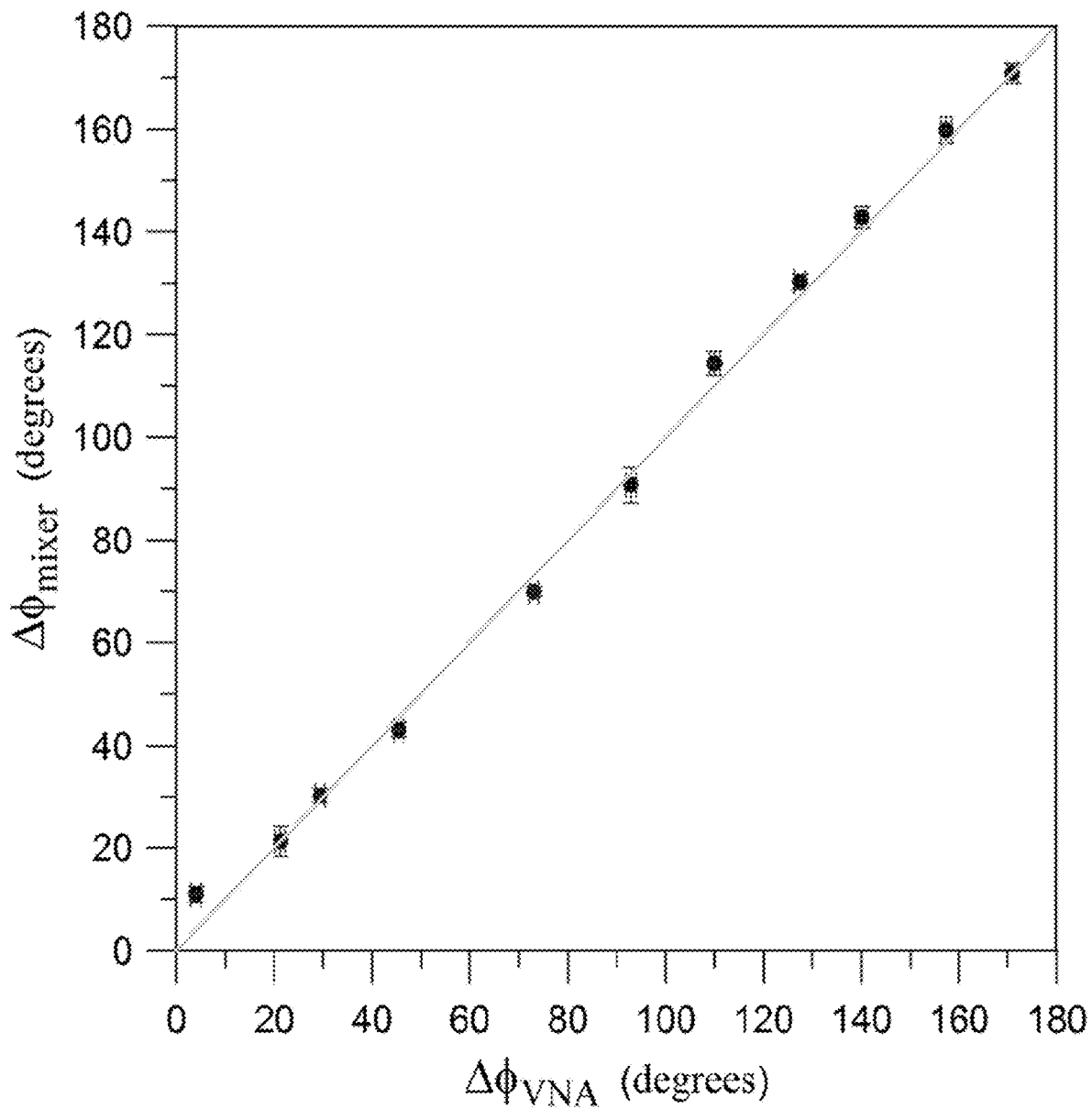
FIG. 19 shows measured phase of the variable phaser shifter, for fItO=19.629230 GHz and fSIG=19.629000 GHz (fIF=230 kHz)

FIG. 18 shows the beat note measured on the photodetector for three different phase shifts of the SIG field. The cosine variation of the beat note is clearly observed in this figure. FIG. 19 shows the phase measured with the embedded sensor versus the phase measured with the VNA. Also plotted is a line representing $\Delta\varphi_{mixer}=\Delta\varphi_{VNA}$. We see that the data falls along this line, indicating a one-to-one correspondence between the two measured phase values, i.e., the phase obtained from the embedded sensor is the same as the phase measured with the VNA. The error bars in the data correspond to performing five separate measurements, illustrating the repeatable of the measurement. Notice that each phase measurement is fairly precise, in that the error bars are small. The standard deviation indicates that the phase is measured to within 2°. However, data from each phase measurement do not lie exactly on the line. This is due to that fact that the variable phase shifter was disconnected from the experimental setup each setting and measured on the VNA. The act of connecting and disconnecting the phase shifter results in a small phase change due to the connectors (repeatability of the act of connecting and disconnecting the device). With that said, we see the embedded sensor does an excellent job of measuring phase when compared to the VNA measurements.

Figure 20:
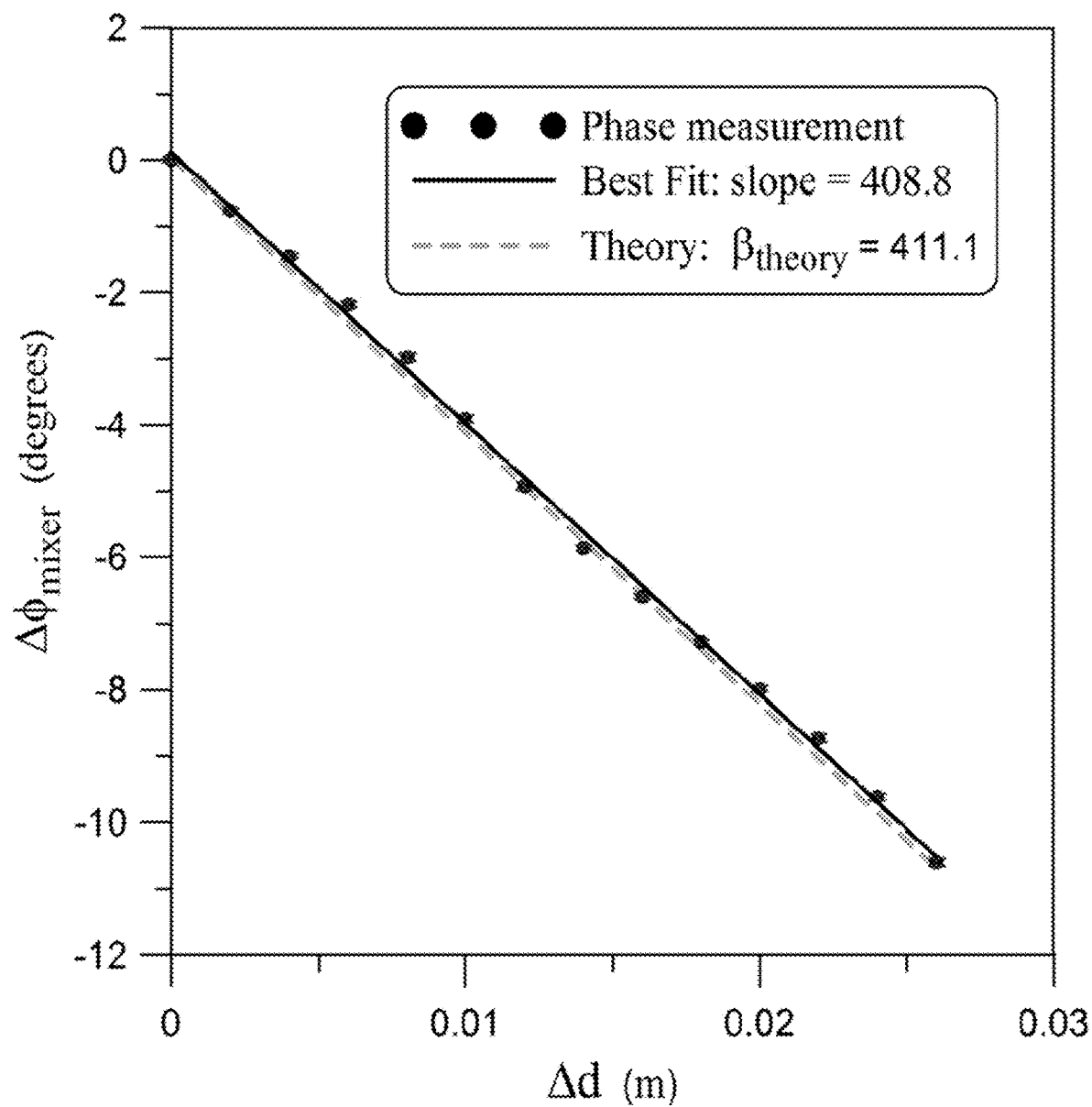
FIG. 20 shows a measured propagation constant (Δφ/Δd), for fLO=19.629230 GHz and fSIG=19.629000 GHz (fIF=230 kHz)

The propagation constant for a 19.629000 GHz wave in free space is measured with the embedded sensor. We use the configuration shown in FIG. 13 with the exception that the horn antenna is placed on a translation stage such that the horn antenna could be placed at different distances from the embedded sensor. The phase of a 19.629000 GHz CW SIG at various locations of the horn antenna is measured with embedded sensor for $f_{LO}$=19.629230 GHz (where $f_{IF}$=230 kHz). FIG. 20 shows the measured phase change ($\Delta\varphi$) versus the change in the location of the horn antenna ($\Delta d$). Also shown in this figure are the error bars representing the standard deviation for ten data runs. The slope of the data is the propagation constant of free space ($\beta_{measured}=\Delta\varphi/\Delta d$) and is determined to be $\beta_{measured}$=408.8 rad/s (also shown in the figure). The theoretical value is $\beta_{theory}=2\pi f_{SIG}/c$=411.1 rad/s (also shown in the figure), where c is the speed of light in vacuo. The percent difference in the measured and theoretical values of β is 0.6%. In this case, errors are mainly due to uncertainty in the positioning and alignment of the SIG horn.

This embedded atomic sensor can be a communications receiver, Here, the Rydberg atom-based RF sensor detects RF signals on carriers from 500 MHz up to 1 THz for high-frequency communications. Here, results include detecting phase-modulated carriers by transmitting BPSK (binary phase shift keying) and QPSK (quadrature phase shift keying) modulated signals and receiving them with the embedded Rydberg atom sensor. In BPSK and QPSK, information (bits) are encoded onto a CW carrier by changing the phase of the CW carrier in a given symbol. BPSK uses two different phase states to transmit data, in which the carrier frequency phase is changed between 0° and 180°. Each phase state represents one transmitted symbol and each symbol is mapped into bits "1" or "0". In QPSK, each transmitted symbol (or phase state) is mapped into two bits. This is done by choosing one of four possible phases applied to a CW carrier: 45° (binary state "00"), 135° (binary state "01"), −45° (binary state "10"), and −135° (binary state "1 L"). To demonstrate the reception of BPSK and QPSK with the embedded sensor, we use the same experimental setup shown in FIG. 13, with the exception that the oscilloscope is replaced with a vector signal analyzer (VSA). The VSA can detect the phase state of a down-converted signal and hence recover the phase-state of the modulated carrier. For these measurements, the LO and SIG were synchronized with Rb clocks.

Figure 21:
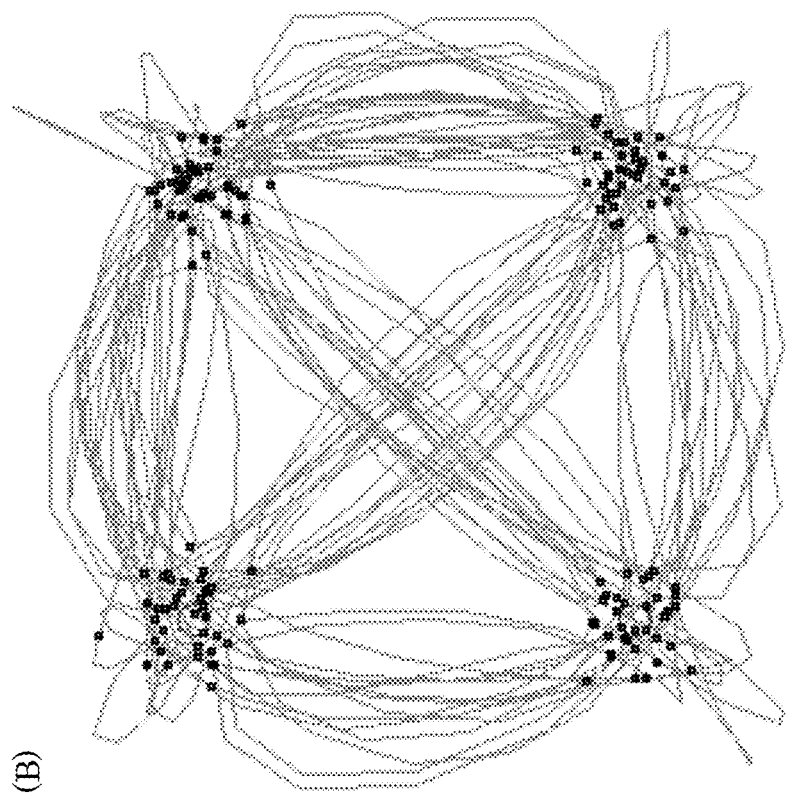
FIG. 21 shows a receiver constellation diagram for a 2047 symbol stream. These data are for fLO=19.6290 GHz and fSIG=19.6295 GHz (or fIF=500 kHz): (a) BPSK and (b) QPSK.
Figure 21:
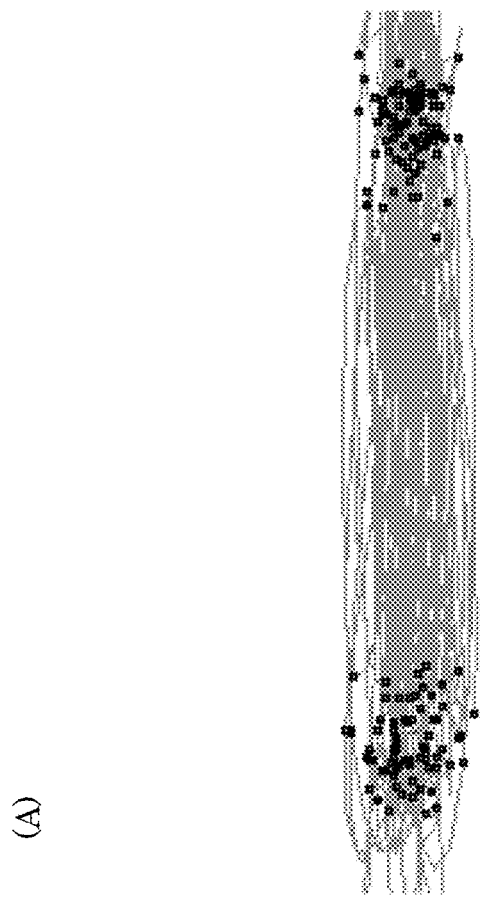

An in-phase and quadrature (IQ) constellation diagram is used to represent the phase states for a large number of transmitted symbols. FIG. 21(*a*) shows the constellation diagram received with the embedded sensor for a BPSK modulation scheme for a stream of 2047 symbols. For these results we used $f_{LO}$=19.6290 GHz and $f_{SIG}$=19.6295 GHz (or $f_{IF}$=500 kHz). The scatter plot on the right side of FIG.

11(a) corresponds to the reception of a phase state of 0° (or a binary state of 1), and the scatter plot of the left correspond to the reception of a phase state of 180° (or a binary state of 0).

FIG. 21(b) shows the constellation diagrams for a QPSK modulation scheme for a stream of 2047 symbols. The grouping of the data is the four quadrants correspond to the reception of four possible phase states (45°: binary state "00", 135°: binary state "01", −45°; binary state "10", and −135°: binary state "1"). These results show that the embedded sensor can detect and receive typical phase modulated carrier signals used in conventional communication systems. One of the advantages of the Rydberg atom-based receiver is that the atoms automatically down-convert the SIG modulated carrier to the IF (and convert it to an optical signal as the amplitude of the probe laser transmission) without any conventional down-conversion electronics.

Figure 22:
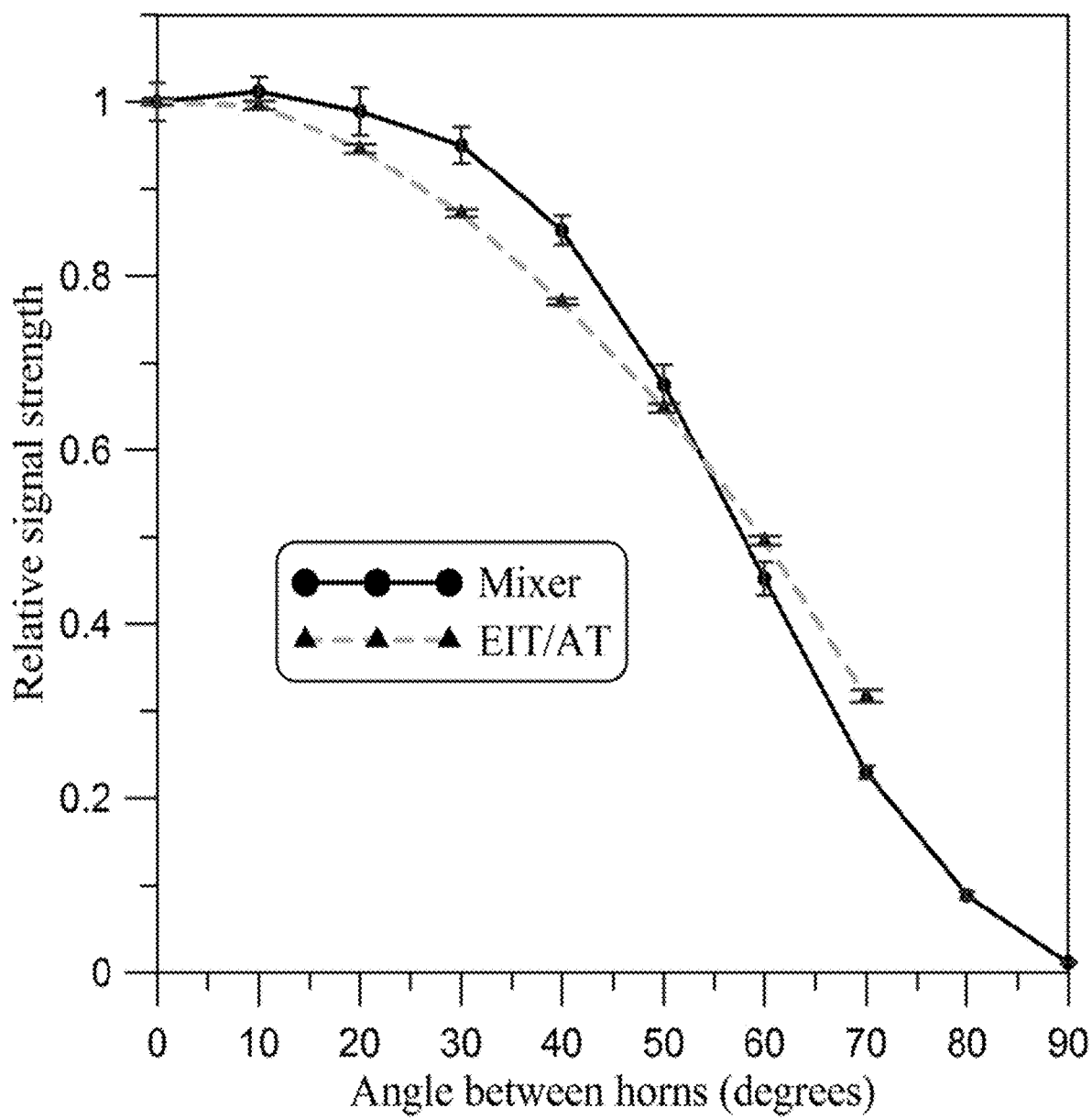
FIG. 22 shows polarization sensitively: The relative field strength as the horn antenna is rotated from the x-axis to the y-axis, for fLO=19.629230 GHz and fSIG=19.629000 GHz (or fIF=230 kHz). The horn antenna is placed 358 mm from the embedded sensor head.

The embedded sensor has an inherent polarization selectivity feature due to the geometry of the PPWG antenna. The PPWG antenna (and hence the embedded sensor head) is more sensitive to an x-polarization E-field [where the x-axis points from one plate to the other, see FIG. 13(b)] and rejects E-field polarized in the y-direction [where the y-axis points along the axis of the lasers, see FI[G. 13(b)]. In this PPWG structure, the vapor cell always sees an x-polarized RF field, so the RF field is always co-polarized with the laser fields at the atoms. FIG. 22 shows the measurement of the relative E-field obtained with the embedded sensor for a transmitting horn antenna rotated relative to the x-axis (i.e., a x-polarized E-field to a y-polarized E-field). The bottom axis of the plot corresponds to the angle of the horn antenna relative to PPWG antenna, where an angle of 0° corresponds to the antenna horn and the parallel-plate antenna being co-polarized (i.e., both polarized in the x-direction) and a degree of 90° corresponds to the cross-polarized case (the antenna horn polarized along the y-axis). Also shown in this figure are the error bars for ten set of data, which indicate that the E-field is measured to within 1% for this case.

The results in this figure show two different methods for determining the E-field. The dash curve are results obtained from measuring the EIT/AT splitting [i.e., eq. (3)]. The solid curves correspond to the results using the beat note amplitude obtained using the atom mixer. The amplitude of the beat note signal decreases as the horn antenna is rotated from the x-axis to the y-axis. Note the two approaches have different dependence on the angle. The measured AT-split is dependent on the strength of the incident RF field that enters the PPWG, which follows a cosine dependence on the angle between the antennas. While in the case of the mixer, the strength of the beat note signal is a more involved function of the strength of the incident RF field (4). This comparison shows the polarization selectivity of the embedded sensor/atom system. The results also show that the mixer method for determining the E-field can measure a much smaller E-field strength than that using the EIT/AT method. The error bars in FIG. 22 correspond to the standard deviation of 10 data sets, indicating the repeatability of the technique. Here the errors are again mainly due to uncertainty in the positioning and alignment of the SIG horn.

Results in FIG. 22 are a relative field measurement as a function of angle. While the EIT/AT method can obtain absolute E-field measurements, the mixer approach can include calibration. The EIT/AT approach can calibrate the mixer approach.

The Rydberg atom-based embedded sensor includes of an atomic vapor cell embedded in a parallel plate waveguide antenna. This atomic embedded sensor allows for the measurement and detection of both the amplitude and phase of an RFCW field as well as modulated signals. We show several examples illustrating the capability of this embedded sensor. The embedded atomic sensor measures magnitude, phase, and discriminates polarization of an RF field, in one compact quantum-based sensor head. By embedding the atom system in a waveguide to apply an LO (this combined system has not been done before), we are able to control the RF LO field at the atoms, which allows us to control the properties of the atom-based mixer and maximize the ability to measure phase and amplitude of the field or receive a modulated signal.

Rydberg atom-based sensors can perform direct calibrated measurements or can be a receiver, where absolute field values are optional. For a non-invasive sensor with minimal influence on the E-field (i.e., for use as direct calibrated measurement), an embedded sensor has metal of the PPWG that could perturb the field being measured, and the PPWG embedded sensor could introduce an additional calibration step for absolute field measurements as compared with a bare vapor cell, whereas, an embedded sensor can be used for receiver applications.

The Rydberg atom-based sensor is different from electronic components in a conventional RF receiver. As such, different performance metrics compare these two systems. Rydberg atom-based receivers and sensors have advantages over conventional radio technologies, that include: (1) micron-size sensors over a frequency range of 500 MHz to 1 THz, (2) multiband (or mutli-channel) operation in one compact vapor cell, (3) being less susceptible to noise, (4) ultra-high sensitivity reception from 500 MHz to 1 THz with sub Hz frequency resolution, and (5) no conventional down-conversion electronics because atoms automatically down-convert the phase modulated signals to an IF. Furthermore, the Rydberg atom-based receiver is less affected by spoofing, jamming, and noise compared to conventional systems. The atom-based receiver interacts with noise in a different manner than conventional systems and as such can be less susceptible to noise. While the bandwidth of Rydberg-atom receivers/sensors depend on the Rydberg state chosen, the bandwidth is connected to response time of the atomic transition, which is on the order of 10 MHz.

The embedded atomic sensor can be fiber-coupled for measurements. In the Rydberg atom-based sensor embedded in a PPWG, the atomic vapor cell can be integrated inside other waveguiding and antenna structures.

Example 3. A Rydberg Atom-Based Mixer: Measuring the Phase of a Radio Frequency Wave A spectroscopic approach for radio-frequency (RF) electric (E) field measurements includes electromagnetically induced transparency (EIT) and Autler-Townes (AT) splitting to create a direct International System of Units (ST) traceable, self-calibrated measurement of an RF E-field amplitude. Rydberg atoms are very sensitive to RF fields due to their large dipole moments over a broad frequency range, from MHz to THz. Rydberg atoms extend the frequency range and sensitivity of RF electric field amplitude and polarization measurements but conventionally have not been used for RF phase measurements. The Rydberg-atom based sensor herein is a compact receiver and antenna for detecting modulated signals and is applicable to communication applications and detection and reception of BPSK/QPSK/QAM digital communication signals with measurement of phase of an RF field. Other applications such as near-field antenna metrology and radar are provided via phase measurement.

The Rydberg atom mixer herein can be a quantum-based E-field sensor, wherein Rydberg atoms measure the phase of an RF field. Inclusion of phase measurements allows the Rydberg atom system to fully characterize an RF E-field in a single quantum-based sensor. This technique relies on using the atom system as a Rydberg atom-based mixer. Applying an RF field that is on-resonance with the Rydberg transition acts as a local oscillator ("LO" in FIG. 1), that causes the EIT/AT effect in the Rydberg atoms to demodulate a second, co-polarized RF field (labeled "SIG" in FIG. 1). The difference frequency, or intermediate frequency (IF), is detected by optically probing the Rydberg atoms (FIG. 1). The phase of the IF signal corresponds directly to the relative phase between the LO and RF signals. This technique can be applied over the same frequency range as E-field amplitude measurements, resulting in an atom-based sensor that can measure amplitude, polarization, and now phase for fields from 500 MHz to 1 THz in a single setup.

Rydberg atoms detect and measure RF E-fields through the use of two related optical phenomena. EIT occurs when a laser field (probe field) that is on-resonance with an atomic transition and normally be absorbed by an atomic vapor is instead transmitted in the presence of a second laser field (coupling field), which is tuned to another atomic transition. This occurs over a very narrow frequency range. When a third electromagnetic field, tuned to another linked atomic transition, is present, the original transparency region is split into two regions separated in frequency (AT-splitting). The frequency separation is directly related to the strength of the third RF field (typically an RF field).

In this work, an atomic vapor cell is filled with cesium ($^{133}$Cs) atoms. FIG. 2 shows a Rydberg atom mixer, wherein a probe laser is tuned to a wavelength of 852 nm to excite $^{133}$Cs from the ground state to the first excited state ($6S_{1/2} \to 6P_{3/2}$). The coupling laser is counter-propagated through the probe laser and tuned to 511.148 am, coupling the excited state to the Rydberg state $34D_{5/2}$, and creating EIT in the probe laser, increasing the transmission through the vapor cell. The probe laser has a full-width at half-maximum (FWHM) of 425 µm and a power of 49 µW. The coupling laser has a FWHM of 620 µm and a power of 60.6 mW. Applying an RF field of 19.626 GHz causes a transition of $34D_{5/2} \to 35P_{3/2}$, producing AT-splitting.

With the probe laser frequency fixed at the first excited state transition frequency, the transmission through the vapor cell is reduced. The interference of two RF fields can then be detected by the effect on the EIT/AT splitting. By setting the probe laser frequency to the center of the EIT peak, the probe laser transmission is modulated by the interference between the two RF fields. If one of the RF fields is detuned from the other, the beat note can be observed in time in the transmission. This effect is demonstrated by placing two standard gain horn antennas 12 cm from the Cs vapor cell (FIG. 2). One antenna is fed by a signal generator set to $f_{LO}$=19.626 000 GHz to act as the LO. Another signal generator feeds the second antenna to provide the second RF signal, $f_{SIG}$. The two signal generators are connected to a rubidium (Rb) clock with 10 MHz signal. The synchronization signal does not have to be physically connected if each signal generator is connected to atomic clocks that were previously synchronized, allowing the LO and Rydberg atom systems to be physically separated from the SIG signal.

The total electric field in the vapor cell (~$E_{atoms}$) is the sum of the LO and SIG fields ($E_1$ and $E_2$). For two co-polarized fields, this is the scalar total $E_{atoms}=E_1+E_2$. We define the LO and SIG fields as $E_1 = E_{LO} \cos(\omega_{LO} t + \emptyset_{LO})$ and $E_2 = E_{SIG} \cos(\omega_{SIG} t + \emptyset_{SIG})$. Assuming that the difference between the two frequencies $\Delta\omega = \omega_{LO} - \omega_{SIG}$ is much less than the average frequency $\omega = (\omega_{LO} + \omega_{SIG})/2$, such that $\Delta\omega \ll \omega$, then we can express the total field $E_{atoms}$ as $$E_{atoms} = E_1 + E_2 \tag{1}$$

$$= \cos(\omega_{LO} t + \varphi_{LO}) \cdot \sqrt{E_{LO}^2 + E_{SIG}^2 + 2E_{LO}E_{SIG}\cos(\Delta\omega t + \Delta\phi)}. \tag{2}$$

where $\omega_{LO} = 2\pi f_{LO}$, $\omega_{SIG} = 2\pi f_{SIG}$, and $\Delta\phi = \phi_{SIG}$. Equation (2) can be written to separate the term on resonance with the Rydberg transition $E_{res}(\omega_{LO})$ from the low frequency term $E_{mod}(\Delta\omega)$ as $E_{atoms} = E_{res} \cdot E_{mod}$, where $$E_{res} = \cos(\omega_{LO} t + \phi_{LO}), \tag{3}$$

$$E_{mod} = \sqrt{E_{LO}^2 + E_{SIG}^2 + 2E_{LO}E_{SIG}\cos(\Delta\omega t + \Delta\phi)}. \tag{4}$$

The resonant term $E_{res}$ causes an Autler-Townes effect as described above, reducing the peak of the EIT line. The low frequency term $E_{mod}$ modulates the amplitude of the resonant effect. The probe transmission is a function of absorption of the atomic vapor $$T_{probe} \propto \exp\left(-\frac{2\pi L}{\lambda_p} \text{Im}[\chi]\right), \tag{5}$$

where L is the length of the cell, $\lambda_p$ is the wavelength of the probe laser, and $\chi$ is the susceptibility. The susceptibility is a function of the E-field strength $|E_{atoms}|$ at $\omega_{LO}$, thus the probe transmission is a function of the magnitude of the E-field on resonance with the Rydberg transition. The magnitude of the resonant term $|E_{res}|=1$, so $|E_{atoms}|=|E_{res} \cdot E_{mod}|=|E_{mod}|$. For a SIG field that is small compared to the LO field ($E_{SIG} \ll E_{LO}$), the magnitude of the field can be written as $$|E_{atoms}| \tilde{=} E_{LO} + E_{SIG} \cos(\Delta\omega t + \Delta\phi). \tag{6}$$

The atoms demodulate the high-frequency $\omega_{LO}$ field and the probe transmission as a function of time is given by $$T_{probe} \propto |E_{atoms}| \tilde{=} E_{LO} + E^{SIG} \cos(\Delta\omega t + \Delta\phi). \tag{7}$$

The term $E_{res}$ causes AT-splitting through the resonant interaction which reduces the probe transmission ($T_{probe}$) below the EIT peak.

This reduction is then modulated in time by the low-frequency beat note, $E_{mod}$. In effect, the probe laser transmission varies in time by the difference frequency $\Delta\omega$, with a phase given by the difference between the LO and SIG phases $\Delta\emptyset$.

Figure 23:
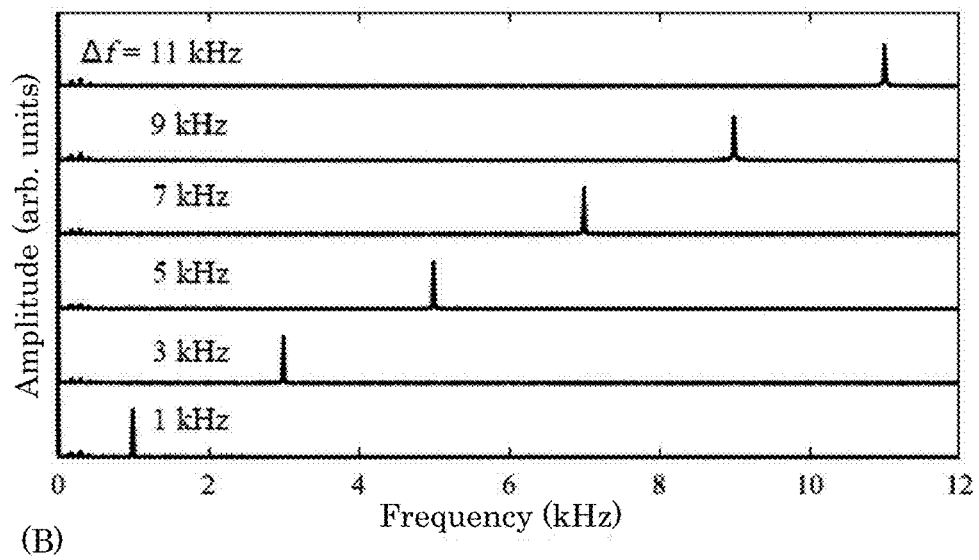
FIG. 23 shows DFT of the probe transmission for different values of Δf, keeping the LO frequency fixed. Each plot (a)-(c) has a different y-scale. (a) Values of Δf from bottom to top of 1 kHz, 3 kHz, 5 kHz, 7 kHz, 9 kHz, and 11 kHz, (b) values of 10 kHz, 50 kHz, 90 kHz, 130 kHz, 170 kHz, and 210 kHz, and (c) values of 500 kHz, 1 MHz, 1.5 MHz, 2 MHz, and 2.5 MHz.
Figure 23:
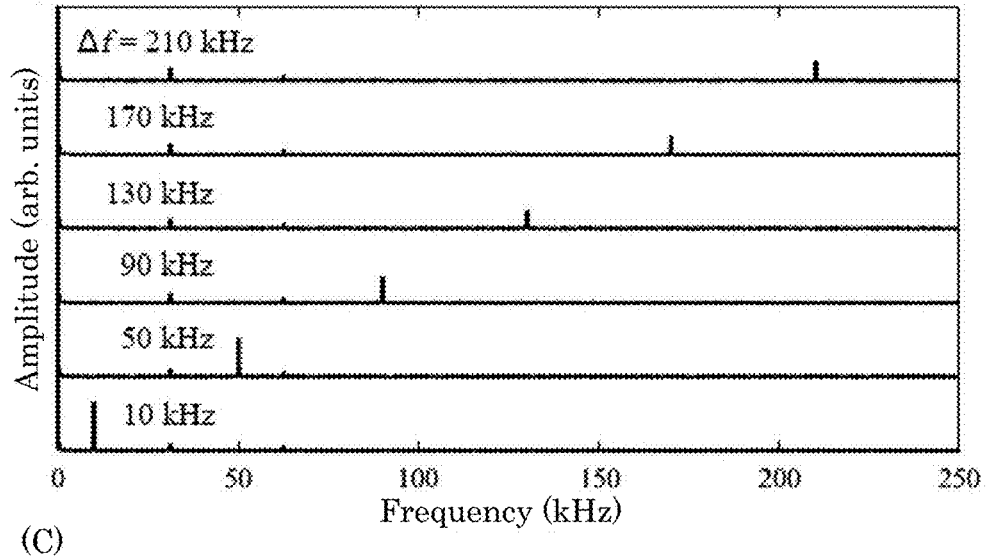
Figure 23:
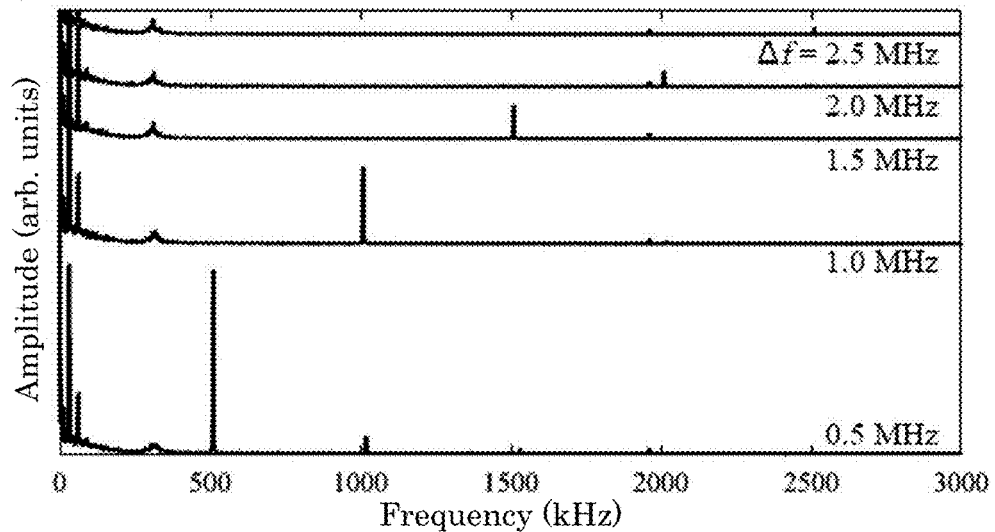

The observation of a signal at $\Delta f = \Delta\omega/2\pi$ in the detected probe transmission indicates the presence of an RF field at either $f_{SIG} = f_{LO} \pm \Delta f$. This is demonstrated in FIG. 23, where a discrete Fourier transform (DFT) of the probe signal is plotted as the SIG is varied from $f_{SIG}$=19.626 001 GHz to 19.628 500 GHz. Each subfigure shows a different frequency range. The $\Delta f$ signal gets weaker the further the frequency of SIG is detuned from the frequency of SIG (the different frequency ranges were plotted on different scales for illustration; the magnitude of the low-frequency noise gives some indication of the change in scale). The detuning is limited by the response rate of the EIT/AT effect. The minimum time for the EIT/AT to develop is on the order of ~0.1 µs, which limits the modulation frequencies that are observable to $\Delta f \leq 10$ MHz.

From Eq. (7), we see that if we measure the phase ($\Delta\emptyset$) of the intermediate frequency signal in the probe transmission, we directly measure the phase between LO and SIG. A direct method for varying the phase of an RF field is to physically translate the source. We demonstrate the ability of the Rydberg atoms to detect the RF phase by translating the SIG horn linearly away from the atoms (in the z-direction), as shown in FIG. 2. The SIG horn is translated by a motorized linear stage, with a step size of $\Delta d = \lambda_{RF}/8 = 1.91$ mm. The LO frequency is set to $f_{LO} = 19.626\,000$ GHz, and the SIG is set to $f_{SIG} = 19.626\,030$ GHz, for a difference in frequency of $\Delta f = 30$ kHz. A function generator is set to 30 kHz for a reference signal to serve as the trigger for the oscilloscope. The two signal generators and the function generator are connected to a Rb clock 10 MHz signal. The LO horn antenna generates an electric field of $/E/=2.97$ V/m in the vapor cell, and the SIG horn a field of $|E|=1:22$ V=m.

By translating the SIG horn antenna while leaving the LO horn antenna fixed, we shift the relative phase between the SIG and LO fields in the vapor cell. We measure the change in phase (As) of our detected signal as a function of the distance traveled by the RF horn antenna Dd, giving us the propagation constant β

$$\beta = \frac{\Delta\phi}{\Delta d}. \quad (8)$$

Figure 24:
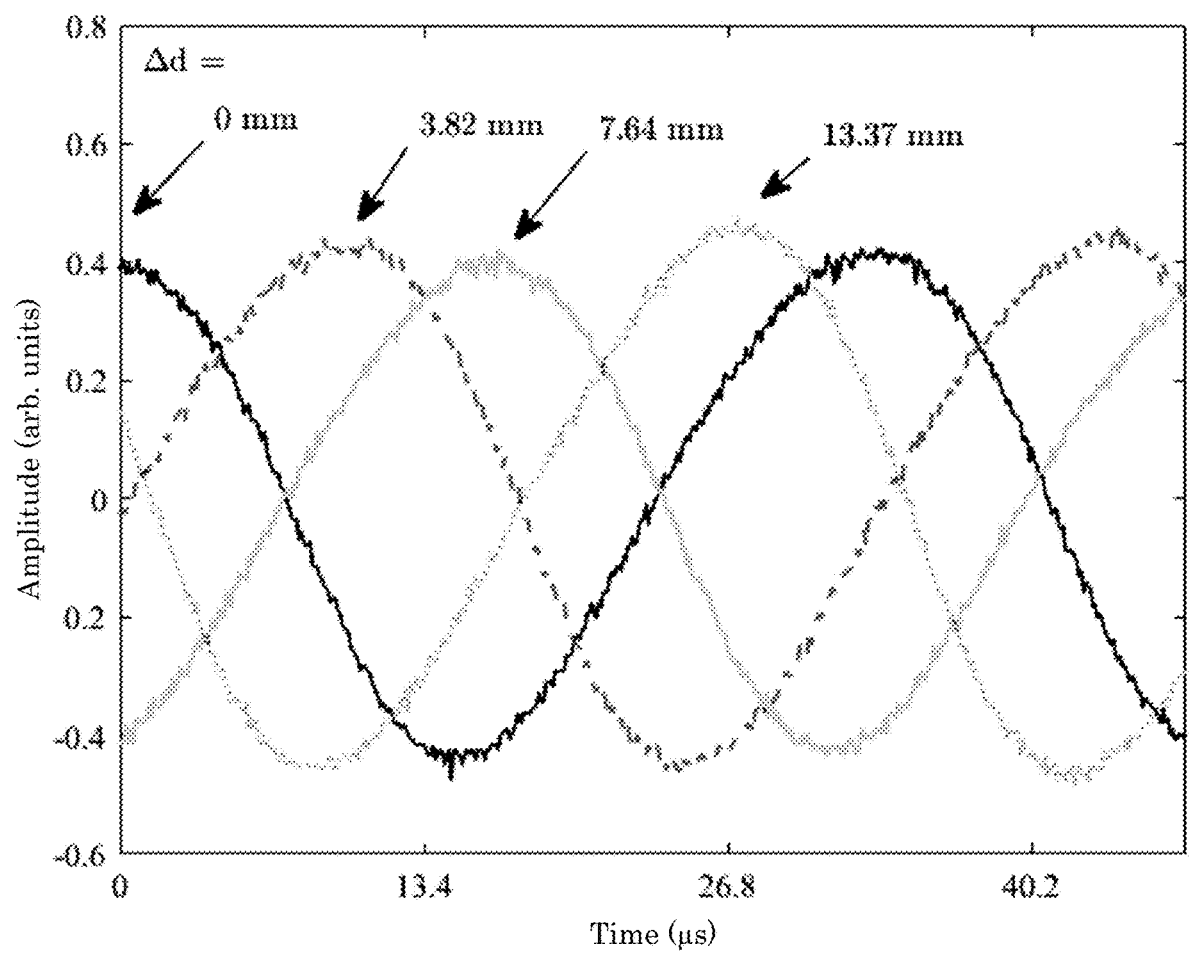
FIG. 24 shows a signal detected on a photodetector for different SIG horn distances Δd. The IF frequency is Δf=30 kHz.
Figure 25:
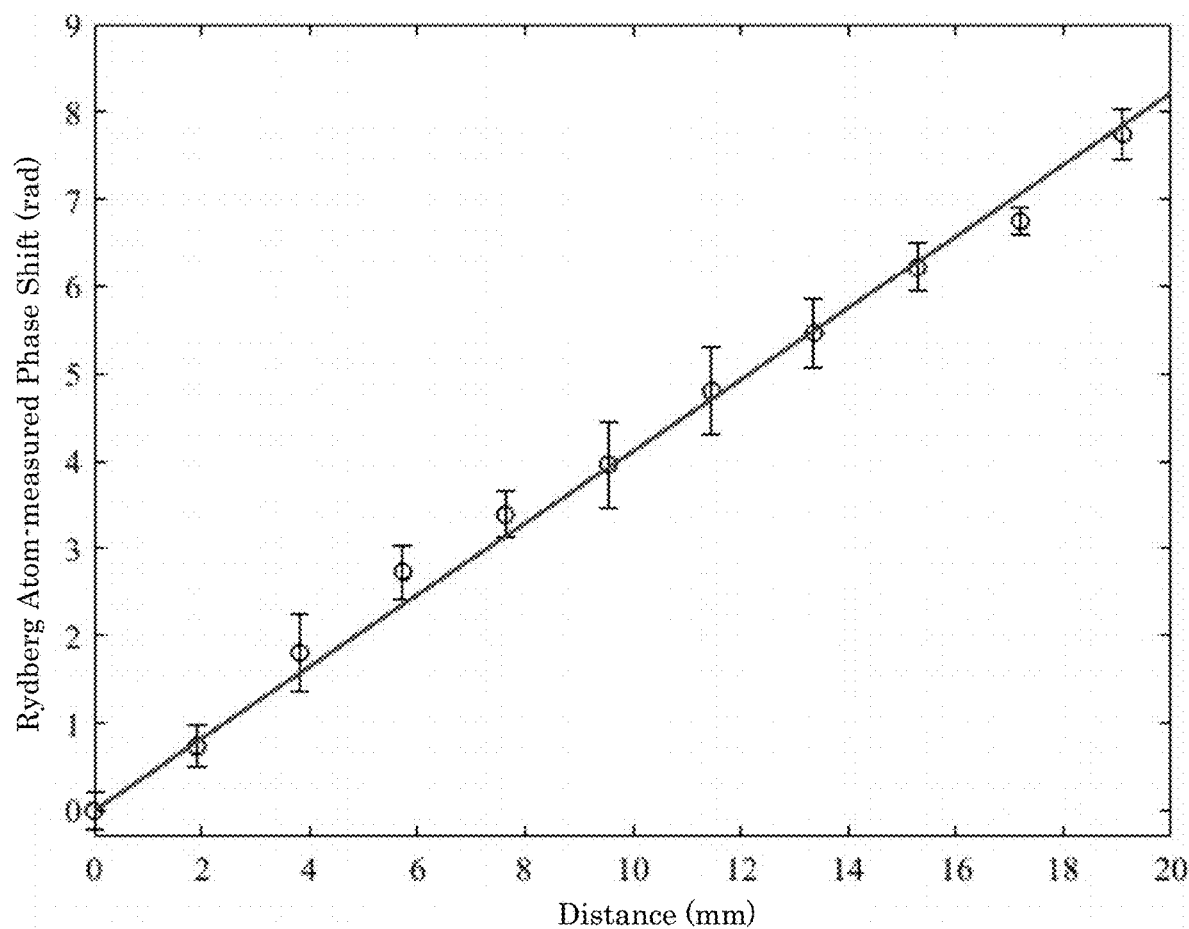
FIG. 25 shows measured phase shift vs. distance SIG horn was moved. Error bars are the standard deviation from 5 measurements. Line shows predicted phase shift, with a slope of 409.7 rad/m. The fit to the data gives a measured slope of 409.3 rad/m.

Four sample traces corresponding to different distances of the SIG horn relative to the Rydberg atoms are shown in FIG. 24. We track the phase of the signal relative to the first trace as the SIG horn is moved, keeping track of the accumulated phase. FIG. 25 shows the measured phase difference vs. distance. This measurement was repeated 5 times and averaged. The fit to the data in FIG. 25 gives a $\beta = 409.3$ rad/m. The theoretical value for the propagation constant for a wave propagating in free space is given by $\beta = \omega_{RF}/c$. In this experimental setup (FIG. 2), the horn antenna for the SIG is at an angle of $\phi \approx 5°$ from the orthogonal of the two laser beams. As such, the propagation constant measured in this setup must be corrected by $\cos(\phi)$, giving $$\beta = \frac{\omega_{SIG}}{c}\cos(\theta) = 409.7 \frac{\text{rad}}{\text{m}}. \quad (9)$$

After correcting for the angle, the measured propagation constant is within 0.1% of the theoretical value. This shows that the phase of the SIG field was measured relative to the phase of LO.

This work demonstrates a Rydberg atom-based RF mixer and the ability of Rydberg atoms to directly measure the phase of an RF field. The Rydberg atoms demodulate the RF field and transfer the IF frequency directly to an optical field. The presence of a second RF field (analogous to an LO) creates a beat note that the Rydberg atoms can demodulate. The phase of the demodulated signal in the optical field is directly related to the phase of the incident RF field. The uncertainties of this type of phase measurement technique are currently being investigated. However, the results in this paper show that the phase can be determined to at least 0.1% when compared to theoretical values. The ability to measure the phase allows a single quantum sensor to fully characterize an RF field, at frequencies from MHz to THz. This allows atomic receivers to be competitive with current technologies and opens up a wide range of possible applications for Rydberg atom-based sensors. The Rydberg atom-based mixer can be used for quantum-based RF field detection, including communication applications, near-field antenna measurements, and radar. It is not necessary for the incident RF source to be physically connected to the LO source as long as the phases can be synchronized, for instance, through the use of atomic clocks. Rydberg atoms can measure the RF phase that overcomes limitations of conventional devices that miss complete E-field metrology with Rydberg atom-based quantum sensors.

Example 4. A Rydberg Atom-Based Mixer: Measuring the Phase of a Radio Frequency Wave Rydberg atoms have been used for measuring radio-frequency (RF) electric (E)-fields due to their strong dipole moments over the frequency range of 500 MHz-1 THz. For this, electromagnetically induced transparency (EIT) within the Autler-Townes (AT) regime is used such that the detected E-field is proportional to AT splitting. However, for weak E-fields AT peak separation becomes unresolvable thus limiting the minimum detectable E-field, Here, we demonstrate using the Rydberg atoms as an RF mixer for weak E-field detection well below the AT regime with frequency discrimination better than 1 Hz resolution. A heterodyne detection scenario with two E-fields incident on a vapor cell filled with cesium atoms is used. One E-field at 19.626000 GHz drives the $34D_{5/2} \rightarrow 35P_{3/2}$, Rydberg transition and acts as a local oscillator (LO) and a second signal E-field (Sig) of interest is at 19.626090 GHz. In the presence of the LO, the Rydberg atoms naturally down convert the Sig field to a 90 kHz intermediate frequency (IF) signal. This IF signal manifests as an oscillation in the probe laser intensity through the Rydberg vapor and is easily detected with a photodiode and lock-in amplifier. In the configuration used here, E-field strength down to $\approx 46$ μV/m±2 μV/m were detected with a sensitivity of $\approx 79$ μVm$^{-1}$ Hz$^{-1/2}$. Furthermore, neighboring fields 0.1 Hz away and equal in strength to Sig could be discriminated without any leakage into the lock-in signal. For signals 1 Hz away and as high as +60 dB above Sig, leakage into the lock-in signal could be kept below ~3 dB.

We show how this mixer effect can also be applied for the detection of weak RF fields that are well below AT splitting with the added benefit of isolation of signals at adjacent frequencies, and frequency selectivity of ~$10^8$ better than that provided by the Rydberg transition alone. Using the Rydberg atom mixer, we demonstrate a weakest detectable field of $\approx 46$ μV/m±2 μV/m with a sensitivity of 79 μVm$^{-1}$ Hz$^-$1/2 without the need for cavities or inteferometers with better than ~1 Hz resolution.

The setup for this work is shown in FIG. 2. Rydberg atoms are produced using a 75 mm×25 mm (Length×Diameter) cylindrical glass atomic vapor cell filled with cesium ($^{133}$Cs) atoms. A probe laser tuned to the D2 transition wavelength of $\lambda_p = 852$ nm excites the $^{133}$Cs from the ground state to the first excited state ($6S_{1/2} \rightarrow 6P_{3/2}$). A counter propagating coupling laser is tuned to $\lambda_c = 511.148$ nm, and further excites the $^{133}$Cs atoms to the Rydberg state $34D_{5/2}$ thus producing a transparency region in the probe laser spectrum. The probe laser beam has a full-width half-maximum (FWHM) of 425 μm and a power of 49 μW, the coupling laser has a FWHM of 620 μm and a power of 60.6 mW. Under these conditions an incident RF field operating near the frequency of 19.626 GHz drives the $34D_{5/2} \rightarrow 35P_{3/2}$ transition. With the probe laser frequency fixed on resonance with the D2 transition, the transmission through the vapor cell is in general reduced when in the presence of the applied RF field. For appreciable field strengths the atoms are driven to the Autler-Towns regime which splits the observed EIT peak in the probe laser transmission spectrum. The frequency separation $\Delta f_{AT}$ of the two AT peaks is given by, $$\Delta f_{AT} = \frac{\lambda_c}{\lambda_p} \frac{E_{RF} \wp_{RF}}{2\pi\hbar} \qquad (1)$$

Where $\wp_{RF}$ is the dipole matrix element of the RF Rydberg transition and h is Plank's constant. The dipole moment for the resonant RF transition is $\wp$=723.3739ea$_0$ (which includes a radial part of 1476.6048ea$_0$ and an angular part of 0.48989, which correspond to co-linear polarized optical and RF fields, where e is the elementary charge; a$_0$=0.529177×10$^{-10}$ m and is the Bohr radius). AT splitting as a method for E-field sensing becomes less effective for E-fields too weak to cause resolvable AT peak separation. The work described below overcomes this weak E-field limitation through the Rydberg atom mixer effect with the added benefit of narrow band frequency selection and tuning. Here, we define the minimum detectable RF field capable of being detected with AT splitting as that which causes an AT peak separation equivalent to the EIT line width $\Gamma_{EIT}$. From (1) this is, $$E_{AT} = \frac{\lambda_p}{\lambda_c} \frac{2\pi\hbar\Gamma_{EIT}}{\wp_{RF}}. \qquad (2)$$

Figure 26:
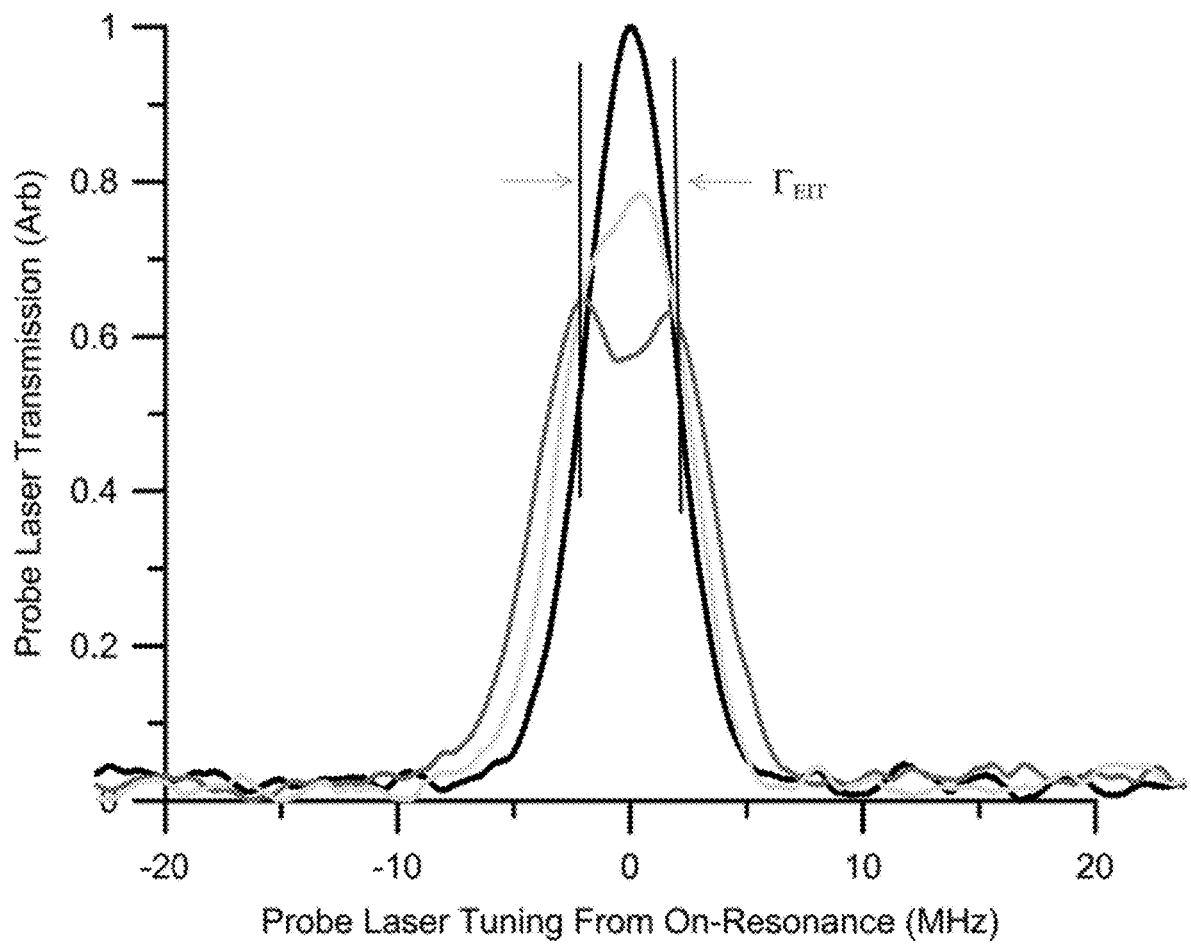
FIG. 26 shows probe laser spectrum plots showing the transition into the AT regimes. (Blue) no RF field where E=0 V/m, (Green) E<$E_{AT}$, (Red) E=$E_{AT}$ the EIT peak just begins to split into two resolvable peaks separated by $\Gamma_{EIT}$.

As determined from the EIT spectrum shown in FIG. 26, $\Gamma_{EIT}$=4 MHz and E$_{AT}$=0.72 V/m for the above mentioned Rydberg states.

Figure 27:
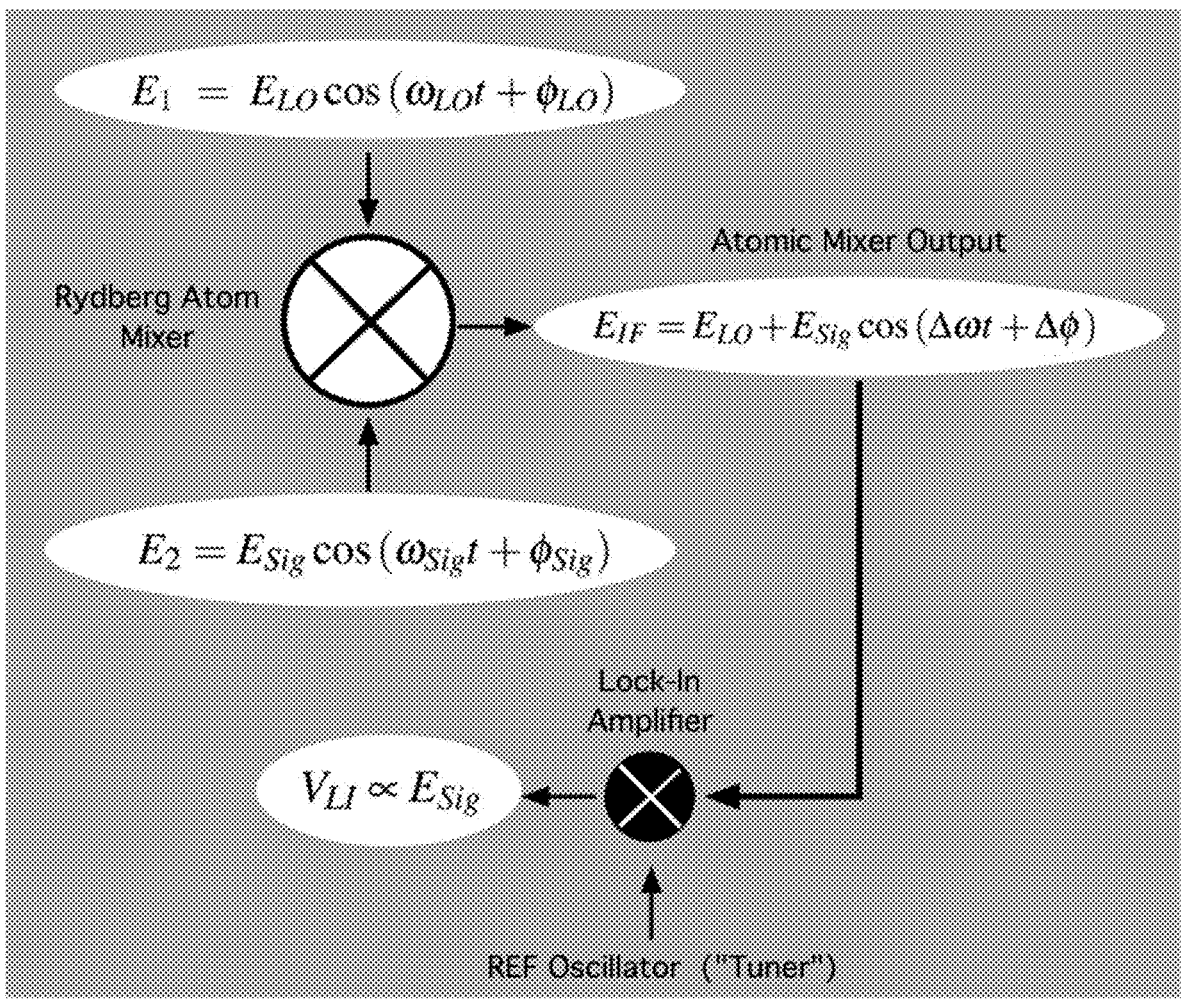
FIG. 27 shows a flow chart showing the application of the Rydberg atom mixer to weak field detection. Inputs Local Oscillator (LO) field $E_1$ and Signal (Sig) field $E_2$, produce an IF field $E_{IF}$ output which is detected by a lock-in amplifier producing a voltage $V_{LI}$ proportional to $E_{Sig}$. The reference oscillator (REF Oscillator) for the lock-in is set to $f_{REF}=f_{IF}$, and allows narrow band ≤1 HZ selective tuning to isolate Sig fields having a range of differing frequencies relative to the LO frequency.

A schematic of the Rydberg atom mixer is shown in FIG. 27. A heterodyne detection scenario is used where two different RF fields are incident on the vapor cell, E1=ELOcos($\omega$LOt++$\phi$LO)E1=ELO cos $\omega$LOt+$\phi$LO, and E2=ESigcos($\omega$Sigt+$\phi$Sig)E2=ESig cos $\omega$Sigt+$\phi$Sig. One is tuned to $f_{LO}=\omega_{LO}/2\pi$=19.626000 GHz such that it is on resonance with 34D$_{5/2}\rightarrow$35P$_{3/2}$ Rydberg transition. This field acts as a local oscillator (LO). The second field E$_2$ is the signal field (Sig) that is to be sensed and is tuned to $f_{sig}=\omega_{sig}/2\pi$=19.626090 GHz such that it is detuned by +90 kHz from the LO field. Here, we explore the case when both E$_1$ and E$_2$ are co-polarized and considered weak where E$_1\approx$E$_{AT}$ and E$_2\leq$E$_{AT}$.

The interference occurring from the superposition of these fields results in a high frequency component E$_{res}$ and low frequency component E$_{mod}$. With $\omega$=($\omega$LO+$\omega$Sig)/2$\omega^-$= ($\omega$LO+$\omega$Sig)/2, $\Delta\omega$=$\omega_{LO}$-$\omega_{sig}$, and $\Delta\phi$=$\phi_{LO}$-$\phi_{sig}$, for small relative detuning where $\Delta\omega/\omega$—<<1$\Delta\omega/\omega^-$<<1 the total field at the atoms E$_{atoms}$ can be shown to be, $$E_{atoms}=E_1+E_2 \qquad (3)$$

$$=\cos(\omega_{LO}t+\phi_{LO})\sqrt{E_{LO}^2+E_{SIG}^2+2E_{LO}E_{SIG}\cos(\Delta\omega t+\Delta\phi)} \qquad (4)$$

$$=E_{res}\times E^{mod} \qquad (5)$$

Where E$_{res}$ oscillates at $\omega_{LO}$ and E$_{mod}$ oscillates at $\Delta\omega$. The magnitude of the total field is given by, $$|E_{atoms}|=\sqrt{E_{LO}^2+E_{SIG}^2+2E_{LO}E_{SIG}\cos(\Delta\omega t+\Delta\phi)} \qquad (6)$$

For weak fields where E$_{sig}$<<F$_{LO}$, (6) becomes, $$\approx E_{LO}+E_{sig}\cos(\Delta\omega t+\Delta\phi). \qquad (7)$$

The Rydberg atoms have a naturally different response to E$_{res}$ and E$_{mod}$. Since E$_{res}$ oscillates at $\omega_{LO}$ it is resonant with the Rydberg transition, whereas E$_{mod}$ oscillates at a frequency that is well below the Rydberg transition frequency and results in a modulation of the EIT spectrum and thus the probe laser intensity on the photodiode (see FIG. 2). The effect being the down conversion of the incident field E$_2$ from the base band RF frequency of $\omega_{Sig}$ to an intermediate frequency (IF) of $f_{IF}=\Delta\omega/(2\pi)$ (see FIG. 27), $$E_{IF}=E_{LO}+E_{sig}\cos(\Delta\omega t+\Delta\phi). \qquad (8)$$

Figure 28:
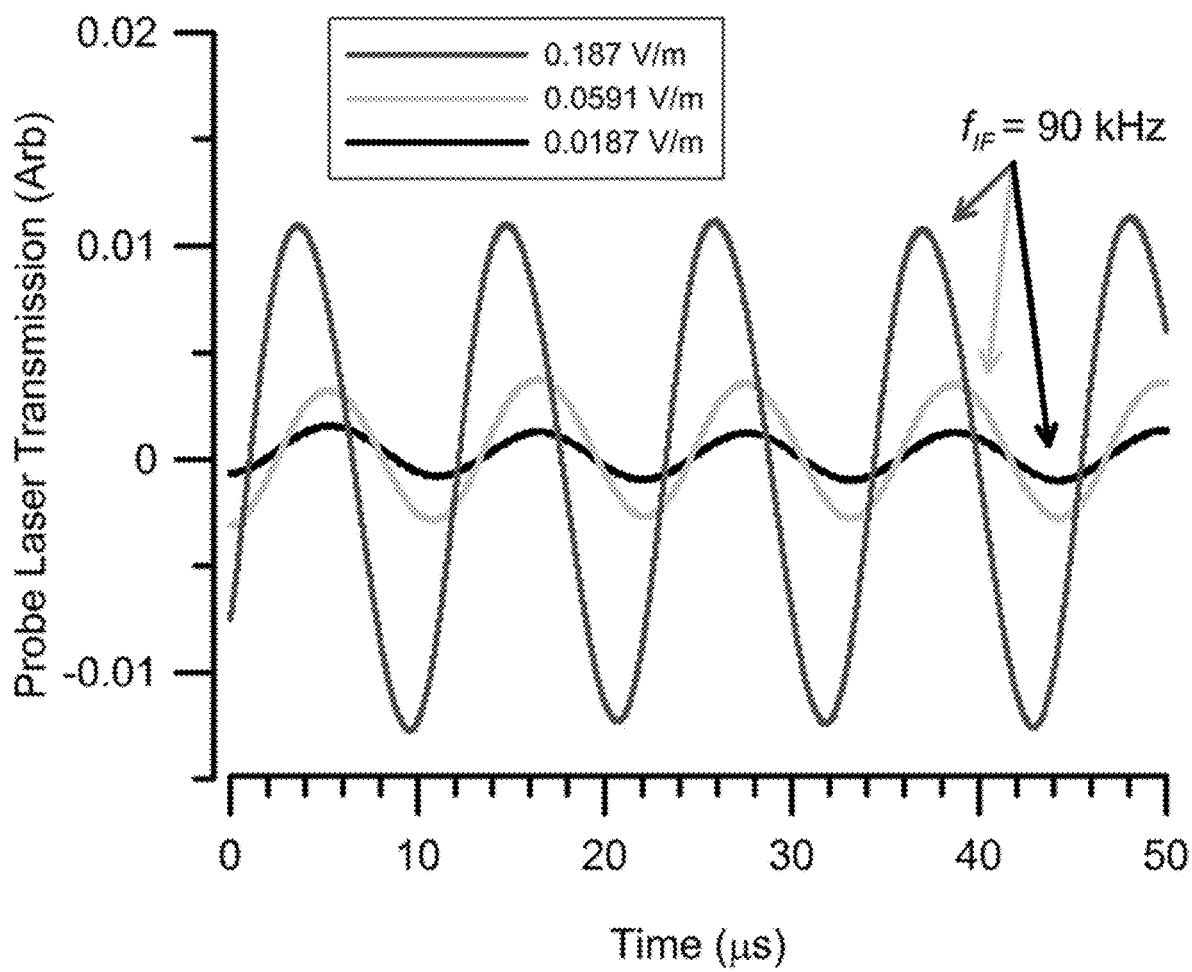
FIG. 28 shows time domain plots of the IF signal from the photodiode for $E_{Sig}$=0.187 V/m, 0.0591 V/m, 0.0187 V/m.

In this case the probe laser intensity on the photodiode varies at $f_{IF}$=90 kHz. A detectable IF signal is produced even for E$_{sig}$ well below E$_{AT}$. FIG. 28 shows time domain plots of the IF signal out of the photodiode for various E$_{sig}$ levels. The 90 kHz modulation is easily seen as is the changing modulation amplitudes following the behavior of (8). For the final stage of detection, the output of the photodiode is passed to a lock-in amplifier with a reference set equal to the IF frequency, $f_{REF}=f_{IF}$. The lock-in output voltage (V$_{LI}$) is thus proportional to weak field, V$_{LI}\propto$E$_{Sig}$.

Two identical source antennas produced E$_{LO}$ and E$_{Sig}$ fields. The antennas were placed 385 mm from the $^{133}$Cs vapor cell such that they were beyond the 2a$^2$/$\lambda_{RF}$=305 mm far field distance. Where a=48.28 mm is taken as the diagonal length of the antenna aperture and $\lambda_{RF}$=15.286 mm. Two separate RF signal generators synced via a 10 MHz reference were used to feed the two antennas at frequencies of $f_{LO}$=19.62600 GHz, and $f_{Sig}$=19.626090 GHz. A calibrated power meter and vector network analyzer were used to account for cable loss from the RF signal generator and horn reflection coefficient and to determine the RF power at the horn antennas P$_{RF}$. For powers down to −70 dBm the power meter was used. For weak field generation P$_{RF}$ was <−70 dBm and thus well below the dynamic range of an RF power meter. To overcome this, the signal generator was operated within the range of the power meter from +10 to −60 dBm and additional calibrated attenuators were added providing up to −111 dB of additional loss. With this configuration accurate control of power levels could be achieved down to $\approx$−180 dBm.

Figure 29:
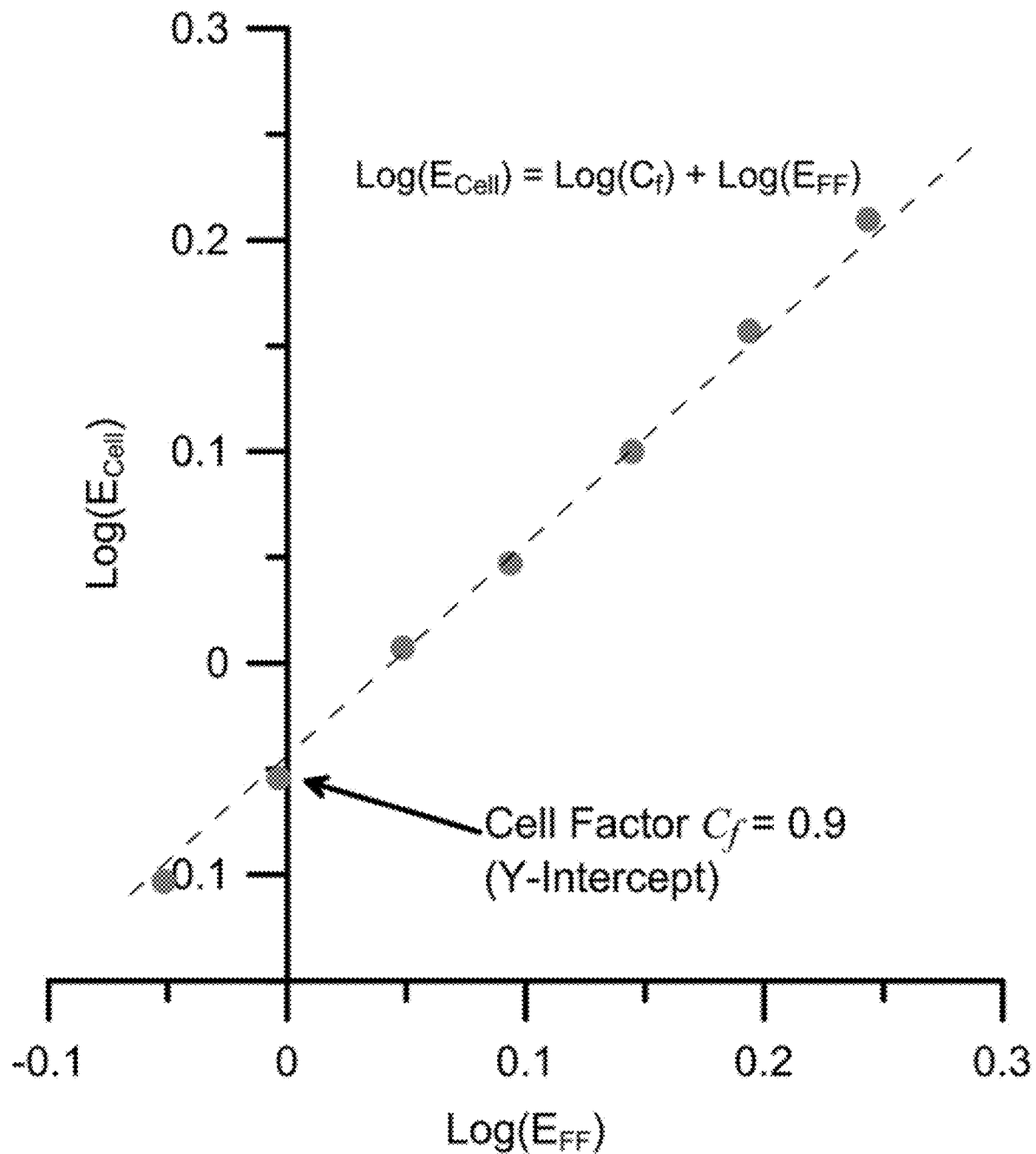
FIG. 29 shows a plot of Log($E_{Cell}$)—v.s.—Log($E_{FF}$), $C_f$ is given by the Y-intercept.

To accurately determine the E-field within the vapor cell for low RF powers into the horns, AT splitting was used to calibrate and correct errors imparted on the E-field due to the presence of the vapor cell. An RF field incident on a vapor cell scattering off of the glass walls can cause internal resonances and alter the E-field amplitude inside the vapor cell from that which would exist given the vapor cell were not there. The E-field at the horn-to-laser beam distance R=385 mm was calculated using the far-field formula $$E_{FF}=\sqrt{59.9585}\sqrt{P_{RF}G}/R$$

where the antenna gain is G=15.55 dB±0.4 dB. For a given distance R and RF frequency there is a fixed ratio of the E-field inside the vapor cell E$_{cell}$ to the E-field in the absence of vapor cell E$_{FF}$. This is given by the cell factor C$_f$=E$_{cell}$/E$_{FF}$. Calibration data for E$_{cell}$ was determined from the conventional AT splitting technique (1) for a range of PPR strong enough to cause AT splitting. Cell factor calibration data comparing E$_{cell}$ and E$_{FF}$ is shown in FIG. 29. Given the uncertainty in G, power meter, and operating within the linear response of the AT regime (1), weak E-fields detected by the Rydberg mixer could be known for a given P$_{RF}$ to within an estimated uncertainty of ±% 5. For the configuration used here C$_f$=0.90 and thus for a given P$_{RF}$, $$E_{Cell} = \frac{0.90\sqrt{59.9585}\sqrt{P_{RF}G}}{R} \quad (9)$$

Figure 30:
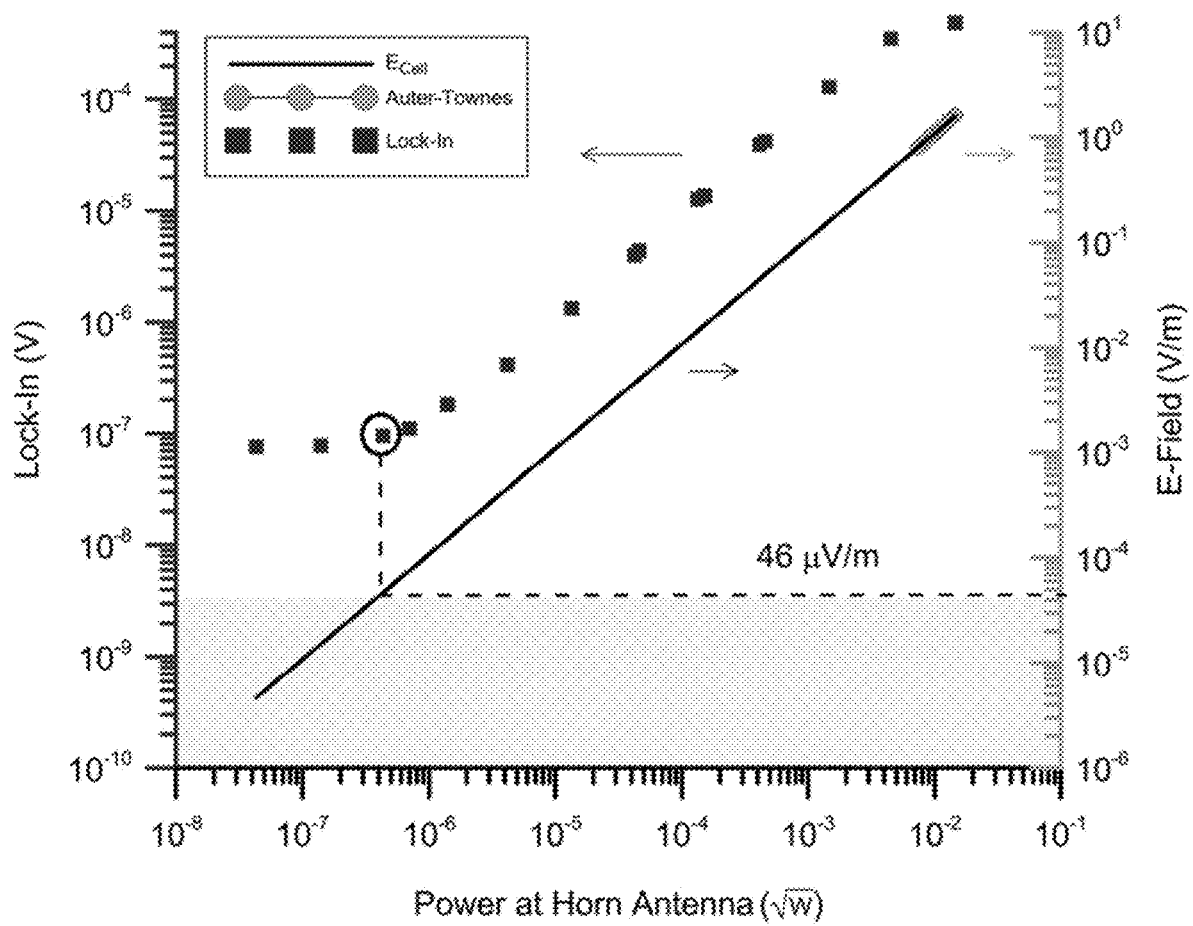
FIG. 30 shows a detection plot for weak fields. (blue, left-axis) lock-in signal, (red, right-axis) AT splitting, and (line, right-axis) $E_{Cell}$ as a function of PRF-√PRF. (dashed-line) Lock-in signal corresponding to lowest detectable E-field of 46 μV/m.

Weak E-field data (blue squares) are plotted in FIG. 30 for lock-in amplifier output voltage-vs-$\sqrt{P_{RF}}$ along with the corresponding E-field strength. For these data a 3 s time constant (bandwidth of $f_c$=0.33 Hz) and 24 dB/octave low pass filter slope was used. As $P_{RF}$ approaches powers <−100 dBm the lock-in signal approaches the noise floor which shows up by the flattening out of the data curve. To estimate the repeatably of the measurement, 3 sets of data were acquired for each E-field level. This showed a 5% variation. Also shown in FIG. 30 are the higher E-fields that were used for cell factor calibration and acquired from AT splitting. These data (red circles) follow the linear behavior predicted by equations (1) and (9). The weak E-field data remains linear up until $E_{AT}$ is reached. The cross over between the weak field regime and AT regime shows up as a roll off of the weak field data near $E_{AT}$. This roll off is due to the EIT peak center frequency shifting away from the probe laser frequency as AT splitting begins to take place. The weakest detectable E-field is taken as the value at where the lock-in voltage curves to the noise floor. This corresponds to ≈46 μV/m and a sensitivity of ≈79 μVm$^{-1}$ Hz$^{-1/2}$.

Another aspect of the Rydberg mixer is its ability to isolate and discriminate between signals of differing RF frequencies with a frequency resolution orders of magnitude finer than the response bandwidth of the Rydberg transition. RF E-fields that are off-resonance with the Rydberg transition will still affect the EIT spectrum over a large continuum of frequencies of hundreds of MHz. For an RF frequency detuning of $\delta_{RF}$, and on-resonance Rabi frequency of $\Omega_o$, the generalized Rabi frequency becomes, $$\omega' = \sqrt{\Omega_o^2 + \delta_{RF}^2},$$

For example, in the AT regime, splitting will still occur for off-resonance E-fields for a large range of $\delta_{RF}$, where now the splitting $\Delta f_{AT} \rightarrow \Omega'/(2\pi)$. As such, discriminating between E-fields of different RF frequencies through purely observing the EIT spectrum becomes difficult and ambiguous. The Rydberg atom mixer provides a means to overcome this so that E-fields differing in frequency by as little as 1 Hz can be discriminated. For this, the lock-in amplifier is tuned to the desired IF frequency corresponding to the desired down converted RF frequency. Simply tuning $f_{REF}$ allows for signals at different RF frequencies to be discriminated and isolated.

Figure 31:
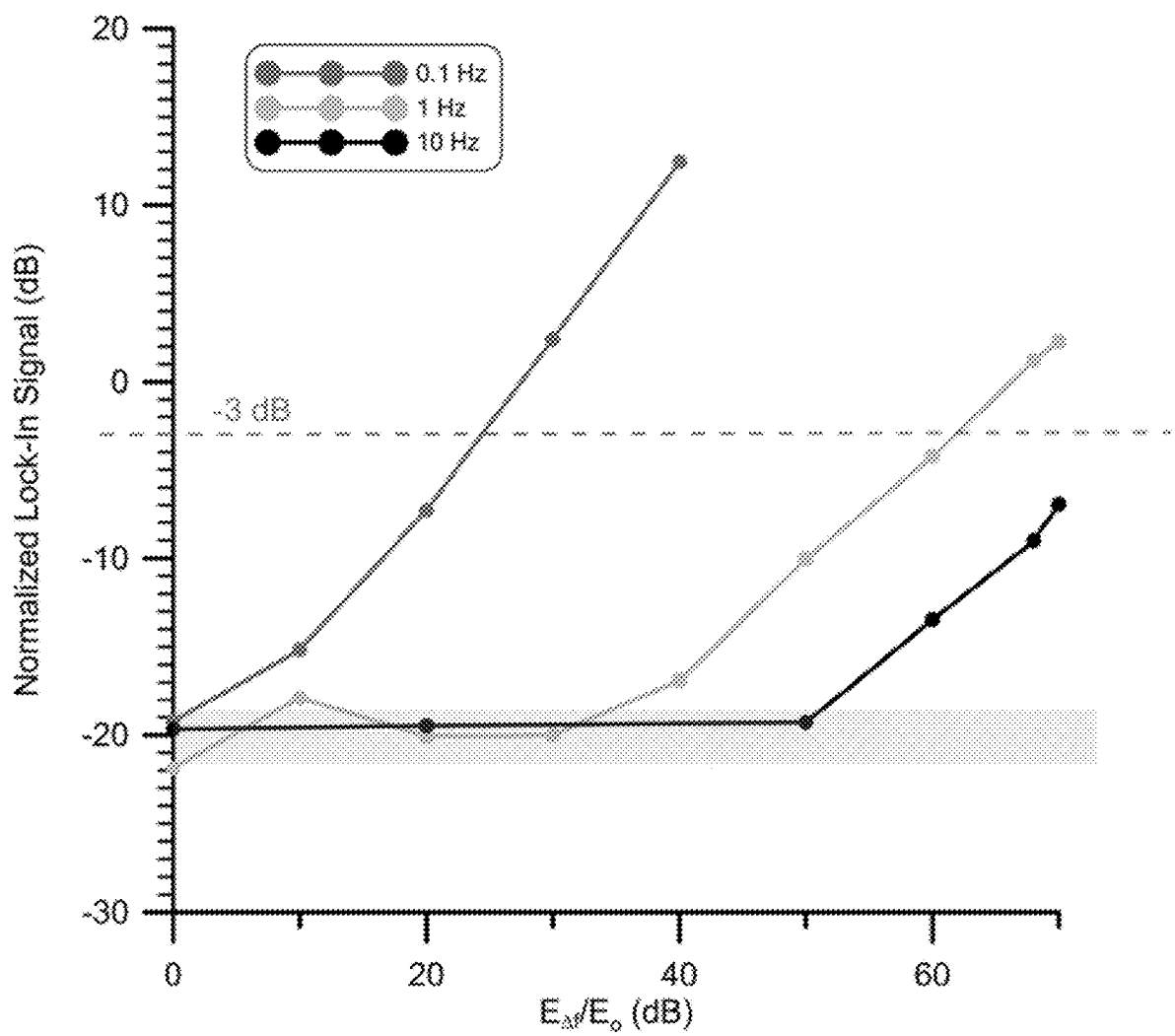
FIG. 31 shows an isolation of neighboring signals for various E-field strengths relative to $E_o$ and for Δf=0.1 Hz, 1 Hz, and 10 Hz. Lock-in signal is normalized to that produced by $E_o$=181 μV/m. Signals below −3 dB level are considered to be isolated. Noise floor around −20 dB is shown by red region.

We demonstrate this and examine the leakage in the lock-in signal for E-fields at neighboring frequencies and various strengths relative to the "in-tune" E-field. First, an in-tune IF signal was produced where the RF signal generator power was set to roughly middle of range at $P_{RF}$=−40 dBm and $f_{IF}$=90 kHz. This signal we denote as $E_o$=181 μV/m. The lock-in reference was also tuned to $f_{REF}$=90 kHz, and a time constant of 3 s, giving a cut off frequency of $f_c$=0.33 Hz. Three other signals denoted as $E_{\Delta f}$ that were out of tune by Δf=0.1 Hz, Δf=1 Hz, Δf=10 Hz were also produced. For these three signals $P_{RF}$ was then varied such that $E_{\Delta f}/E_o$ ranged from 0 dB to greater than 60 dB. FIG. 31 shows a plot of the lock-in output for the three detuned signals normalized to the level produced by $E_a$. The lock-in noise floor is depicted as well. As can be seen there is a range of relative strengths for each detuned signal where the lock-in signal is at the noise floor and then rises up to equal the level of $E_0$. All three detunings show maximum isolation when equal to $E_{\Delta f}/E_o$=0 dB. Where even for sub-Hz detuning of Δf=0.1 Hz, $E_{\Delta f}$ does not rise above the noise floor. The isolation threshold in dB for each detuning is taken for the value of $E_{\Delta f}/E_o$ that crosses −3 dB level of the lock-in signal. Isolation degrades more quickly for smaller detunings for $E_{\Delta f}/E_o$>1. For a detuning of Δf=1 Hz the −3 dB crossing happens for $E_{\Delta f}/E_o$=60 dB.

This example shows E-field strengths −84 dB below the AT limit Ear can be detected using the Rydberg atom mixer. Furthermore, the Rydberg atom mixer allows specific RF frequencies to be selected, isolated and rejected with resolution better than 1 Hz. This is a 10$^8$ improvement in RF frequency resolution over that provided by the frequency bandwidth of the Rydberg transition alone. These attributes along with the ability to measure phase and polarization provide the quantum-based sensor to fully characterize the RF E-field in one compact vapor cell.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A Rydberg atom mixer for determining a phase of modulated carrier radiation comprising:
   a reference radiofrequency source that provides reference radiofrequency radiation;

a modulated carrier source that provides modulated carrier radiation;
a vapor cell comprising a vapor cell wall and vapor space physically bounded by the vapor cell wall to contain gas atoms in the optical overlap volume, such that the vapor cell:
receives gas atoms in the vapor space;
receives the reference radiofrequency radiation;
receives the modulated carrier radiation, such that the gas atoms are subjected to the reference radiofrequency radiation and the modulated carrier radiation; and
produces modulated light modulated at an intermediate frequency IF by the gas atoms in response to subjecting the gas atoms to the reference radiofrequency radiation and the modulated carrier radiation; and
a transmission detector that receives the modulated light from the vapor cell and produces a transmission signal from the transmission detector for determination of a phase of the modulated carrier radiation,
wherein the Rydberg atom mixer mixes the reference radiofrequency radiation and the modulated carrier radiation by the gas atoms in a Rydberg electronic state to produce the intermediate frequency IF that corresponds directly to the phase of the modulated carrier radiation.

2. The Rydberg atom mixer of claim 1, further comprising:
a probe laser that produces probe light that comprises a probe frequency that is resonant with a probe electronic transition of the gas atoms; and
a coupling laser that produces coupling light that comprises a coupling frequency that is resonant with a Rydberg electronic transition of the gas atoms,
wherein the vapor cell further:
receives the probe light from the probe laser, the coupling light from the coupling laser, the modulated carrier radiation, and the reference radiofrequency radiation; and
subjects the gas atoms to the probe light, and the gas atoms undergo a probe electronic transition from a first electronic state to an intermediate excited electronic state in response to receiving the probe light;
subjects the gas atoms in the intermediate excited electronic state to the coupling light, and the gas atoms in the intermediate excited electronic state undergo a Rydberg electronic transition from the intermediate excited electronic state to a Rydberg electronic state in response to receiving the coupling light; and
subjects the gas atoms in the Rydberg electronic state to the modulated carrier radiation and the reference radiofrequency radiation, and the gas atoms in the Rydberg electronic stale undergo a radiofrequency Rydberg transition from the Rydberg electronic state to a final Rydberg electronic state in response to receiving the modulated carrier radiation and the reference radiofrequency radiation.

3. The Rydberg atom mixer of claim 2, further comprising:
a modulation analyzer in communication with the transmission detector and that receives the transmission signal from the transmission detector and determines a probe modulation of live probe light from the transmission signal that is due to mixing the reference radiofrequency radiation and the modulated carrier radiation by the gas atoms in the Rydberg electronic state, such that the phase of the modulated carrier radiation is determined from the probe modulation.

4. The Rydberg atom mixer of claim 3, further comprising:
a signal analyzer in communication with the transmission detector and that receives the transmission signal from the transmission detector and determines an in-phase quadrature map from the transmission signal.

5. The Rydberg atom mixer of claim 2, further comprising:
a first antenna in communication with the reference radiofrcquency source and that receives a reference radiofrequency signal from the reference radiofrequency source and produces the reference radiofrequency radiation from the reference radiofrequency signal;
a second antenna in communication with the modulated carrier source and that receives a modulated carrier signal from the modulated carrier source and produces the modulated carrier radiation from the modulated carrier signal,
wherein the gas atoms receive the reference radiofrequency radiation from the first antenna and the modulated carrier radiation from the second antenna.

6. The Rydberg atom mixer of claim 5, further comprising:
a position manipulation stage on which the second antenna is disposed ami that moves the second antenna along a movement direction relative to the vapor cell to change a pathlength between the second antenna and the vapor cell through which the modulated carrier radiation propagates.

7. The Rydberg atom mixer of claim 2, further comprising:
a power combiner in communication with the reference radiofrequency source and the modulated carrier source and that:
receives a reference radiofrequency signal from the reference radiofrequency source;
receives a modulated carrier signal from the modulated carrier source; and
produces a combined radiofrequency signal from the reference radiofrequency signal and the modulated carrier signal;
an antenna in communication with the power combiner and that:
receives the combined radiofrequency signal from the power combiner, and
produces radiofrequency radiation that comprises the reference radiofrequency radiation and the modulated carrier radiation from the combined radiofrequency signal,
wherein the gas atoms receive the radiofrequency radiation from the antenna.

8. The Rydberg atom mixer of claim 2, further comprising:
an antenna in communication with the modulated carrier source and that receives a modulated carrier signal from live modulated carrier source and produces the modulated carrier radiation from live modulated carrier signal;
a parallel-plate waveguide antenna in which the vapor cell is disposed and that:
is in communication with the reference radio frequency source;
receives a reference radiofrequency signal from the reference radiofrequency source;

produces the reference radiofrequency radiation from the reference radiofrequency signal; and communicates the reference radiofrequency radiation to the vapor cell, wherein the gas atoms receive the modulated carrier source from the antenna and the reference radiofrequency radiation from the parallel-plate waveguide antenna.

9. A process for determining a phase of modulated carrier radiation with a Rydberg atom mixer of claim 1, the process comprising:

disposing gas atoms in the vapor space;

receiving, by the vapor cell, the reference radiofrequency radiation;

receiving, by the vapor cell, the modulated carrier radiation;

subjecting the gas atoms to the reference radiofrequency radiation and the modulated carrier radiation;

mixing the reference radiofrequency radiation and the modulated carrier radiation by the gas atoms in the Rydberg electronic state to produce the intermediate frequency IF;

producing modulated light modulated at the intermediate frequency IF by the gas atoms in response to being subjected to the to the reference radiofrequency radiation and the modulated carrier radiation;

receiving, by the transmission detector, the modulated light from the vapor cell;

producing, by the transmission detector, the transmission signal; and determining the phase of tire modulated carrier radiation from the transmission signal.

10. The process for determining the phase of modulated carrier radiation of claim 9, further comprising:

producing probe light that comprises a probe frequency that is resonant with a probe electronic transition of the gas atoms;

producing coupling light that comprises a coupling frequency that is resonant with a Rydberg electronic transition of the gas atoms, receiving, by the gas atoms, the probe light, the coupling light, the modulated carrier radiation, and the reference radiofrequency radiation;

subjecting the gas atoms to the probe light;

undergoing, by the gas atoms, a probe electronic transition from a first electronic state to an intermediate excited electronic state in response to receiving the probe light;

subjecting the gas atoms in the intermediate excited electronic state to tire coupling light;

undergoing, by the gas atoms in the intermediate excited electronic state, a Rydberg electronic transition from the intermediate excited electronic state to a Rydberg electronic state in response to receiving the coupling light;

subjecting the gas atoms in the Rydberg electronic state to the modulated carrier radiation and the reference radiofrequency radiation; and undergoing, by the gas atoms in the Rydberg electronic state, a radiofrequency Rydberg transition from the Rydberg electronic state to a final Rydberg electronic state in response to receiving the modulated carrier radiation and the reference radiofrequency radiation.

11. The process for determining the phase of modulated carrier radiation of claim 10, further comprising:

receiving, by a modulation analyzer, the transmission signal from the transmission detector;

determining a probe modulation of the probe light from the transmission signal, the probe modulation being due to mixing the reference radiofrequency radiation and the modulated carrier radiation by the gas atoms in the Rydberg electronic state; and determining the phase of the modulated carrier radiation from the probe modulation.

12. The process for determining the phase of modulated carrier radiation of claim 11, further comprising:

receiving, by a signal analyzer, the transmission signal from the transmission detector; and determining an in-phase quadrature map from the transmission signal.

13. The process for determining the phase of modulated carrier radiation of claim 10, further comprising:

receiving, by a first antenna, a reference radiofrequency signal front the reference radiofrequency source;

producing the reference radiofrequency radiation from the reference radiofrequency signal;

receiving, by a second antenna, a modulated carrier signal front the modulated carrier source;

producing the modulated carrier radiation from the modulated carrier signal; and receiving, by the gas atoms, the reference radiofrequency radiation from the first antenna and the modulated carrier radiation from the second antenna.

14. The process for determining the phase of modulated carrier radiation of claim 13, further comprising:

moving the second antenna along a movement direction relative to the vapor cell; and changing a pathlength between the second antenna and the vapor cell through which the modulated carrier radiation propagates.

15. The process for determining the phase of modulated carrier radiation of claim 10, further comprising:

receiving, by a power combiner, a reference radiofrequency signal from the reference radiofrequency source and a modulated carrier signal from the modulated carrier source;

producing a combined radiofrequency signal from the reference radiofrequency signal and the modulated carrier signal;

receiving, by an antenna, the combined radiofrequency signal from the power combiner;

producing, by the antenna, radiofrequency radiation that comprises the reference radiofrequency radiation and the modulated carrier radiation from the combined radiofrequency signal; and receiving, by the gas atoms, the radiofrequency radiation from the antenna.

16. The process for determining the phase of modulated carrier radiation of claim 10, further comprising:

receiving, by an antenna, a modulated carrier signal from the modulated carrier source;

producing the modulated carrier radiation from the modulated carrier signal;

receiving, by a parallel-plate waveguide antenna in which the vapor cell is disposed, a reference radiofrequency signal from the reference radiofrequency source;

producing the reference radiofrequency radiation from the reference radiofrequency signal;

communicating the reference radiofrequency radiation from the parallel-plate waveguide antenna to the vapor cell; and receiving, by the gas atoms, the modulated carrier source from the antenna and the reference radiofrequency radiation from the parallel-plate waveguide antenna.

\* \* \* \* \*